United States Patent
Stefansson et al.

(10) Patent No.: US 8,707,280 B2
(45) Date of Patent: *Apr. 22, 2014

(54) USING PARALLEL PROCESSING CONSTRUCTS AND DYNAMICALLY ALLOCATING PROGRAM PORTIONS

(75) Inventors: Halldor N Stefansson, Natick, MA (US); Brett Baker, Framingham, MA (US); Edric Ellis, Cambs (GB); Joseph F Hicklin, Upton, MA (US); John N Little, Sherborn, MA (US); Jocelyn Luke Martin, Burwell (GB); Piotr R Luszczek, Knoxville, TN (US); Nausheen B Moulana, Southboro, MA (US); Loren Dean, Natick, MA (US); Roy E. Lurie, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,074

(22) Filed: Jun. 29, 2012

(65) Prior Publication Data

US 2012/0317165 A1    Dec. 13, 2012

Related U.S. Application Data

(63) Continuation of application No. 12/254,572, filed on Oct. 20, 2008, now Pat. No. 8,239,844, which is a continuation-in-part of application No. 11/748,938, filed on May 15, 2007, now Pat. No. 8,010,954, which is a continuation-in-part of application No. 11/706,805, filed on Feb. 14, 2007, now Pat. No. 7,975,001, said application No. 12/254,572 is a continuation-in-part of application No. 11/748,947, filed on May 15, 2007, now Pat. No. 8,108,845, which is a continuation-in-part of application No. 11/706,805.

(60) Provisional application No. 61/054,295, filed on May 19, 2008, provisional application No. 61/054,292, filed on May 19, 2008.

(51) Int. Cl.
*G06F 9/45* (2006.01)

(52) U.S. Cl.
USPC ............................. 717/149; 717/148; 717/151

(58) Field of Classification Search
USPC ................................. 717/140–143, 145–151
See application file for complete search history.

(56) References Cited

U.S. PATENT DOCUMENTS 5,021,945 A  *  6/1991   Morrison et al. ............. 712/216
5,293,631 A       3/1994   Rau et al.

(Continued)

FOREIGN PATENT DOCUMENTS

EP         0 420 142 A2     4/1991
WO         WO 93/15457      8/1993

(Continued)

OTHER PUBLICATIONS

Svensson et al, "Parallel Programming in Haskell Almost for Free", ACM, pp. 3-14, 2012.*

(Continued)

*Primary Examiner* — Anil Khatri
(74) *Attorney, Agent, or Firm* — Harrity & Harrity, LLP

(57) ABSTRACT

A computing device-implemented method includes receiving a program, analyzing and transforming the program, determining an inner context and an outer context of the program based on the analysis of the program, and allocating one or more portions of the inner context of the program to two or more labs for parallel execution. The method also includes receiving one or more results associated with the parallel execution of the one or more portions from the two or more labs, and providing the one or more results to the outer context of the program.

20 Claims, 33 Drawing Sheets

(56) References Cited

U.S. PATENT DOCUMENTS

| | | | |
|---|---|---|---|
| 5,355,492 A | 10/1994 | Frankel et al. | |
| 5,355,494 A | 10/1994 | Sistare et al. | |
| 5,442,797 A | 8/1995 | Casavant et al. | |
| 5,485,612 A | 1/1996 | Ota et al. | |
| 5,515,535 A | 5/1996 | Frankel et al. | |
| 5,535,393 A | 7/1996 | Reeve et al. | |
| 5,551,039 A | 8/1996 | Weinberg et al. | |
| 5,586,325 A | 12/1996 | MacDonald et al. | |
| 5,717,883 A | 2/1998 | Sager | |
| 5,721,928 A | 2/1998 | Umehara et al. | |
| 5,752,036 A | 5/1998 | Nakamura et al. | |
| 5,768,594 A | 6/1998 | Blelloch et al. | |
| 5,909,579 A | 6/1999 | Agesen et al. | |
| 6,106,575 A | 8/2000 | Hardwick | |
| 6,112,225 A | 8/2000 | Kraft et al. | |
| 6,253,371 B1 | 6/2001 | Iwasawa et al. | |
| 6,339,840 B1 * | 1/2002 | Kothari et al. | 717/149 |
| 6,463,457 B1 | 10/2002 | Armentrout et al. | |
| 6,609,248 B1 | 8/2003 | Srivastava et al. | |
| 6,662,359 B1 | 12/2003 | Berry et al. | |
| 6,665,862 B2 | 12/2003 | Isman | |
| 6,681,388 B1 * | 1/2004 | Sato et al. | 717/159 |
| 6,725,448 B1 | 4/2004 | Moriya et al. | |
| 6,795,962 B1 | 9/2004 | Hanson | |
| 6,829,760 B1 | 12/2004 | Bera | |
| 6,851,108 B1 | 2/2005 | Syme et al. | |
| 6,865,730 B1 | 3/2005 | Burke et al. | |
| 6,961,925 B2 | 11/2005 | Callahan et al. | |
| 6,961,926 B2 | 11/2005 | Koyama | |
| 6,963,917 B1 | 11/2005 | Callis et al. | |
| 7,103,628 B2 | 9/2006 | Neiman et al. | |
| 7,127,709 B2 | 10/2006 | Demsey et al. | |
| 7,134,073 B1 | 11/2006 | Fiedorowicz et al. | |
| 7,171,615 B2 | 1/2007 | Jensen et al. | |
| 7,174,381 B2 * | 2/2007 | Gulko et al. | 709/226 |
| 7,254,806 B1 | 8/2007 | Yates et al. | |
| 7,305,666 B2 | 12/2007 | Burger et al. | |
| 7,313,788 B2 | 12/2007 | Ben-David et al. | |
| 7,475,393 B2 | 1/2009 | Essick et al. | |
| 7,493,606 B2 | 2/2009 | Morin | |
| 7,552,428 B2 * | 6/2009 | Stoodley et al. | 717/148 |
| 7,620,945 B1 | 11/2009 | Song et al. | |
| 7,680,765 B2 | 3/2010 | Meijer et al. | |
| 7,712,090 B2 * | 5/2010 | Stuefe | 717/149 |
| 7,770,161 B2 | 8/2010 | Mitran et al. | |
| 7,793,278 B2 * | 9/2010 | Du et al. | 717/160 |
| 7,797,691 B2 | 9/2010 | Cockx et al. | |
| 7,849,451 B2 | 12/2010 | Palacz et al. | |
| 7,853,937 B2 * | 12/2010 | Janczewski | 717/149 |
| 7,975,001 B1 | 7/2011 | Stefansson et al. | |
| 7,984,431 B2 | 7/2011 | Kejariwal et al. | |
| 8,010,954 B2 | 8/2011 | Little et al. | |
| 8,104,028 B2 * | 1/2012 | Stoodley et al. | 717/148 |
| 8,108,845 B2 | 1/2012 | Little et al. | |
| 8,136,102 B2 * | 3/2012 | Papakipos et al. | 717/140 |
| 8,136,104 B2 | 3/2012 | Papakipos et al. | |
| 8,146,066 B2 * | 3/2012 | Demetriou et al. | 717/149 |
| 8,230,410 B2 * | 7/2012 | Loen | 717/151 |
| 8,239,847 B2 * | 8/2012 | Yu et al. | 717/149 |
| 8,255,890 B2 * | 8/2012 | Luszczek et al. | 717/149 |
| 8,261,249 B2 * | 9/2012 | Archer et al. | 717/149 |
| 8,443,349 B2 * | 5/2013 | Papakipos et al. | 717/146 |
| 8,448,155 B2 * | 5/2013 | Bordelon et al. | 717/149 |
| 8,448,156 B2 * | 5/2013 | Demetriou et al. | 717/149 |
| 8,505,002 B2 * | 8/2013 | Yehia et al. | 717/149 |
| 8,549,500 B2 * | 10/2013 | Stefansson et al. | 717/149 |
| 2002/0078125 A1 | 6/2002 | Ichinose et al. | |
| 2003/0014611 A1 | 1/2003 | Ferris | |
| 2003/0101023 A1 | 5/2003 | Shah et al. | |
| 2004/0098447 A1 | 5/2004 | Verbeke et al. | |
| 2004/0215829 A1 | 10/2004 | Hubbard et al. | |
| 2004/0243709 A1 | 12/2004 | Kalyanavarathan et al. | |
| 2005/0015437 A1 | 1/2005 | Strait | |
| 2005/0021795 A1 | 1/2005 | Kuroshima et al. | |
| 2006/0041859 A1 | 2/2006 | Vrancic et al. | |
| 2006/0059251 A1 | 3/2006 | Cunha et al. | |
| 2006/0212882 A1 | 9/2006 | Foti et al. | |
| 2007/0143248 A1 | 6/2007 | Uppala | |
| 2008/0022264 A1 | 1/2008 | Macklem et al. | |
| 2009/0006167 A1 | 1/2009 | Toussaint et al. | |
| 2009/0044179 A1 | 2/2009 | Luszczek et al. | |
| 2009/0044180 A1 | 2/2009 | Luszczek et al. | |
| 2009/0044196 A1 | 2/2009 | Stefansson et al. | |
| 2009/0044197 A1 | 2/2009 | Stefansson et al. | |
| 2009/0049435 A1 | 2/2009 | Luszczek et al. | |
| 2009/0119677 A1 | 5/2009 | Stefansson et al. | |
| 2011/0035736 A1 | 2/2011 | Stefansson et al. | |
| 2011/0035737 A1 | 2/2011 | Stefansson et al. | |
| 2012/0011347 A1 | 1/2012 | Little et al. | |

FOREIGN PATENT DOCUMENTS

| | | |
|---|---|---|
| WO | WO 2006/032001 A2 | 3/2006 |
| WO | WO 2006/088669 A1 | 8/2006 |
| WO | WO 2007/016658 A1 | 2/2007 |

OTHER PUBLICATIONS

Rey et al, "Porting the Parallel Array Programming Language ZPL to an Embedded Multicomputing System", ACM, APL, pp. 168-175, 2002.*

Venkataraman et al, "Presto: Distributed Machine Learning and Graph Processing with Sparse Matrices", ACM, pp. 197-210, 2013.*

Papakonstantinou et al, "Throughput-Oriented Kernel Porting onto FPGAs", ACM, pp. 1-10, 2103.*

Ismail et al., "Program based static allocation policies fro highly parallel computers," IEEE, pp. 61-68, 1995.

Kejariwal et al., "On the exploitation of loop level parallelism in embedded applications," ACM Trans. on embedded computing systems, vol. 8, No. 2, article 10, pp. 1-34, 2009.

Massen et al., "Efficient Java RMI for parallel programming," ACM Trans. on Prog. Lang. and Sys., vol. 23, No. 6, pp. 747-775, 2001.

Nieuwpoort et al, "Satin: A high level and efficient grid programming model," ACM Trans. Prog. Lang. and Sys., vol. 32, No. 3, article 9, pp. 1-39, 2010.

Norris et al., "An experimental study of several cooperative register allocation and instruction scheduling strategies", IEEE, pp. 169-179, 1995.

International Search Report and Written Opinion mailed Aug. 25, 2008 issued in corresponding international application No. PCT/US2008/062162, 14 pages.

Behboodian et al., "The Mathworks Distributed and Parallel Computing Tools for Signal Processing Applications," IEEE International Conference on Acoustics, Speech and Signal Processing, vol. IV, Apr. 2007, pp. 1185-1188.

Bartz et al., "Rendering and Visualization in Parallel Environments," IEEE Visualization 2001, tutorial 3, 51 pages.

Chen et al., "MATLAB*G: A Grid-Based Parallel MATLAB," htto://ntu-cg.ntu,edu.sg/Grid_competition/report/grid-9.pdf, print date Apr. 6, 2006, 6 pages.

Choy et al., "Parallel MATLAB: Doing it Right," Proceedings of IEEE, vol. 93, No. 2, Feb. 2005, 11 pages.

Travinin et al., "pMapper: Automatic Mapping of Parallel Matlab Programs," Proceedings of the Users Group Conference 2005, 8 pages.

Xue et al., "Implementation of a Grid Computation Toolkit for Design Optimisation with Matlab and Condor," Lecture Notes in Computer Science: Euro-Par 2003 Parallel Processing, vol. 2790, 2003, 9 pages.

Fernández, "Resource Management for Interactive Jobs in a Grid Environment," 2006 IEEE International Conference on Cluster Computing, pp. 1-10, 2006.

Kupczyk et al., "New Generation Environment for Grid Interactive MPI Applications," CrossGrid technical achievements, Amsterdam, retrieved online at http://desktop.psnc.pl/docs/pdf/md_ras_iss.pdf, 2005.

Reuther et al., "Technology Requirements for Supporting On-Demand Interactive Grid Computing," Proceedings of the HPCMP Users Group Conference, pp. 320-327, 2005.

(56) References Cited

OTHER PUBLICATIONS

Talwar et al., "An Environment for Enabling Interactive Grids," IEEE International Symposium on High Performance Distributed Computing (HPDC-12), pp. 1-10, 2003.
International Search Report for Application No. PCT/US2008/001921, dated Sep. 5, 2008.
Condor® Version 6.6.11 Manual, retrieved online at http://www.cs.wisc.edu/condor/manual/v6.6/condor-V6_6_11-Manual.pdf (2006) 603 pages.
Raman et al., "Policy Driven Heterogeneous Resource Co-Allocation with Gangmatching," Proceedings of the 12th IEEE International Symposium on High Performance Distributed Computing, pp. 80-89, 2003.
Roy et al., "Condor and Preemptive Resume Scheduling," Grid Resource Management: State of the Art and Future Trends, Klumer Academic Publishers, Jarek Nabrzyski, Ed., pp. 135-144, 2003.
Thain et al., "Distributed Computing in Practice: The Condor Experience," Concurrency: Pract. Exper., pp. 0-20, 2004.
Condor High Throughput Computing, "What is Condor?," retrieved online at http://www.cs.wisc.edu/condor/description.html, 2007, 2 pages.
Condor High Throughput Computing, "An Overview of the Condor System," retrieved online at http://www.cs.wisc.edu/condor/overview/, 2007, 4 pages.
Condor High Throughput Computing, "Top Five Myths About Condor," retrieved online at http://www.cs.wisc.edu/condor/myths.html, 2007, 2 pages.
Condor High Throughput Computing, "Condor Checkpointing," retrieved online at http://www.cs.wisc.edu/condor/checkpointing.html, 2007, 2 pages.
Condor High Throughput Computing. "Classified Advertisements," retrieved online at http://www.cs.wisc.edu/condor/classad/, 2007, 3 pages.
Condor High Throughput Computing. "Condor Standalone ClassAd Catalog," retrieved online at http://www.cs.wisc.edu/condor/catalog/, 2007, 2 pages.
Condor High Throughput Computing, "Condor-G," retrieved online at http://www.cs.wisc.edu/condor/condorg/, 2007, 2 pages.
Condor High Throughput Computing, "Condor or Condor-G: Which one is right for me?," retrieved online at http://www.cs.wisc.edu/condor/condorg/versusG.html, 2007, 3 pages.
Condor High Throughput Computing, "DiskRouter," retrieved online at http://www.cs.wisc.edu/condor/diskrouter/, 2007, 1 page.
Condor High Throughput Computing, "Condor Trigger," retrieved online at http://www.cs.wisc.edu/condor/trigger/, 2007, 1 page.
Condor High Throughput Computing, "MW Overview," retrieved online at http://www.cs.wisc.edu/condor/rnw/overview.html, 2007, 3 pages.
Condor, "Birdbath," retrieved online at http://www.cs.wisc.edu/condor/birdbath/, 2006, 1 page.
Condor, "Bypass," retrieved online at http://www.cs.wisc.edulcondor/bypass/, 2007, 2 pages.
Condor, "Chirp," retrieved online at http://www.cs.wisc.edu/condor/chirp/, 2007, 1 page.
Condor, "FTP-Lite," retrieved online at http://www.cs.wisc.edu/condor/ftp_lite/, 2007, 1 page.
Condor, The Grid Console, retrieved online at http://www.cs.wisc.edu/condor/bypasslexamples/grid-console/, 2007, 3 pages.
Condor, "Hawkeye," retrieved online at http://lwww.cs.wisc.edu/condorlhawkeye/, 2007, 4 pages.
Condor, "NeST: Network Storage, Flexible Commodity Storage Appliances," retrieved online at http://www.cs.wisc.edu/condorlnest/, 2007, 3 pages.
Condor, "STORK: A Scheduler for Data Placement Activities in the Grid," retrieved online at http://www.cs.wisc.edu/condor/stork/, 2007, 1 page.
Condor, "Hunting for Wasted Computing Powder, New Software for Computing Networks Puts Idle Pc's to Work," retrieved online at http://www.cs.wisc.edu/condor/doc/WiscIdea.html, 2007, 6 pages.

Frey et al., "Condor-G: A Computation Management Agent for Multi-Institutional Grids," retrieved online at http://www.cs.wisc.edu/condor/doc/condorg-hpdc10.pef, 2007, 9 pages.
GCB: Generic Connection Brokering. retrieved online at http://www.cs.wisc.edu/-sschang/firewalllgcblindex.htm, 2007, 1 page.
Geer, "Taking the Graphics Processor beyond Graphics," retrieved online at http://ieeexplore.ieee.org/iel5/2/32339/01510560.pdf?tp=&isnumber=&arnumber=1510560, 2005, pp. 14-16.
Goux et al., "Metacomputing and the Master-Worker Paradigm," retrieved online at http://citeseer.ist.psu.edu/cache/papers/cs/17913/ftp:zSzzSzinfo.mcs.anl.govzSzpubzSztech_reportszSzreportsSzP792.pdf/goux00metacomputing.pdf, 2000, 12 pages.
Kulkami, "An Intelligent framework for Master-Worker Applications in a dynamic Metacomputing Environment," retrieved online at http://209.85.165.104/search?q=cache:dcoAFCWtFzgJ:www.cs.wisc.edu/condor/mw/masters.doc+An+Intelligent+framework+for+Master-Worker+Applications+in+a+dynamic+Metammputing+Environment&hl=en&ct=clnk&cd=1&gl=us, 2001, 14 pages.
Parker, Ann, "Built for Speed, Graphics Processors for General-Purpose Computing," retrieved online at http://72.14.209.104/search?q=cache:juEMGJAVMUsJ:www.llnl.gov/str/Novembe5/pdfs/11_05.3.pdf+Built+for+Speed,+Graphics+Processors+for+General-Purpose+Computing,&hl=en&ct=clnk&cd=3&gl=us, 2005, 2 pages.
Tutorial: Luebke, "General-Purpose Computation on Graphics Hardware, GPGPU," SIGGRAPH 2004 retrieved online at http://www.gpgpu.org/s2005/slides13, 2005, pp. 80-113.
Tutorial: Thain, "Master-Worker Tutorial, Condor Week 2006," http://www.cs.wisc.edu/condor/CondoNVeek2006/presentations/thain_mw_tutorial.ppt, 2006, 24 pages.
Tutorial: Farrellee, "Developer APIs to Condor + A Tutorial on Condor's Web Service Interface," retrieved online at http://www.cs.wisc.edu/condor/CondoNVeek2006/presentations/farrellee_tannenba_APIs.ppt, 2006, 44 pages.
Wilson et al., "How Graphics Cards Work," retrieved online at http://computer.howstuffowrks.com/graphics-card.htm, 2007, 3 pages.
U.S. Appl. No. 12/181,815, entitled "Client Program Executable on Multiple Heterogeneous Server Platforms", by Webb et al., 70 pages.
U.S. Appl. No. 12/181,815 entitled "Client Program Executable on Multiple Heterogeneous Server Platforms", by Webb et al., 70 pages.
Office Action from U.S. Appl. No. 12/254,584, dated Dec. 30, 2011, 12 pages.
Office Action from U.S. Appl. No. 12/254,578, dated Dec. 21, 2011, 12 pages.
Husbands, P.J.R.: "Interactive Supercomputing", Doctoral Thesis; Department of Electrical Engineering and Computer Science, Massachusetts Institute of Technology, Jan. 1999, 96 pages.
U.S. Appl. No. 12/254,578, filed Oct. 20, 2008, entitled "Device for Using Parallel Processing Constructs", by Halldor N. Stefansson et al., 80 pages, 33 pages of drawings.
U.S. Appl. No. 12/254,584, filed Oct. 20, 2008, entitled "Media for Using Parallel Processing Constructs", by Halldor N. Stefansson et al., 80 pages, 33 pages of drawings.
Notification of Transmittal of the International Search Report and the Written Opinion of the International Searching Authority, or the Declaration, corresponding to PCT/US2009/044377, mailed Nov. 18, 2009, 20 pages.
Mitsuhisa Sato et al., "Design of OpenMP Compiler for an SMP Cluster", Proceedings of the First European Workshop on OpenMP (EWOMP'99), Lund University, http://www.compunity.org/events/pastevents/ewomp1999/sato.pdf, XP002549076, 1999, Sectiosn 2.1, 2.2. and 3.1.
Jim Savage, "Parallel Processing as a Language Design Problem", IEEE Computer Society Press, 1985, XP002549075, pp. 221-224.
The Mathworks, "MATHLAB—Distributed Computing Toolbox 3—User's Guide", Sep. 2007, XP007909781, 487 pages.

(56) References Cited

OTHER PUBLICATIONS

P. Crooks et al., "Language Constructs for Data Partitioning and Distribution," IOS Press, vol. 4, No. 2, Jun. 1995, XP009122848, pp. 59-85.

Clapp et al., "Parallel language constructs for parallel processing", IEEE, pp. 230-241, 1992.

Nichols et al., "Data management and control flow aspects of an SIMD/SPMD parallel language/compiler", IEEE, vol. 4, No. 2, pp. 222-234, 1993.

Zhang et al., "Intelligent allocation algorithms based on parallel processing technology of the computer loads", IEEE, pp. 778-781, 2010.

Warneke, "Exploiting dynamic resources allocation for efficient parallel data processing in the cloud", IEEE, vol. 22, No. 6, pp. 985-997, 2011.

Liu et al., "PLDA+, Parallel latent dirichlet allocation with data placement and pipeline processing", ACM Trans. on Intelligent Sys. and Tech., vol. 2, No. 3, article 26, pp. 1-18, 2011.

Zhou et al., "Implementing database operations using SIMD instructions", ACM SIGMOD, pp. 145-156, 2002.

OpenMP Architecture Review Board: "OpenMP Application Program Interface—Version 2.5", May 2005, XP055063668; Retrieved from the Internet: URL: http://www.openmp.org/mp-documents/spec25.pdf [retrieved on May 22, 2013].

* cited by examiner

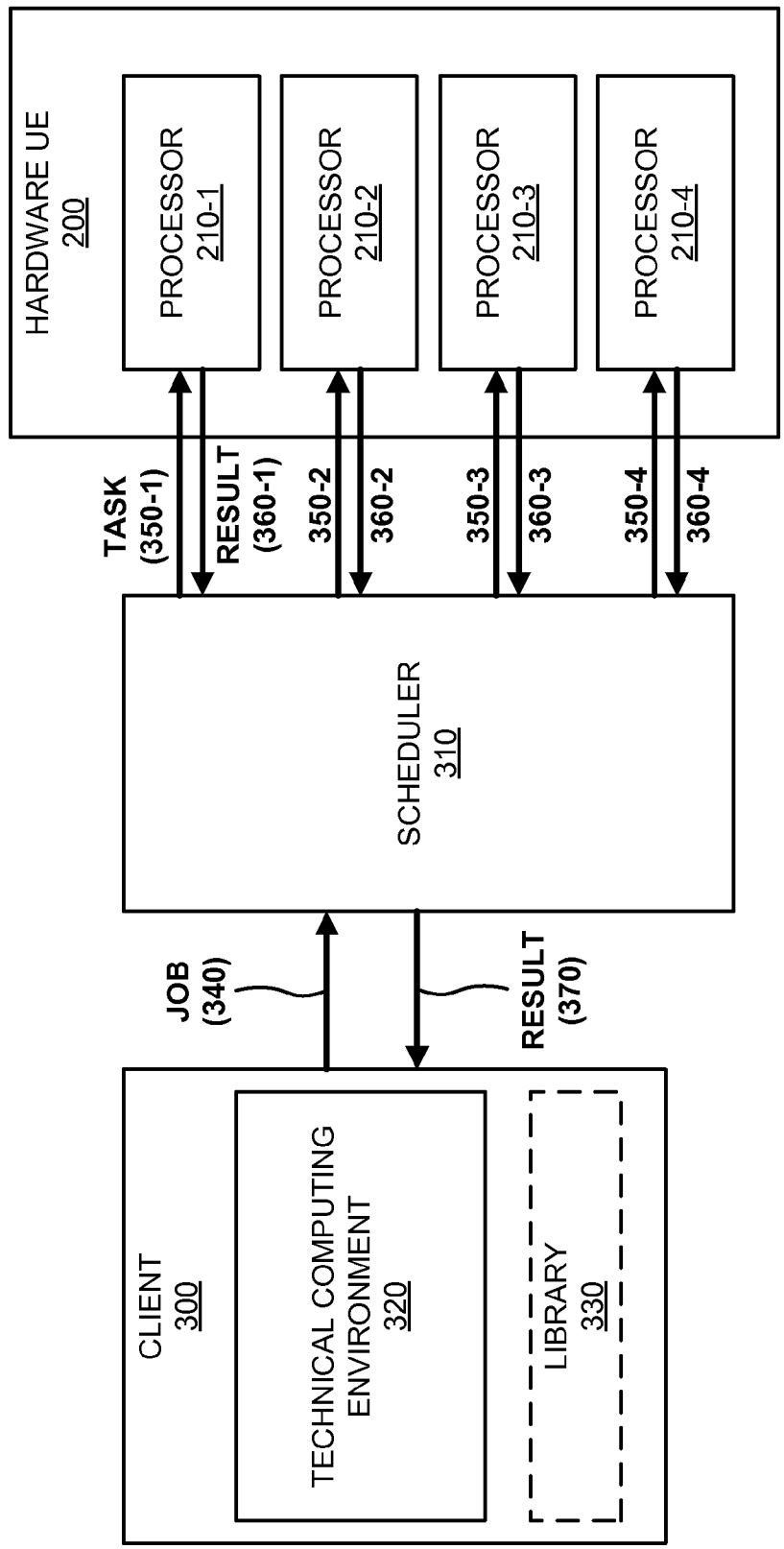

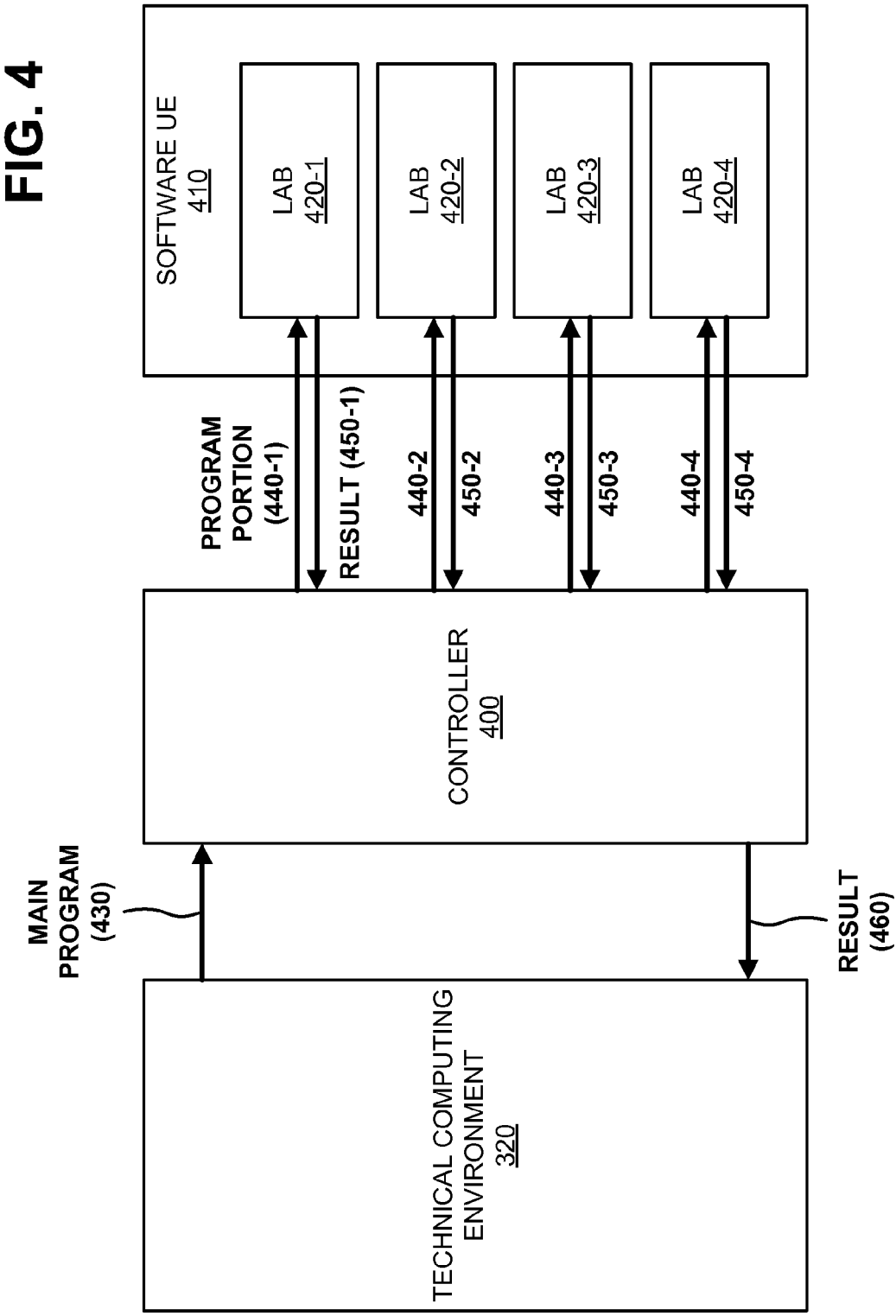

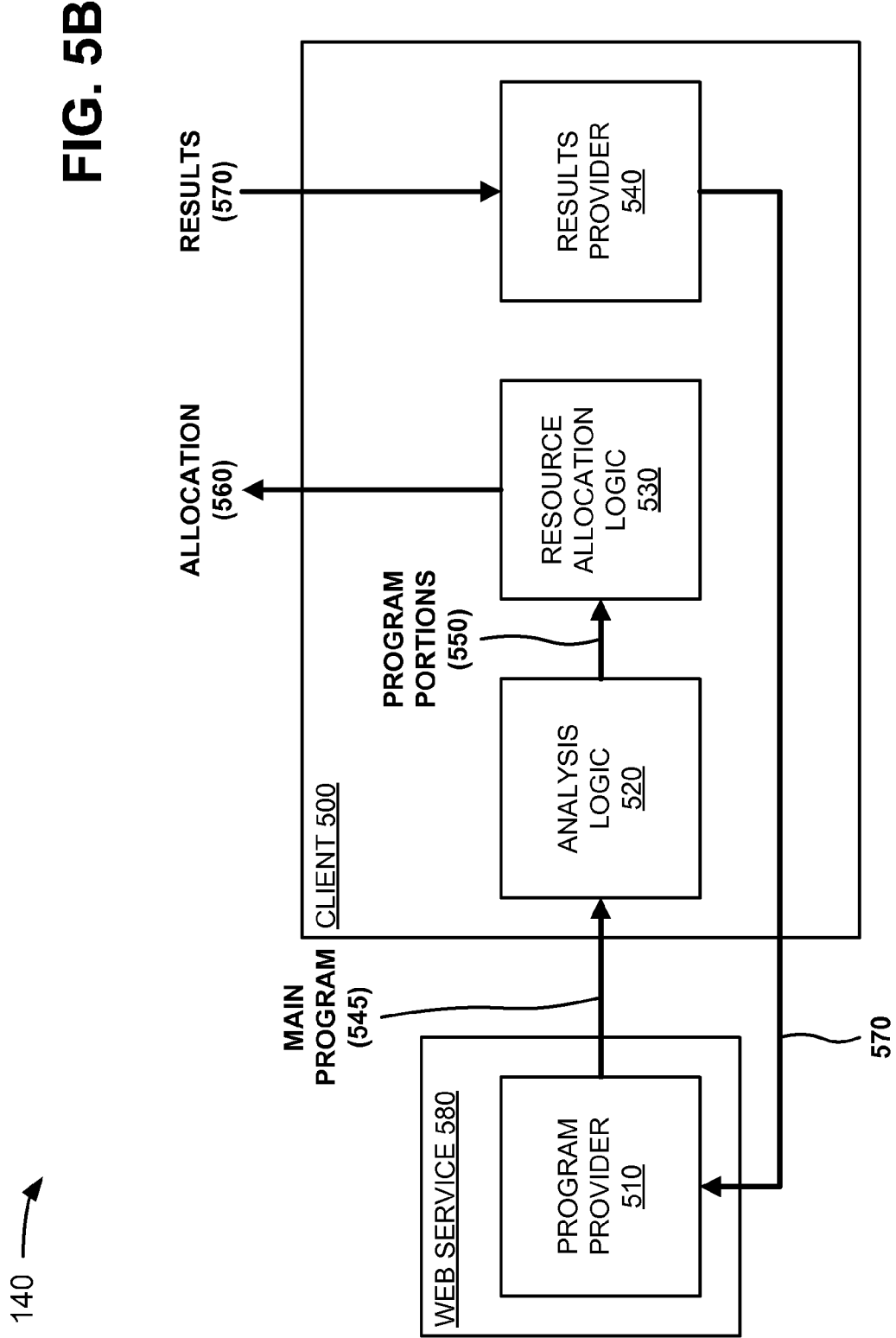

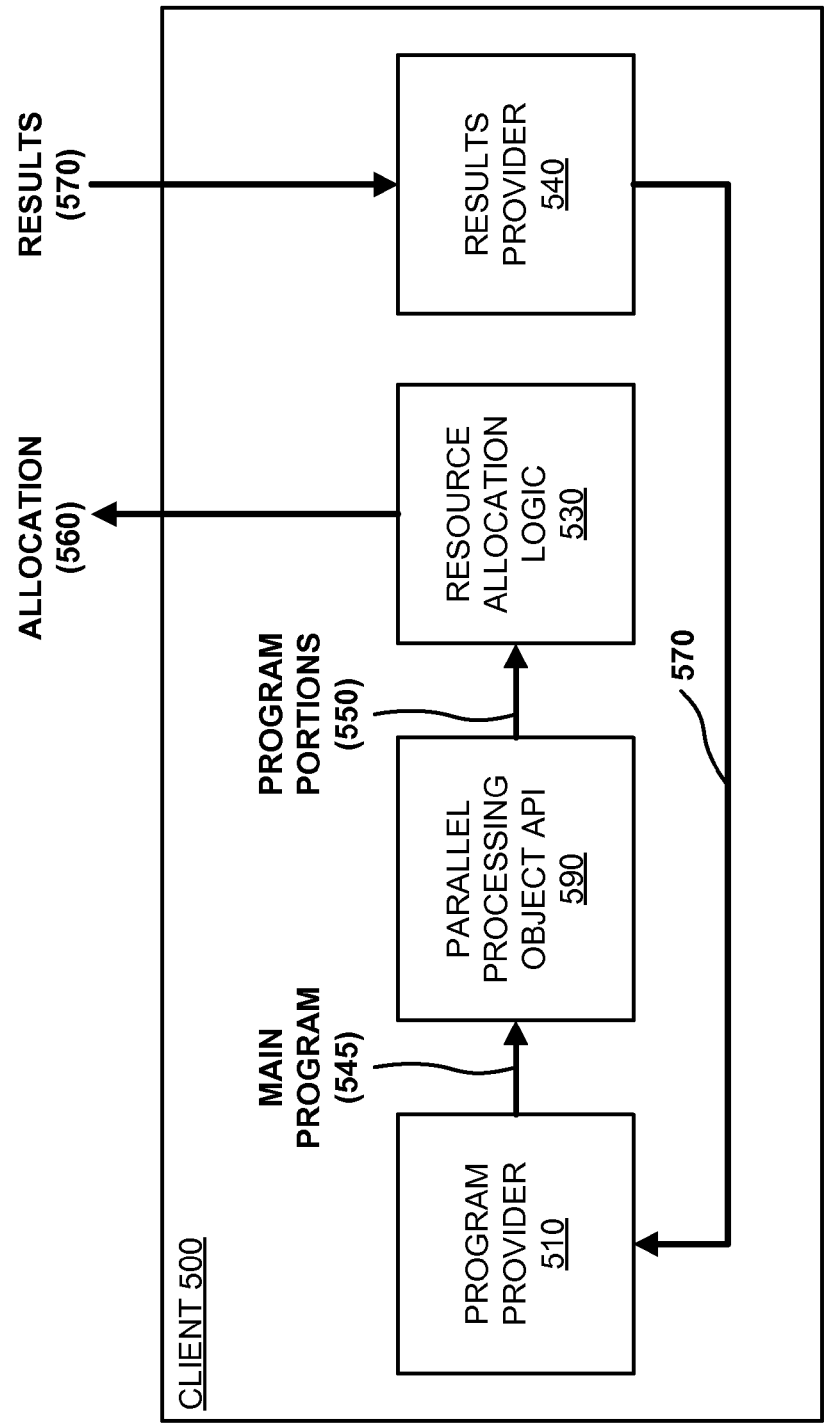

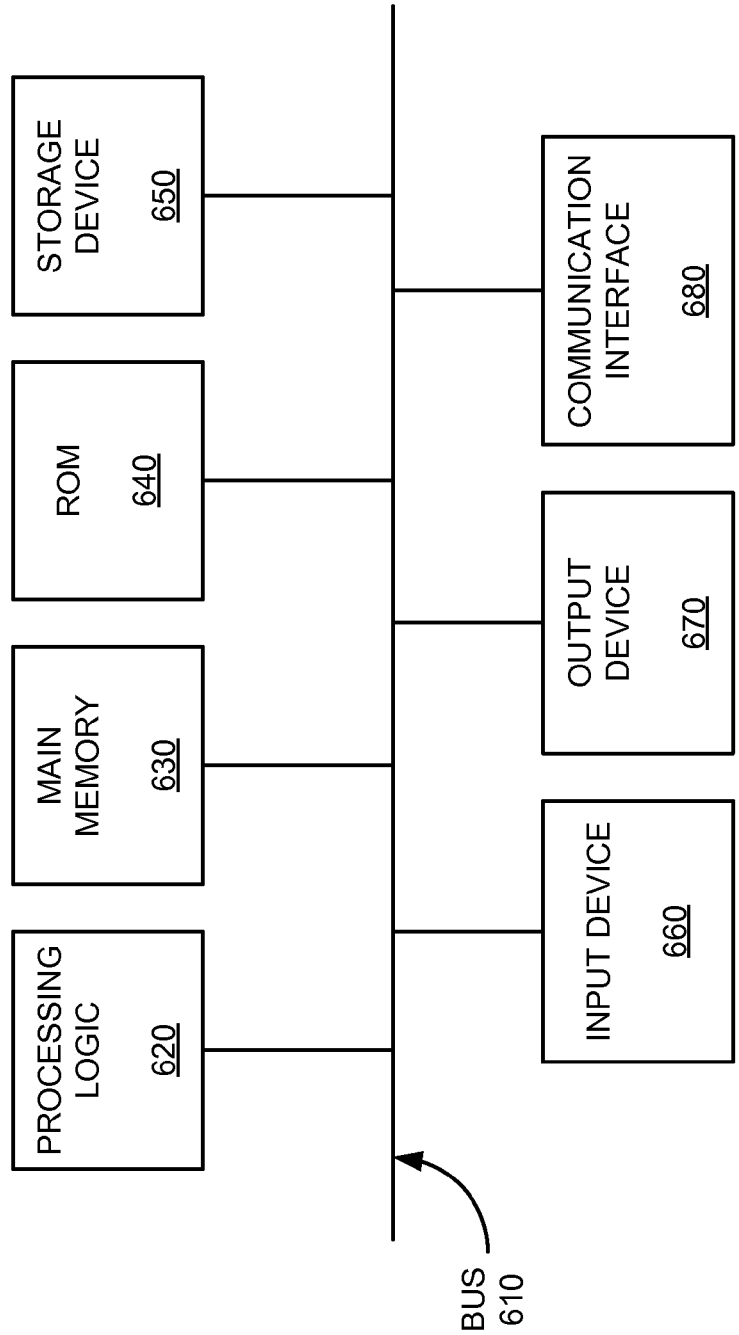

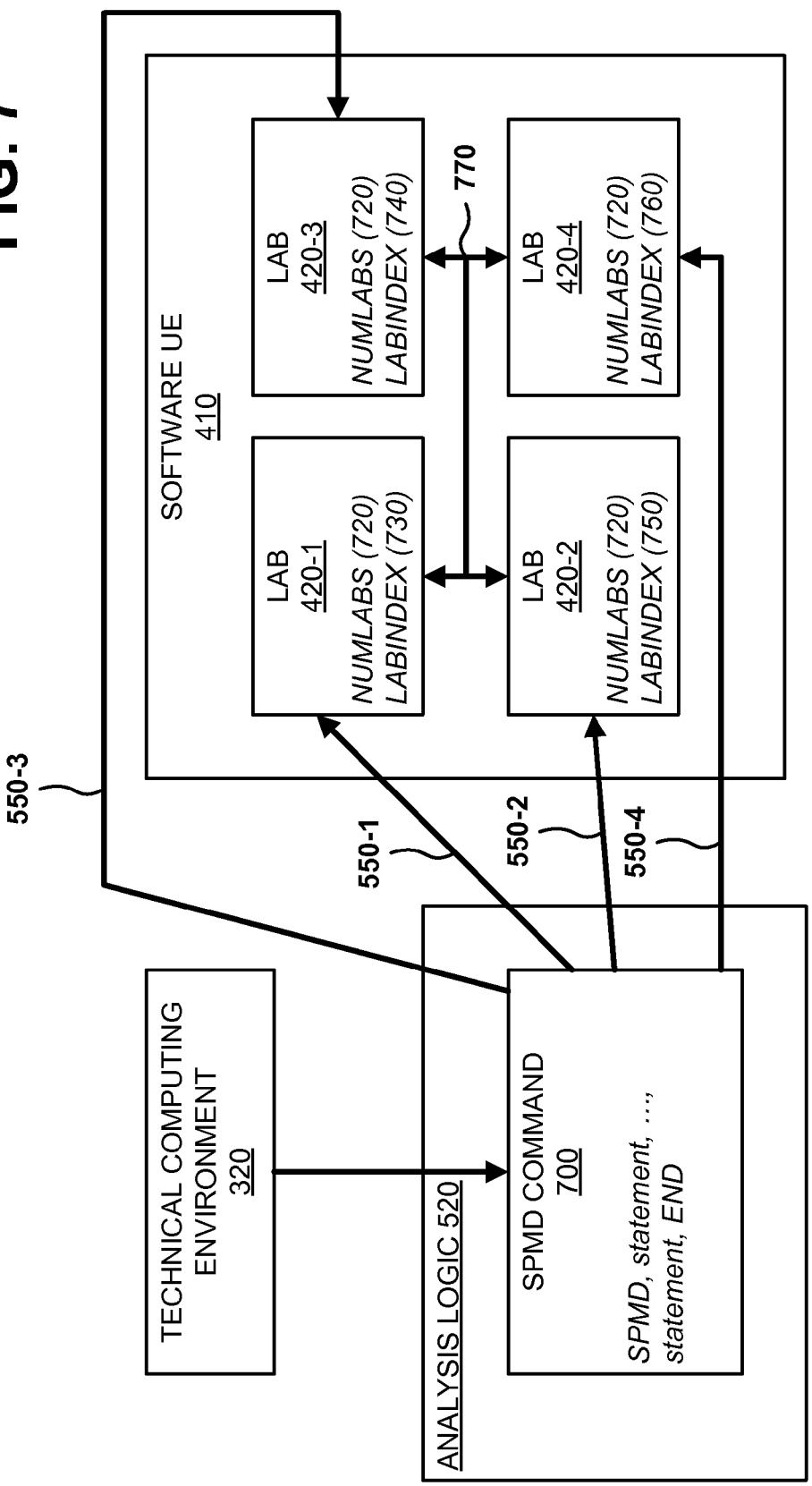

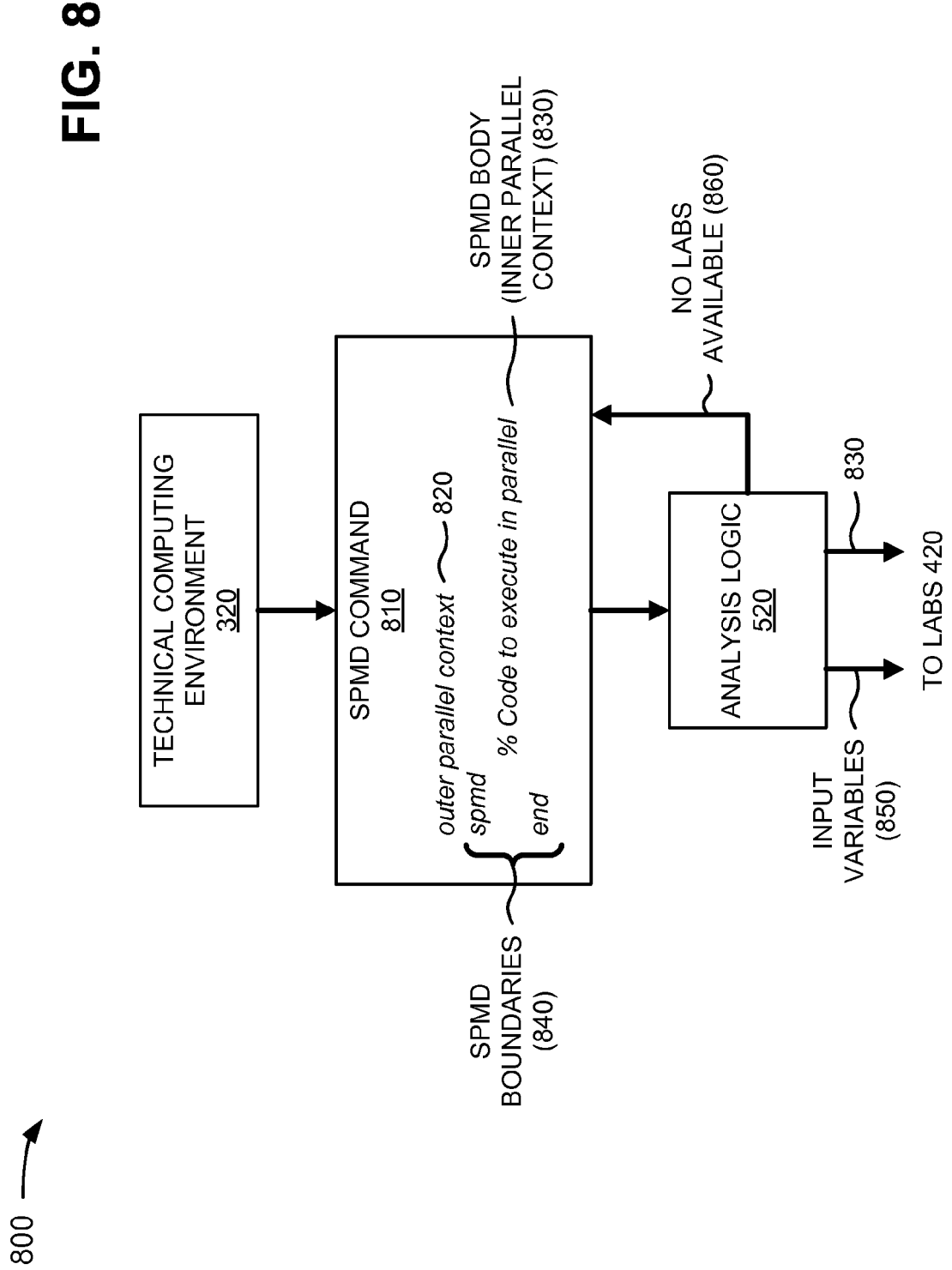

FIG. 13

1300 → x HAS SAME VALUE, CLASS, ATTRIBUTES AFTER end

DISCARD COMPLETE OUTPUT VARIABLES (x)

INCOMPLETE OUTPUT VARIABLES (y) ARE INCOMPLETE VARIANTS

**CROSSING *spmd*: INPUT VARIABLES 1310**

```
x = rand(1000);
spmd
    y = x*2;
end
spmd
    z = x*3;
end
```

**CROSSING *end*: VARIANTS POINTING TO OUTPUT VARIABLES 1320**

```
spmd
    x = 1;
end
class(x) == 'variant' %
Returns true
```

**CROSSING *end*: COMPLETE/ INCOMPLETE OUTPUT VARIABLES 1330**

```
spmd
    x = 1;
end
% y is undefined
spmd
    y = 1;
end
```

**CROSSING *end*: MORE COMPLETE VARIANT OUTPUT VARIABLES 1340**

```
spmd
    if labindex > 5
        x = 1;
    end
    if rand > 5
        y = 1;
    end
end
% x has value 1 on
labs > 5 and 0 on labs
<= 5; y = 0 on all labs
```

**CROSSING *end*: DISALLOW VARIANTS TO VARIANTS 1350**

```
spmd
    spmd
        x = 1;
    end
end
% Getting value of x
and using x as input
variable gener. errors
```

**CROSSING *spmd*: VARIANTS AS INPUT VARIABLES 1360**

*If input reference variable in outer context holds reference to value, input variable in inner context stores value, otherwise input variable is undefined.*

**CROSSING *spmd*: NON-VARIANTS AS INPUT VARIABLES 1370**

*A non-variant input variable has the following properties when crossing spmd: it exists, it stores the same value, and has the same class and attributes as in outer parallel context.*

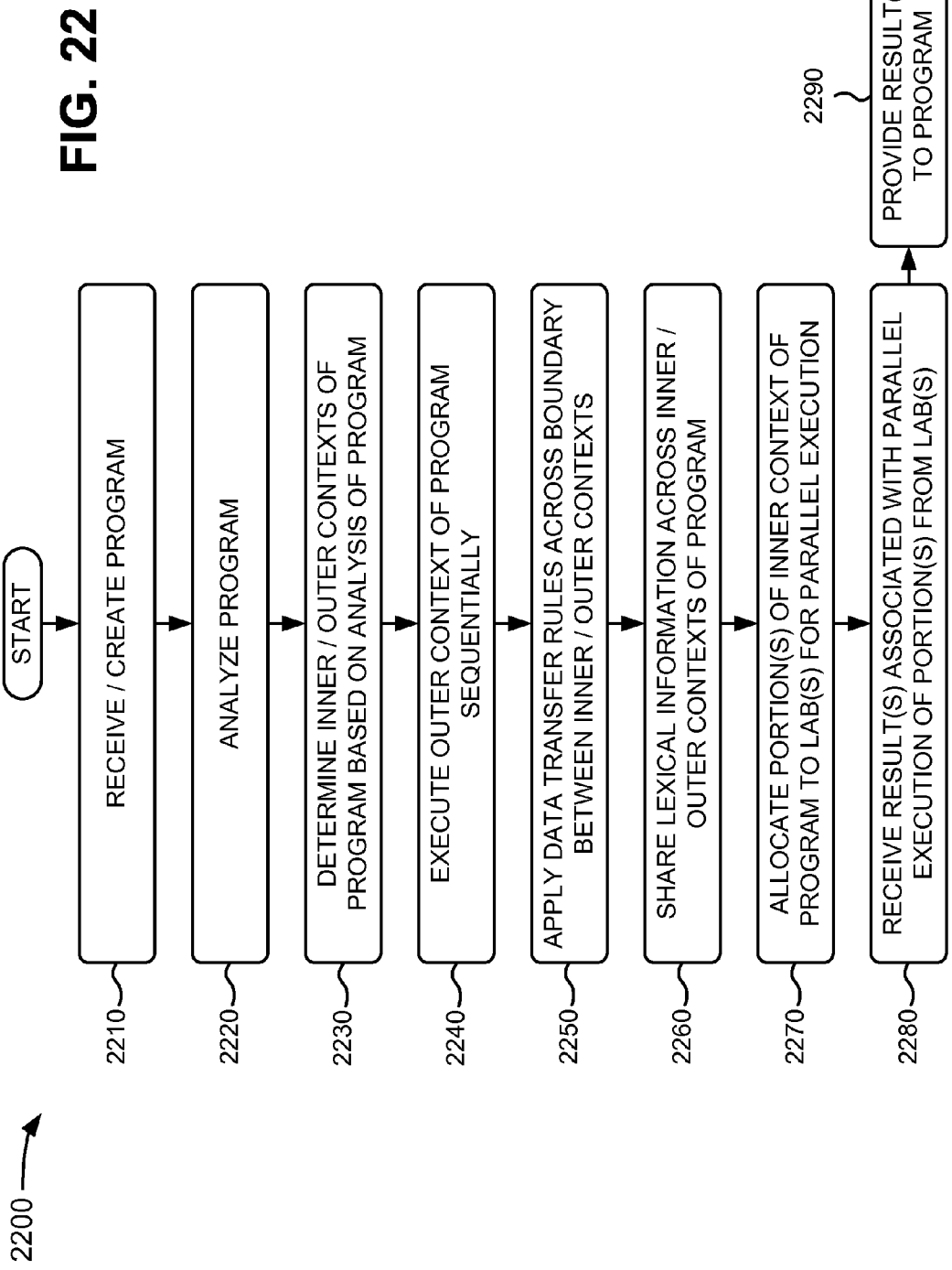

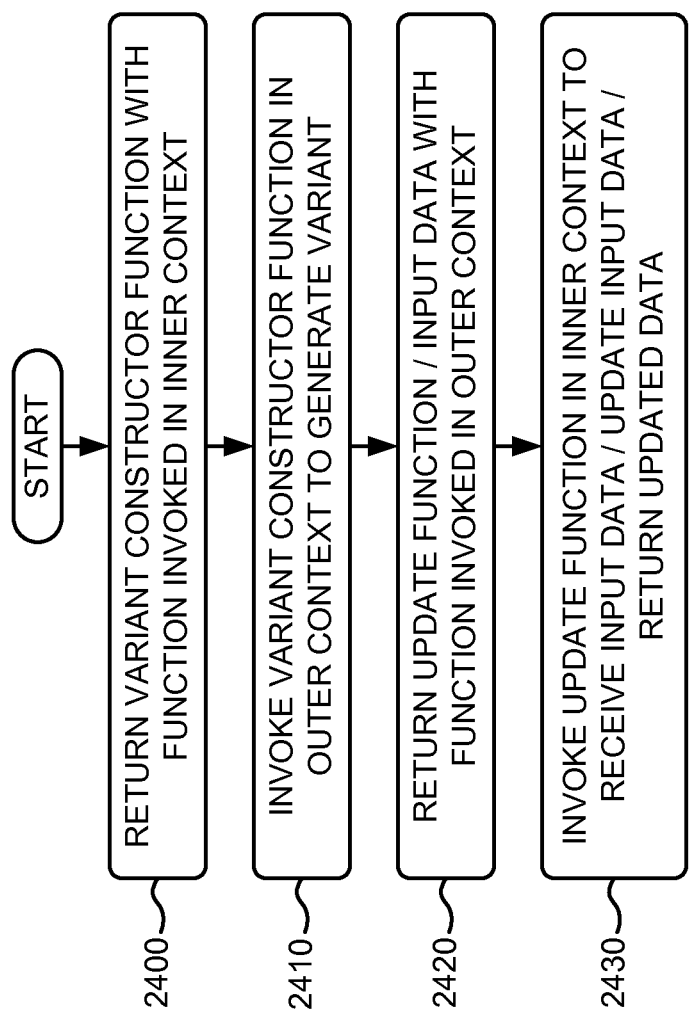

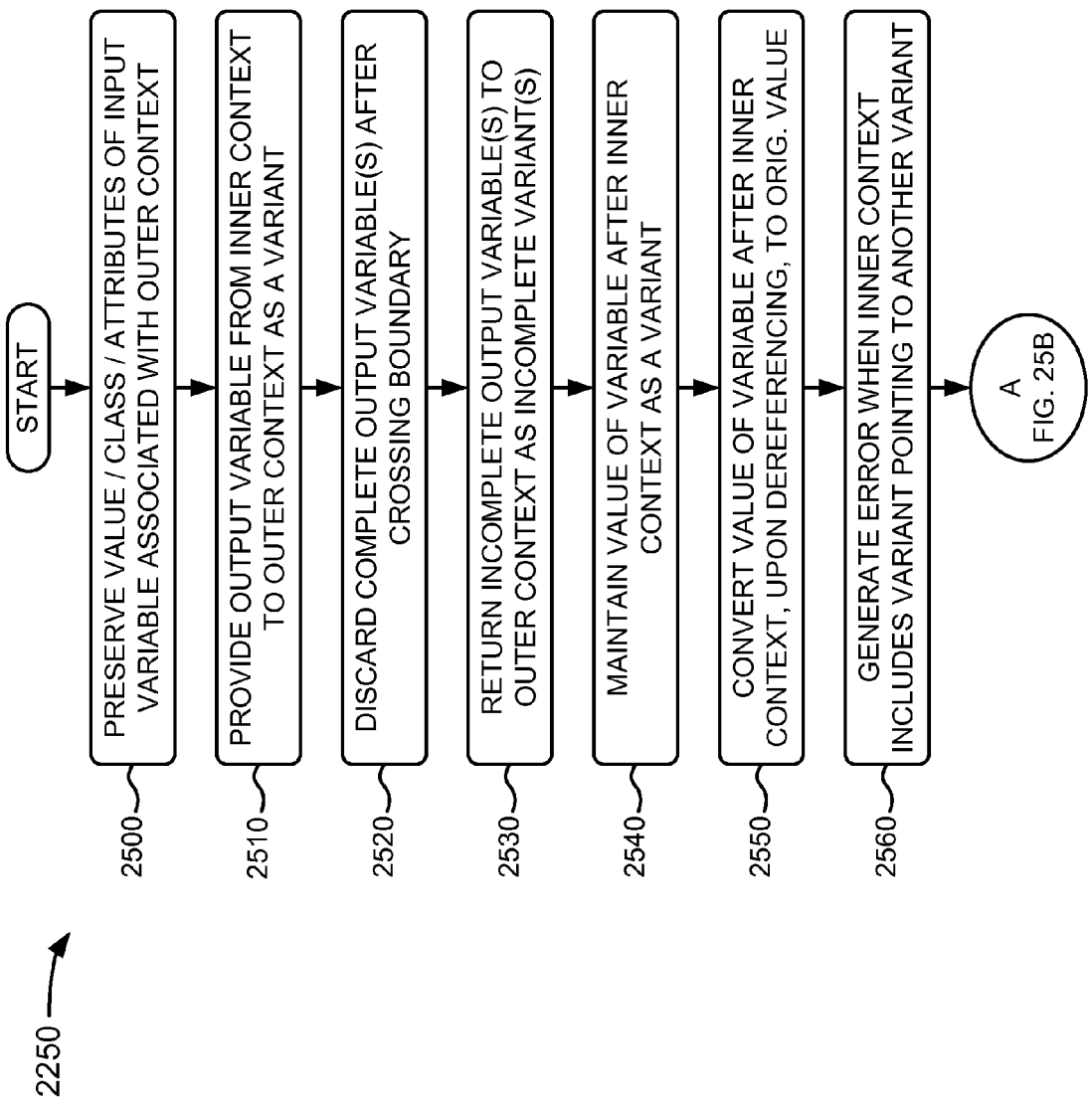

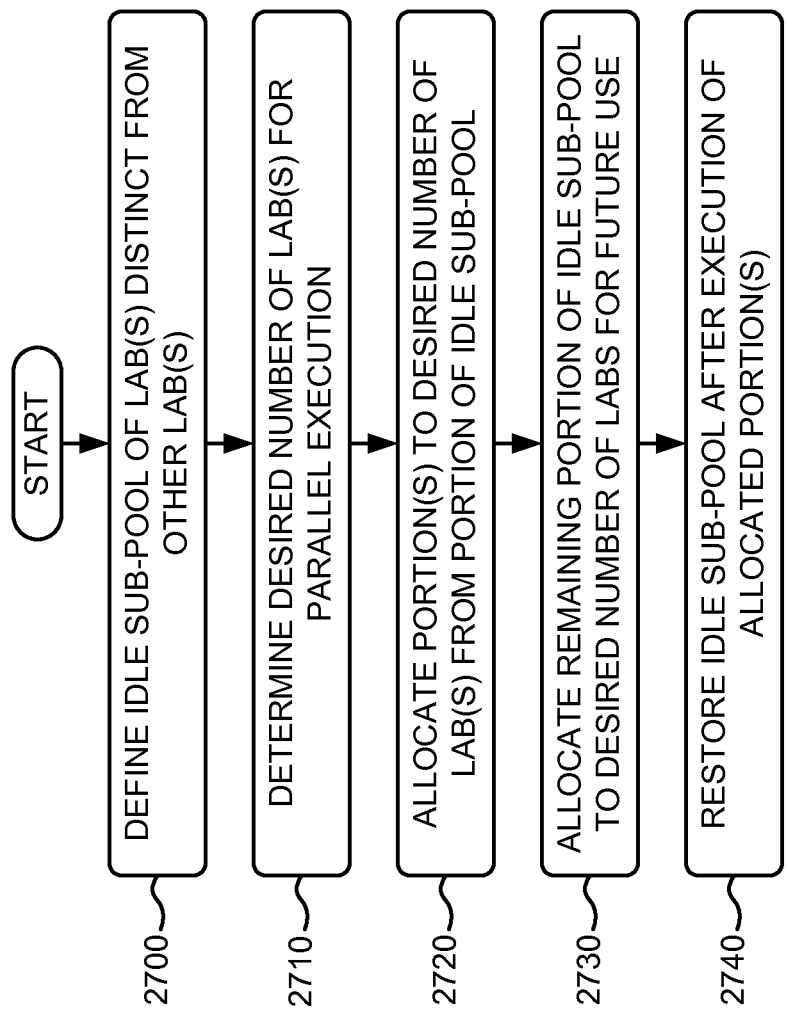

USING PARALLEL PROCESSING CONSTRUCTS AND DYNAMICALLY ALLOCATING PROGRAM PORTIONS

RELATED APPLICATIONS

This application is a continuation of U.S. patent application Ser. No. 12/254,572, filed Oct. 20, 2008, which is a continuation-in-part of U.S. patent application Ser. No. 11/748,938, filed May 15, 2007, which is a continuation-in-part of U.S. patent application Ser. No. 11/706,805, filed Feb. 14, 2007. U.S. patent application Ser. No. 12/254,572 is also a continuation-in-part of U.S. patent application Ser. No. 11/748,947, filed May 15, 2007, which is a continuation-in-part of U.S. patent application Ser. No. 11/706,805, filed Feb. 14, 2007. U.S. patent application Ser. No. 12/254,572 further claims priority under 35 U.S.C. §119 based on U.S. Provisional Patent Application Nos. 61/054,292 and 61/054,295, filed May 19, 2008. The entire contents of U.S. patent application Ser. Nos. 11/748,938, 11/748,947, 11/706,805, and 12/254,572 and U.S. Provisional Patent Application Nos. 61/054,292 and 61/054,295 are hereby incorporated by reference.

BACKGROUND

Closely-coupled processors or hardware resources will likely become widely available within the near future. Examples of such closely-coupled processors (or hardware resources) may include additional processors, threads in a particular processor, additional cores in a central processing unit, additional processors mounted on the same substrate or board, and/or such devices provided within computers connected by a network fabric into a cluster, a grid, or a collection of resources.

Certain computations (e.g., parallel processing or parallel programming) may benefit from the availability of such hardware resources. For example, a complex simulation may run faster if the simulation is divided into portions and the portions are simultaneously run on a number of processing devices in a parallel fashion. Parallel computing arrangements may include a controller that determines how an application should be divided and what application portions go to which parallel processors. For example, a host computer that is running a simulation may act as the controller for a number of parallel processors.

Parallel processors may receive instructions and/or data from the controller and may return a result to the controller. Some parallel processing language constructs provide lexical context, associated with multiple processes, in a single process. Other parallel processing language constructs support distributed processing, but may fail to provide control over where data is stored. Still other parallel processing languages can only call functions in parallel.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 3 depicts an exemplary diagram of a batch (or distributed computing) environment illustrated in FIG. 1;

FIG. 4 illustrates an exemplary diagram of a parallel processing environment depicted in FIG. 1;

FIG. 5B illustrates an exemplary diagram of functional components of the parallel processing interface in an alternative arrangement;

FIG. 5C depicts an exemplary diagram of functional components of the parallel processing interface in another alternative arrangement;

FIG. 6 illustrates exemplary hardware components of a client and/or a web service depicted in FIGS. 5A and 5B;

FIG. 7 depicts an exemplary parallel processing construct capable of being analyzed and transformed to parallel program portions by the analysis logic depicted in FIGS. 5A and 5B;

FIG. 8 illustrates an exemplary diagram of a parallel processing construct capable of being generated by a technical computing environment depicted in FIG. 7;

FIGS. 22-28 depict flow charts associated with an exemplary process according to implementations described herein.

DETAILED DESCRIPTION

Figure 1:
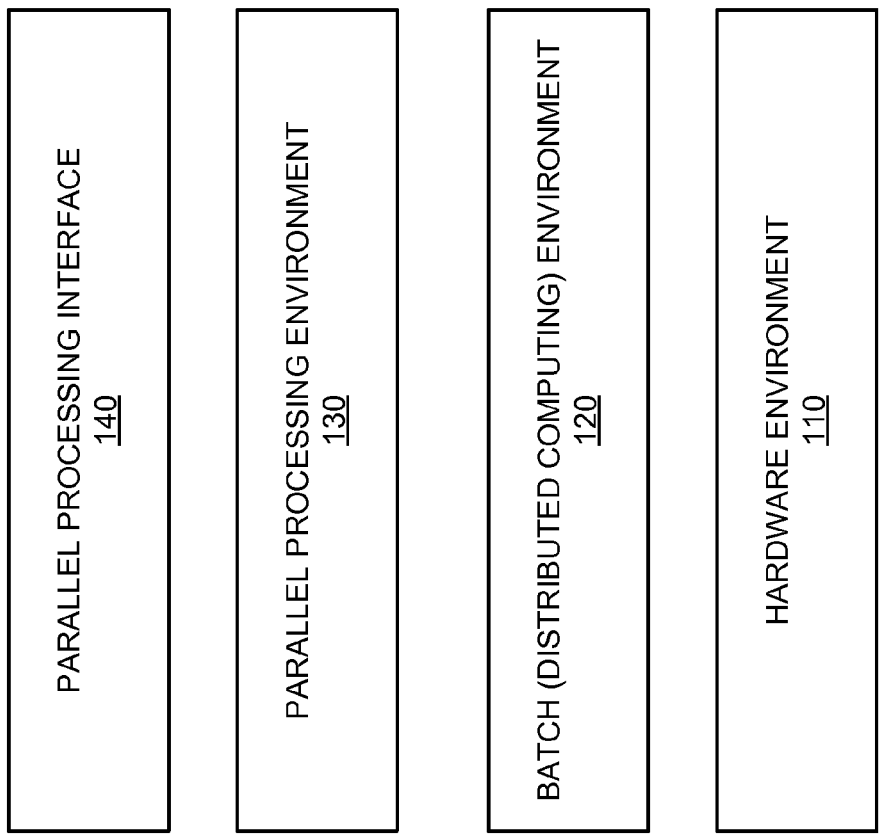
FIG. 1 depicts an exemplary diagram of an architectural overview in which implementations described herein may be practiced.

The following detailed description refers to the accompanying drawings. The same reference numbers in different drawings may identify the same or similar elements. Also, the following detailed description does not limit the invention.

Overview

Implementations described herein may provide systems and/or methods for performing parallel processing. For example, in one implementation, the systems and/or methods may receive a program created for a technical computing environment, may analyze the program, and may determine an inner context and an outer context of the program based on the analysis of the program. The systems and/or methods may allocate one or more portions of the inner context of the program to two or more labs for parallel execution, and may receive one or more results associated with the parallel execution of the one or more portions from the two or more labs. The systems and/or methods may further provide the one or more results to the program (e.g., to the outer context of the program).

A lab may include hardware, software, and/or combination of hardware and software that performs and/or participates in parallel processing activities. For example, a lab may perform and/or participate in parallel processing activities in response to a request and/or a task received from a client. In one example, a lab may be implemented as a software unit of execution and/or a hardware unit of execution. A lab may perform and/or participate in substantially any type of parallel processing (e.g., task, data, and/or stream processing). In one example, a lab may perform and/or participate in parallel processing activities in response to a receipt of a program and/or one or more portions of the program. A lab may support one or more threads (or processes) when performing processing operations.

Parallel processing may include any type of processing that can be distributed across two or more resources (e.g., software units of execution, hardware units of execution, processors, microprocessors, clusters, labs, etc.) and be performed at substantially the same time. For example, in one implementation, parallel processing may refer to task parallel processing where a number of tasks are processed at substantially the same time on a number of software units of execution. In task parallel processing, each task may be processed independently of other tasks executing at the same time (e.g., a first software unit of execution executing a first task may not communicate with a second software unit of execution executing a second task). In another implementation, parallel processing may refer to data parallel processing, where data (e.g., a data set) is parsed into a number of portions that are executed in parallel using two or more software units of execution. In data parallel processing, the software units of execution and/or the data portions may communicate with each other as processing progresses. In still another implementation, parallel processing may refer to stream parallel processing (also referred to as pipeline parallel processing). Stream parallel processing may use a number of software units of execution arranged in series (e.g., a line) where a first software unit of execution produces a first result that is fed to a second software unit of execution that produces a second result. Stream parallel processing may also include a state where task allocation may be expressed in a directed acyclic graph (DAG) or a cyclic graph with delays. Other implementations may combine two or more of task, data, or stream parallel processing techniques alone or with other types of processing techniques to form hybrid-parallel processing techniques.

A parallel processing environment may include any environment capable of performing parallel processing. For example, a parallel processing environment may include a dynamic number of processes provided on one or more hardware, software, and/or a combination of hardware and software units of execution which may have several different control and data passing layers through which a current behavior of a part or a whole of the environment may be specified. In one implementation, a front-end application (e.g., a parallel processing interface) may interface with the parallel processing environment to provide one or more users with access to the parallel processing environment. In another implementation, the processes involved in the parallel processing environment may include processes associated with a technical computing environment.

A technical computing environment (TCE) may include any hardware, software, and/or a combination of hardware and software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a TCE may include a dynamically-typed programming language (e.g., the M language or MATLAB® language) that can be used to express problems and/or solutions in mathematical notations. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, parallel processing, etc.). In another implementation, a TCE may provide these functions as block sets. In still another implementation, a TCE may provide these functions in another way, such as via a library, etc.

A TCE may be implemented as a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Exemplary Architectural Overview

FIG. 1 is an exemplary diagram of an architectural overview 100 in which implementations described herein may be practiced. As illustrated, overview 100 may include a hardware environment 110, a batch (or distributed computing) environment 120, a parallel processing environment 130, and/or a parallel processing interface 140.

Hardware environment 110 may include one or more hardware resources that may be used to perform parallel processing. For example, in one implementation, hardware environment 110 may include one or more hardware units of execution. Further details of hardware environment 110 are provided below in connection with FIG. 2.

Batch environment 120 may provide a distributed computing environment for a job. For example, in one implementation, batch (or distributed computing) environment 120 may include a client that provides a job to a scheduler. The scheduler may distribute the job into one or more tasks, and may provide the tasks to one or more hardware units of execution and/or one or more processors. The hardware units of execution and/or processors may execute the tasks, and may provide results to the scheduler. The scheduler may combine the results into a single result, and may provide the single result to the client. Further details of batch environment 120 are provided below in connection with FIG. 3.

Parallel processing environment 130 may provide parallel processing for a main program. For example, in one implementation, parallel processing environment 130 may include a technical computing environment that provides a main program to a controller. The controller may provide portions of the program to one or more software units of execution and/or one more labs. The software units of execution and/or labs may execute the program portions, and may provide results to the controller. The controller may combine the results into a single result, and may provide the single result to the technical computing environment. Further details of parallel processing environment 130 are provided below in connection with FIG. 4.

Parallel processing interface 140 may include a front-end application (e.g., an application program interface (API)) that provides an interface for dynamically accessing, controlling, utilizing, etc. hardware environment 110, batch environment 120, and/or parallel processing environment 130. For example, in one implementation, parallel processing interface 140 may include parallel processing constructs that permit users to express specific parallel workflows. In such an implementation, parallel processing interface 140 may include a program provider that provides a main program to analysis logic. The analysis logic may analyze the main program, may parse the main program into program portions, and may provide the program portions to resource allocation logic. The resource allocation logic may allocate the program portions to one or more software units of execution and/or hardware units of execution. The program portions may be executed, and results may be provided to the program provider. In another implementation, parallel processing interface 140 may include an object API where a user may specify how a program may be parallelized. Further details of parallel processing interface 140 are provided below in connection with FIGS. 5A-5C.

Although FIG. 1 shows exemplary components of architectural overview 100, in other implementations, architectural overview 100 may contain fewer, different, or additional components than depicted in FIG. 1.

Exemplary Hardware Environment

Figure 2:
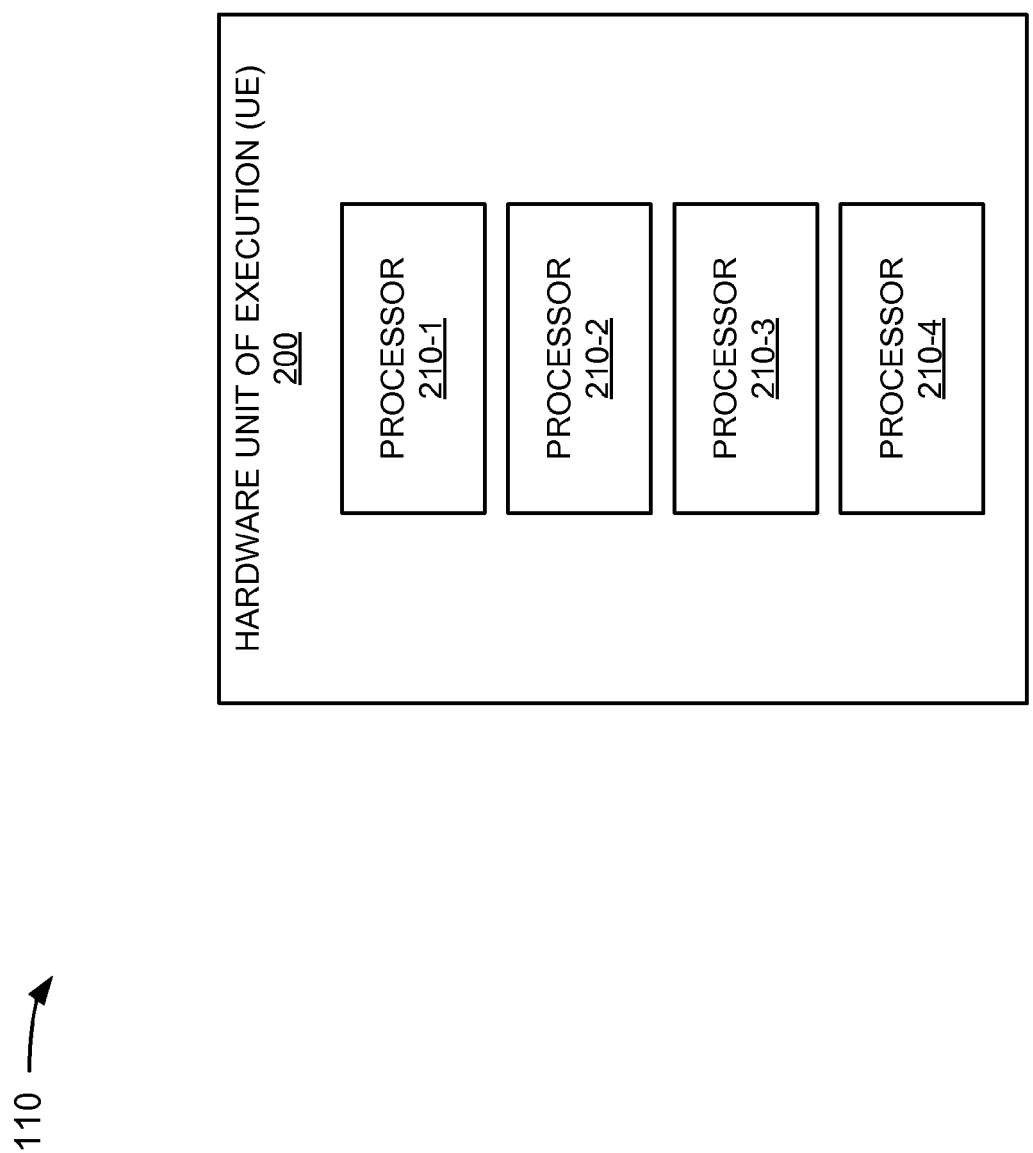
FIG. 2 illustrates an exemplary diagram of a hardware environment depicted in FIG. 1.

FIG. 2 is an exemplary diagram of hardware environment 110. As illustrated, hardware environment 110 may include a hardware unit of execution (UE) 200 with one or more processors 210-1, 210-2, 210-3, 210-4 (collectively, "processors 210").

A hardware unit of execution may include a device (e.g., a hardware resource) that performs and/or participates in parallel processing activities. For example, a hardware unit of execution may perform and/or participate in parallel processing activities in response to a request and/or a task received from a client. A hardware unit of execution may perform and/or participate in substantially any type of parallel processing (e.g., task, data, and/or stream processing) using one or more devices. For example, in one implementation, a hardware unit of execution may include a single processor that includes multiple cores and in another implementation, the hardware unit of execution may include a number of processors. Devices used in a hardware unit of execution may be arranged in substantially any configuration (or topology), such as a grid, ring, star, etc. A hardware unit of execution may support one or more threads (or processes) when performing processing operations.

In one implementation, hardware UE 200 may perform parallel processing activities on behalf of another device. In another implementation, hardware UE 200 may perform parallel processing activities on behalf of itself or on behalf of a host of which hardware UE 200 is a part. Hardware UE 200 may perform parallel processing in a variety of ways. For example, hardware UE 200 may perform parallel processing activities related to task parallel processing, data parallel processing, stream parallel processing, etc. Hardware UE 200 may perform parallel processing using processing devices resident on UE 200 and/or using processing devices that are remote with respect to UE 200.

As further shown in FIG. 2, hardware UE 200 may include processors 210-1, 210-2, 210-3, and 210-4. Processors 210 may include hardware, software, and/or a combination of hardware and software based logic that performs processing operations. Processors 210 may include substantially any type of processing device, such as a central processing unit (CPU), a microprocessor, a field programmable gate array (FPGA), an application specific integrated circuit (ASIC), a micro electrical mechanical switch (MEMS), a general purpose graphical processing unit (GPGPU), an optical processor, etc. In one implementation, each processor 210-1 through 210-4 may include a single core processor or a multi-core processor. In another implementation, each processor 210-1 through 210-4 may include a single processing device or a group of processing devices, such as a processor cluster or a computing grid. In still another implementation, each processor 210-1 through 210-4 may include multiple processors that may be local or remote with respect each other, and may use one or more threads while processing. In a further implementation, each processor 210-1 through 210-4 may represent a single hardware UE.

Although FIG. 2 shows exemplary components of hardware environment 110, in other implementations, hardware environment 110 may contain fewer, different, or additional components than depicted in FIG. 2. For example, in one implementation, hardware environment 110 may include one or more of a bus, a main memory, a read-only memory (ROM), a storage device, an input device, an output device, and/or a communication interface. In still other implementations, one or more components of hardware environment 110 may perform one or more other tasks described as being performed by one or more other components of hardware environment 110.

Exemplary Batch Environment

FIG. 3 is an exemplary diagram of batch environment 120. As illustrated, batch environment 120 may include a client 300, a scheduler 310, and hardware UE 200 (including processors 210). Hardware UE 200 and processors 210 may perform the same or similar tasks as described above in connection with FIG. 2.

Client 300 may include one or more entities. An entity may be defined as a device, such as a personal computer, a personal digital assistant (PDA), a laptop, or another type of computation or communication device, a thread or process running on one of these devices, and/or an object executable by one of these devices. In an exemplary implementation, client 300 may include a device capable of sending information to, or receiving information, from another device, such as hardware UE 200. As shown in FIG. 3, client 300 may include a technical computing environment (TCE) 320 and a library 330. Other implementations of client 300 may contain fewer, different, or additional components than depicted in FIG. 3.

Technical computing environment (TCE) 320 may include any of the features described above with respect to the term "technical computing environment."

Library 330 may include hardware, software, and/or a combination of hardware and software based logic that may operate with TCE 320 to perform certain operations. For example, in one implementation, library 330 may store functions to perform certain operations (e.g., signal processing, image processing, parallel processing, data display, etc.) in a text-based environment. In another implementation, library 140 may store graphical representations (e.g., blocks, icons, images, etc.) to perform certain operations in a graphically-based environment (e.g., a gain block, a source block, a filter block, a discrete event generator block, etc.).

Scheduler 310 may include hardware, software, and/or a combination of hardware and software based logic to perform scheduling operations on behalf of a device (e.g., client 300). For example, scheduler 310 may perform operations to select and/or control parallel processing activities performed by hardware UE 200 on behalf of client 300. In one implementation, scheduler 310 may receive a job 340, and may distribute or divide job 340 into tasks (e.g., tasks 350-1, 350-2, 350-3, and 350-4). Scheduler 310 may send tasks 350-1, 350-2, 350-3, and 350-4 to hardware UE 200 (e.g., to processor 210-1, 210-2, 210-3, and 210-4, respectively) for execution. Scheduler 310 may receive results from hardware UE 200 (e.g., results 360-1, 360-2, 360-3, and 360-4), may assemble the results into a single result 370, and may provide result 370 to client 300. Scheduler 310 may reside locally on client 300 or may be located remotely with respect to client 300 depending on particular implementations described herein.

Although FIG. 3 shows exemplary components of batch environment 120, in other implementations, batch environment 120 may contain fewer, different, or additional components than depicted in FIG. 3. In still other implementations, one or more components of batch environment 120 may perform one or more other tasks described as being performed by one or more other components of batch environment 120.

Exemplary Parallel Processing Environment

FIG. 4 is an exemplary diagram of parallel processing environment 130. As illustrated, parallel processing environment 130 may include technical computing environment 320, a controller 400, and a software unit of execution (UE) 410. Technical computing environment 320 may include any of the features described above with respect to the term "technical computing environment."

Controller 400 may include hardware, software, and/or a combination of hardware and software based logic to perform controlling operations on behalf of a program. For example, in one implementation, controller 400 may select and/or control parallel processing activities performed by software UE 410 on behalf of technical computing environment 320.

A software unit of execution may include a software resource (e.g., a worker, a lab, etc.) that performs and/or participates in parallel processing activities. For example, a software unit of execution may perform and/or participate in parallel processing activities in response to receipt of a program and/or one or more portions of the program. A software unit of execution may perform and/or participate in substantially any type of parallel processing using one or more hardware units of execution. A software unit of execution may support one or more threads (or processes) when performing processing operations.

In one implementation, software UE 410 may include one or more labs (e.g., labs 420-1, 420-2, 420-3, and 420-3, collectively referred to as "labs 420"). Labs 420 may include any of the features described above with respect to the term "lab." In one implementation, a lab may be similar to a software unit of execution, except on a smaller scale. In other implementations, a lab may represent a single software unit of execution.

In an exemplary operation, technical computing environment 320 may provide a main program 430 to controller 400. Controller 400 may provide portions of program 430 (e.g., program portions 440-1, 440-2, 440-3, and 440-4, collectively referred to as "program portions 440") to labs 420-1, 420-2, 420-3, and 420-4, respectively, to software UE 410. Labs 420 may execute program portions 440, and may provide results to controller 400. For example, lab 420-1 may provide a result 450-1 to controller 400, lab 420-2 may provide a result 450-2 to controller 400, lab 420-3 may provide a result 450-3 to controller 400, and lab 420-4 may provide a result 450-4 to controller 400. Controller 400 may combine the results into a single result 460, and may provide single result 460 to technical computing environment 320.

Although FIG. 4 shows exemplary components of parallel processing environment 130, in other implementations, parallel processing environment 130 may contain fewer, different, or additional components than depicted in FIG. 4. In still other implementations, one or more components of parallel processing environment 130 may perform one or more other tasks described as being performed by one or more other components of parallel processing environment 130.

Exemplary Parallel Processing Interfaces

Figure 5A:
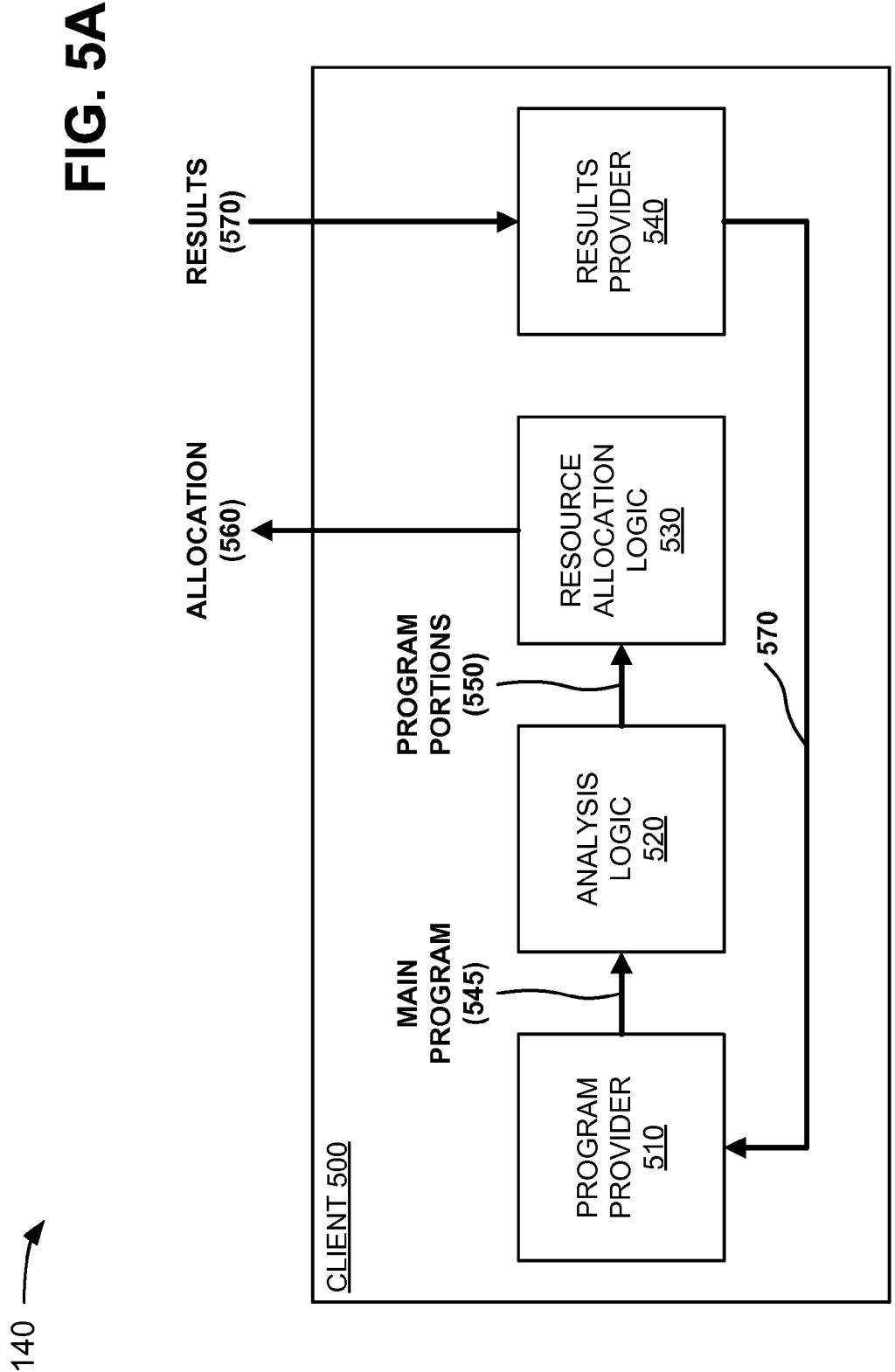
FIG. 5A depicts an exemplary diagram of functional components of a parallel processing interface illustrated in FIG. 1.

FIG. 5A is an exemplary diagram of functional components of parallel processing interface 140. As illustrated, parallel processing interface may include a client 500 that includes a variety of functional components, such as a program provider 510, analysis logic 520, resource allocation logic 530, and/or a results provider 540.

Client 500 may include one or more entities. An entity may be defined as a device, such as a personal computer, a personal digital assistant (PDA), a laptop, or another type of computation or communication device, a thread or process running on one of these devices, and/or an object executable by one of these devices. In an exemplary implementation, client 500 may include a device capable of providing a parallel processing interface, as described herein. Other implementations of client 500 may contain fewer, different, or additional components than depicted in FIG. 5. For example, although not shown in FIG. 5A, client 500 may include a technical computing environment (e.g., TCE 320) and a library (e.g., library 330).

Program provider 510 may include hardware, software, and/or a combination of hardware and software based logic that provides one or more programs for execution. For example, in one implementation, program provider 510 may generate programs created using a technical computing environment, as defined above. As shown in FIG. 5, program provider 510 may provide a main program 545 to analysis logic 520.

Analysis logic 520 may receive main program 545, and may include hardware, software, and/or a combination of hardware and software based logic that analyzes main program 545 and parses main program 545 into one or more program portions 550. In one implementation, analysis logic 520 may include language constructs (as described herein) that parse main program 545 into one or more program portions 550. As shown in FIG. 5, analysis logic 520 may provide program portions 550 to resource allocation logic 530. Further details of analysis logic 520 are provided below.

Resource allocation logic 530 may receive program portions 550, and may include hardware, software, and/or a combination of hardware and software based logic that dynamically allocates (as indicated by reference number 560) program portions 550 to one or more software UEs (e.g., software UE 410) for parallel execution. Although not shown in FIG. 5A, allocation 560 may be provided to one or more software UEs, and the software UEs may be executed by one or more hardware UEs (e.g., hardware UE 200) in a parallel processing manner. Alternatively and/or additionally, if no external resources (e.g., external software UEs or external hardware UEs) are available, allocation 560 may be executed via software UEs and/or hardware UEs of client 500. The software UEs may return results 570 of the execution of program portions 550 to results provider 540.

Results provider 540 may include hardware, software, and/or a combination of hardware and software based logic that receives results 570 from the software UEs, and provides results 570 to program provider 510. In one implementation, results provider 540 may combine results 570 into a single result, and may provide the single result to program provider 510.

Client 500 (e.g., via analysis logic 520) may use different control and data passing layers through which it may specify the current behavior of a part or a whole of the parallel processing interface 140. For example, in one implementation, client 500 may use a message passing interface (MPI), a Transmission Control Protocol/Internet Protocol (TCP/IP), an Ethernet protocol, and/or other interconnects and protocols for the control and data passing layers. In another implementation, client 500 may implement an MPI layer (and/or other data and control layers) on any standard non-guaranteed stream protocol. In still another implementation, client 500 may use two different layers, a cooperative communication layer (e.g., where processes may need to agree that a particular type of message is being sent) and an imperative communication layer or control layer (e.g., that may send unexpected messages to a recipient and may request the recipient to undertake an instruction contained in the message).

Client 500 (e.g., via analysis logic 520) may define a sub-group behavior for each of program portions 550. A sub-group may include any part of the overall set of processes (e.g., main program 545 and/or program portions 550). For example, the sub-group behavior may relate to the parallel processing styles that may be employed on the group of program portions 550. However, client 500 may dynamically change the behavior of one or more of program portions 550 as code is executed for other program portions 550. In one implementation, client 500 may use the control layer to change the current state of a sub-group at any time, which may dynamically change the behavior of that portion of the group. For example, an application (e.g., main program 545) may include different phases (e.g., an input phase, an analysis phase, an output phase, etc.), and parallel processing needs may be different for each phase.

In one implementation, the sub-group behavior may include an unused state (e.g., the initial state of a process when it is not being used), a user-controlled UE state (e.g., if a user has acquired a process as a UE object), a task parallel state (e.g., an execution state used by parallel processing constructs), a single program, multiple data (SPMD) state (e.g., one or more processes may have a MPI ring between them with appropriate values for rank and size), a stream state (e.g., a state where task allocation may be expressed in a directed acyclic graph (DAG) or a cyclic graph with delays), etc. Each of program portions 550 may be in one of the above-mentioned states, and may request other tasks to be placed in a new state.

The sub-group behavior may include a variety of other states. For example, the sub-group behavior may include a delayed debugging state where a task may be executed and delayed in time with respect to another task (or delayed in lines of code). A delayed debugging state may permit a breakpoint to be created for one task if another task experiences an error, and may enable a user to see why an error occurred. In another example, the sub-group behavior may include a release differences state that may execute one or more tasks associated with different releases of a product (e.g., different releases of TCE 320). This may permit behavior differences to be found between different releases of a product, and may permit users to undertake release compatibility studies.

In one implementation, some state information may be consistent across client 500. For example, a source of code may come from one device (e.g., client 500), and a file system associated with the source device may be used across client 500. In another implementation, some state information may be consistent across a sub-group of client 500 (e.g., labindex, numlabs, etc.).

In another implementation, the state information may be automatically transferred from client 500 to software unit of execution 410 and/or labs 420. For example, if a path is added to a technical computing environment (e.g., TCE 320) of client 500, the path may be automatically added to all TCEs in the parallel environment (e.g., TCEs provided in labs 420). If the TCE of client 500 is instructed to reanalyze a piece of code (e.g., because a program changed), then all of the TCEs in the parallel environment may be instructed to reanalyze the piece of code for a sub-group, this may be similar to changing a parallel random number seed, or possibly clearing a particular workspace (e.g., one of labs 420) to ensure clean evaluation of a program.

In still another implementation, client 500 may be interactive in that resource allocation logic 530 may permit a user to dynamically control a current setup (e.g., via scripts, functions, command lines, etc.). Thus, client 500 and its configuration may change based on an actual analysis that the user may be currently undertaking. In another implementation, resource allocation logic 530 may be connected to one or more clusters of software UEs 410 and may use processes derived from each of the clusters, as well as client 500, to form the functional components of client 500. In still another implementation, client 500 may include devices having different architectures and/or operating systems (i.e., client 500 may execute across multiple platforms). For example, client 500 may include a different architecture and/or operating system other than software UE 410.

In one exemplary implementation, main program 545 may be submitted in batch manner to a cluster (e.g., a cluster of software UEs 410 and/or a cluster of labs 420). For example, a user may interactively develop main program 545, and may save main program 545 in a file (e.g., an M file). A command may exist in main program 545 (e.g., in the M file) that may cause one lab (e.g., one of labs 420) in the cluster to act as a client where the execution of main program 545 initiates. Main program 545, for example, may use four labs 420 and a client (e.g., one of labs 420 acting as a client), may initiate on the client, and may utilize as many labs 420 as necessary to carry out execution. In another example, a special type of job may be created that creates a pool (or cluster) of labs, where one of the initiated processes of the job may act as the client, and rest of processes may be in the pool.

FIG. 5B is an exemplary diagram of functional components of parallel processing interface 140 in an alternative arrangement. The alternative arrangement depicted in FIG. 5B is the same as the arrangement of FIG. 5A, except that program provider 510 may be included in a web service 580, while analysis logic 520, resource allocation logic 530, and results provider 540 may be include in client 500. Program provider 510, analysis logic 520, resource allocation logic, and/or results provider 540 may operate in the manner as described above in connection with FIG. 5A.

Web service 580 may provide access to one or more programs (e.g., main program 545 provided by program provider 510, applications accessed by main program 545, etc.). A web service may include any software application that allows machine-to-machine communications over a network (e.g., a local area network (LAN), a metropolitan area network (MAN), a wide area network (WAN), such as the Internet, etc.). For example, a web service may communicate with a client (e.g., client 500) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

In one exemplary implementation, web service 580 may allow a destination (e.g., a computer operated by a customer) to perform parallel processing using hardware, software, and/or a combination of hardware and software UEs that may be operated by a service provider (e.g., client 500). For example, the customer may be permitted access to client 500 to perform parallel processing if the customer subscribes to one of the offered web services. The service provider may maintain a database that includes parameters, such as parameters that indicate the status of hardware UEs, software UEs, etc. The service provider may perform a look-up operation in the database if a request for parallel processing is received from the customer. The service provider may connect the customer to parallel processing resources that are available based on parameters in the database.

In another exemplary implementation, the customer may receive web service 580 on a subscription basis. A subscription may include substantially any type of arrangement, such as monthly subscription, a per-use fee, a fee based on an amount of information exchanged between the service provider and the customer, a fee based on a number of processor cycles used by the customer, a fee based on a number of hardware UEs, software UEs, etc., used by the customer, etc.

FIG. 5C is an exemplary diagram of functional components of parallel processing interface 140 in another alternative arrangement. The alternative arrangement depicted in FIG. 5C is the same as the arrangement of FIG. 5A, except that analysis logic 520 may be replaced with a parallel processing object API 590. Program provider 510, resource allocation logic 530, and/or results provider 540 may operate in the manner as described above in connection with FIG. 5A.

Parallel processing object API 590 may permit a user to specify how main program 545 may be parallelized. Parallel processing object API 590 may cooperate with resource allocation logic 530 and/or an execution mechanism (e.g., software UEs 420) in a similar manner that analysis logic 520 cooperates with these components. However, parallel processing API 590 may offer much more flexibility and/or customization than analysis logic 520.

Parallel processing API 590 (e.g., a code-based interface) may define and implement an object in a technical computing environment (e.g., TCE 320) that corresponds to another one or more (or set of) executing technical computing environments. Parallel processing API 590 may permit customizable parallelism of a program (e.g., main program 545), and may be nested in other calls or function (e.g., in the parallel processing constructs described herein). Parallel processing API 590 may be used by other calls as inputs to a calling function so that identification of which labs (e.g., labs 420) to use may be known. For example, in one implementation, parallel processing API 590 may be called a MATLAB® unit of execution (or MUE) API. The MUE API may define and implement an object in MATLAB® software that corresponds to another one or more of executing MATLAB® software applications. The MUE API may be used to permit one technical computing environment to communicate with and control another technical computing environment. The MUE API may be used to create groups of processes with certain behaviors (e.g., using the language constructs described herein).

Although FIGS. 5A-5C show exemplary functional components of parallel processing interface 140, in other implementations, parallel processing interface 140 may contain fewer, different, or additional functional components than depicted in FIGS. 5A-5C. In still other implementations, one or more functional components of parallel processing interface 140 may perform one or more other tasks described as being performed by one or more other functional components of parallel processing interface 140.

Exemplary Client/Web Service Architecture

FIG. 6 is an exemplary diagram of an entity corresponding to client 500 and/or web service 580. As illustrated, the entity may include a bus 610, a processing unit 620, a main memory 630, a read-only memory (ROM) 640, a storage device 650, an input device 660, an output device 670, and/or a communication interface 680. Bus 610 may include a path that permits communication among the components of the entity.

Processing unit 620 may include a processor, microprocessor, or other types of processing logic that may interpret and execute instructions. In one implementation, processing unit 620 may include a single core processor or a multi-core processor. In another implementation, processing unit 620 may include a single processing device or a group of processing devices, such as a processor cluster or computing grid. In still another implementation, processing unit 620 may include multiple processors that may be local or remote with respect each other, and may use one or more threads while processing. In a further implementation, processing unit 620 may include multiple processors implemented as hardware UEs capable of running copies of a technical computing environment.

Main memory 630 may include a random access memory (RAM) or another type of dynamic storage device that may store information and instructions for execution by processing unit 620. ROM 640 may include a ROM device or another type of static storage device that may store static information and/or instructions for use by processing unit 620. Storage device 650 may include a magnetic and/or optical recording medium and its corresponding drive, or another type of static storage device (e.g., a disk drive) that may store static information and/or instructions for use by processing unit 620.

Input device 660 may include a mechanism that permits an operator to input information to the entity, such as a keyboard, a mouse, a pen, a microphone, voice recognition and/or biometric mechanisms, etc. Output device 670 may include a mechanism that outputs information to the operator, including a display, a printer, a speaker, etc. Communication interface 680 may include any transceiver-like mechanism that enables the entity to communicate with other devices and/or systems. For example, communication interface 680 may include mechanisms for communicating with another device or system via a network.

As described herein, the entity depicted in FIG. 6 may perform certain operations in response to processing unit 620 executing software instructions contained in a computer-readable medium, such as main memory 630. A computer-readable medium may be defined as a physical or logical memory device. The software instructions may be read into main memory 630 from another computer-readable medium, such as storage device 650, or from another device via communication interface 680. The software instructions contained in main memory 630 may cause processing unit 620 to perform processes that will be described later. Alternatively, hardwired circuitry may be used in place of or in combination with software instructions to implement processes described herein. Thus, implementations described herein are not limited to any specific combination of hardware circuitry and software.

Although FIG. 6 shows exemplary components of the entity, in other implementations, the entity may contain fewer, different, or additional components than depicted in FIG. 6. In still other implementations, one or more components of the entity may perform one or more other tasks described as being performed by one or more other components of the entity.

Exemplary Parallel Processing Constructs

FIG. 7 illustrates an exemplary parallel processing construct (e.g., a single program, multiple data (SPMD) command 700) capable of being analyzed and transformed to parallel program portions by analysis logic 520 of parallel processing interface 140. As shown, SPMD command 700 may be created with TCE 320 and provided to analysis logic 520 of client 500. In other implementations, SPMD command 700 may be created by another device and/or may be provided to analysis logic 520 of client 500. In one example, analysis logic 520 may implement SPMD command 700 to generate program portions 550.

SPMD command 700 may permit users to enter into a SPMD mode. In one implementation, SPMD command 700 may support data parallelism whereby a large amount of data may be distributed across multiple software UEs (e.g., software UEs 410 and/or labs 420) via a distributed arrays API. Operations on the distributed arrays may be coordinated through communication between labs 420 that own pieces of the array. The general form of SPMD command 700 may include:

SPMD, statement, . . . , statement, END.

The statements in the body of SPMD command 700 may be executed on resources (e.g., software UEs 410 and/or labs 420) that may be defined by a default configuration. SPMD command 700 may configure these resources as a communicating ring of labs (e.g., ring of labs 420), which may mean that labs 420 may have a same number of labs (e.g., NUMLABS) 720 defined, each lab 420 may have a unique value (e.g., LABINDEX 730, 740, 750, and 760 for labs 420-1, 420-2, 420-3, 420-4, respectively) between one and NUMLABS 720, labs 420 may send data to and from one another, and/or each lab 420 may include a unique random number generator that creates random number streams independent of one another. In one example, labs 420 may exchange information among each other when labs 420 are configured and/or executed.

Upon completion of SPMD command 700, labs 420 may be cleaned up, which may mean that labs 420 may be restored to ordinary resources (e.g., after the results are received), NUMLABS 720 and LABINDEX 730-760 may set back to one, the random number generators may be set back to a default start value, and/or workspaces may be cleared. There may be no implicit data transfer to and from the workspace where SPMD command 700 is called and the workspaces of labs 420 executing the body of SPMD command 700. An error on any of labs 420 executing the body of SPMD command 700 may cause an error in SPMD command 700. A warning on any of labs 700 executing the body of SPMD command 700 may be displayed on a device (e.g., client 500).

SPMD command 700 of the form SPMD NUMWORKERS, statement, . . . , statement, END may execute SPMD command 700 on an anonymous group of a number (e.g., NUMWORKERS) of resources provided within a default resource pool. SPMD command 700 of the form SPMD MYWORKERS, statement, . . . , statement, END may execute SPMD command 700 on a specified group of resources (e.g., MYWORKERS).

The syntax [OUT1,OUT2, . . . ]=SPMD(IN1,IN2, . . . ), statement, . . . , statement, END may transfer variables (e.g., IN1, IN2, . . . ) from client 500 to workspaces of labs 420 at the beginning of SPMD command 700, and may transfer variables (e.g., OUT1, OUT2, . . . ) from one of the workspaces back to client 500 at the end of SPMD command 700. If the variable being transferred from client 500 to labs 420 is a distributed array, then the variable may be automatically re-distributed to all labs 420. If the variable being transferred from client 500 is a non-distributed array, then the variable may be replicated on all labs 420. If the variable being transferred from labs 420 to client 500 is a replicated array, then a replicated value may be received from any of labs 420. If the variable being transferred from labs 420 to client 500 is a variant array, then a value may be received from one of labs 420. If the variable being transferred from labs 420 to client 500 is a distributed array, then the variable may be automatically re-distributed to be a distributed array over a single lab 420.

In one implementation, SPMD command 700 (and its associated syntax) may be implemented via client 500 (e.g. via analysis logic 520 of client 500), software UEs 410 (including labs 420), and/or TCE 320. In other implementations, SPMD command 700 (and its associated syntax) may be implemented via other software and hardware logic. SPMD command 700 may increase processing performance by dividing large data sets into pieces, and by providing each piece to different resources. Each resource may execute the same program on its piece of data, and the results may be collected.

Although FIG. 7 shows an exemplary parallel processing construct, in other implementations, analysis logic 520 may contain fewer, different, or additional parallel processing constructs than depicted in FIG. 7. In still other implementations, the exemplary parallel processing construct may be allocated in other ways than depicted in FIG. 7.

For example, another parallel processing construct (e.g., a PARFOR command) may be analyzed and transformed to parallel program portions by analysis logic 520 of parallel processing interface 140. A PARFOR command may be created with TCE 320 and provided to analysis logic 520 of client 500. In other implementations, the PARFOR command may be created by another device and/or may be provided to analysis logic 520 of client 500. In one example, analysis logic 520 may implement the PARFOR command to generate program portions 550. The PARFOR command may include the following exemplary syntax:

```
parfor (i = 1:100, 4)
    A(i) = i;
end
plot (A)
```

Significant performance gains may be realized by providing parallel processing constructs (e.g., the PARFOR command) that use available computational resources. By identifying concurrencies in their programs, where a set of computations may be executed independent of each other, users may be able to solve problems faster. One such parallel processing construct may include a parallel FOR loop (e.g., the PARFOR command). The PARFOR command may include the following general form:

PARFOR (variable=expr), statement, . . . , statement, END. The PARFOR command may be a work sharing construct that executes the loop body for a set of iterations simultaneously by using available resources. To accomplish this, the body of the PARFOR command may be written such that each iteration may be independent of the other iterations (i.e., the loop iterations may be order-independent). The PARFOR command may terminate if all the resources finish executing the loop body for their assigned set of iterations (e.g., program portions 550). Analysis logic 520 may implement the PARFOR command based on the definition that its body is iteration-independent.

If execution of the PARFOR command produces unexpected results for a user, an appropriate diagnostic message may be displayed indicating a reason for the unexpected results. In one implementation, debugging information (e.g., the iteration number, resources that failed, the statement being executed, etc.) may be provided to the user device (e.g., client 500) that initiated the PARFOR command. If an error occurs during execution of the PARFOR command, all iterations in progress may be terminated, and new iterations may not be initiated.

Semantics for the PARFOR command may not be influenced by what happens (e.g., in terms of usage of variables) before or after the PARFOR command section. Temporary variables may persist after execution of the PARFOR command. In one implementation, the PARFOR command may be optimized to selectively determine which temporary variables may be permitted to persist after execution of the PARFOR command.

Since the PARFOR command may be executed on different resources (e.g., software UEs 410, hardware UEs 200, etc.), variables (e.g., loop index, right-hand side variables within the loop body, etc.) that execute the body of the PARFOR command may be transferred to and/or created on such resources. The number of resources to be used with the PARFOR command may be controlled by specifying an optional input to the PARFOR command of the form:

PARFOR (variable=expr, N), statement, . . . , statement, END, where N may be an integer representing a maximum number of resources to try to use. If N is not specified, the number of resources to use may be specified via a resource configuration and management utility. If there are not enough resources available to satisfy the specified N, the available resources may be initiated as part of the execution of the PARFOR command.

Analysis logic 520 may determine variables and/or data of program portions of the PARFOR command to be transferred to software UE 410. Analysis logic 520 may transform the program portions and may transfer variables and/or data based on the determination of the variables and/or data. Analysis logic 520 may provide execution or run time control of how the iterations get allocated to software UE 410 (e.g., labs 420 of software UE 410). For example, in one implementation, client 500 (via resource allocation logic 530) may use a number of allocation strategies to provide run time control of iteration allocation. In other implementations, users may be provided with dynamic options for iteration distribution schemes.

The program portions of the PARFOR command may be allocated to and/or executed by one or more labs 420 of software UE 410. For example, a first portion of the PARFOR command may be allocated to lab 420-1, a second portion of the PARFOR command may be allocated to lab 420-2, a third portion of the PARFOR command may be allocated to lab 420-3, and/or a fourth portion of the PARFOR command may be allocated to lab 420-4.

In another example, a parallel processing construct (e.g., a PARSECTION command) may be analyzed and transformed to parallel program portions by analysis logic 520 of parallel processing interface 140. The PARSECTION command may be created with TCE 320 and provided to analysis logic 520 of client 500. In other implementations, the PARSECTION command may be created by another device and/or may be provided to analysis logic 520 of client 500. In one example, analysis logic 520 may implement the PARSECTION command to generate program portions. The PARSECTION command may include the following exemplary syntax:

```
parsection (4)
    A = rand(1000);
    B = rand(500);
    C = rand(1000);
    D = rand(500);
    section, [L U] = svd (A); end
    section, F = fftshift(fft(B)); end
```

```
section, E = eig(C); end
section , Z = A*C; end
end
```

Significant performance gains may be realized by providing parallel processing constructs (e.g., the PARSECTION command) that use available computational resources. By identifying concurrencies in their programs, where a set of computations may be executed independent of each other, users may be able to solve problems faster. One such parallel processing construct may include a parallel SECTION command (e.g., the PARSECTION command). The PARSECTION command may include the following general form:

PARSECTION, section . . . END, section . . . END, END.

The PARSECTION command may enable independent sections of code to be executed simultaneously on different resources. Execution of the PARSECTION command may wait for all code sections to be complete. The number of code sections and/or the number of available resources may be unrelated, and the PARSECTION command may be associated with any idle resources available to execute the code sections. In order to control the number of resources to associate with the PARSECTION command, an optional parameter (N, which may indicate the number of resources to use) may be included in the general form as follows:

PARSECTION (N), SECTION . . . END, SECTION, . . . END, END.

Analysis logic 520 may determine independent segments or sections of code associated with the program portions. For example, in one implementation, analysis logic 520 may perform a dependency analysis on the sections of the code to determine independent sections. Analysis logic 520 may analyze the PARSECTION command and may determine sections of the code to be executed together and sections of the code that may undergo staggered execution. Analysis logic 520 may determine sections of the code to allocate to software UE 410 (e.g., labs 420 of software UE 410), and/or results to be returned at the end of the PARSECTION command.

The PARSECTION command may be allocated to and/or executed by one or more labs 420 of software UE 410. For example, a first portion of the PARSECTION command may be allocated to lab 420-1, a second portion of the PARSECTION command may be allocated to lab 420-2, a third portion of the PARSECTION command may be allocated to lab 420-3, and/or a fourth portion of the PARSECTION command may be allocated to lab 420-4.

Exemplary Analysis of SPMD Parallel Processing Constructs

A SPMD parallel processing construct may provide a place holder for a single program that may be executed on one or more labs. The code for the SPMD construct may be provided to the labs, and workspace contents available to the SPMD construct may be determined on the client. The SPMD constructs described herein may be easy to use (e.g., may make it easy to mark code to execute in parallel and may make it easy to send ordinary variables into the SPMD), may support a user (e.g., a programmer) by performing minimal data transfer through remote references or similar mechanisms, and may provide sufficient richness to allow for remote distributed arrays.

The concept of parallel resource sets may be a building block for the behavior of the SPMD construct. A parallel resource set may include a set of labs such that the labs may be available to execute parallel code, the labs may be connected in a MPI ring, and each of the labs may include a value store that can store values of variables. A parallel context may include a combination of a parallel resource set with a parallel code block, and may include variables associated with the parallel code block.

FIG. 8 illustrates an exemplary diagram 800 of a parallel processing construct (a SPMD command 810) capable of being generated by technical computing environment 320. As shown, SPMD command 810 may include an outer parallel context 820, a SPMD body (or inner parallel context) 830, and SPMD boundaries 840.

Outer parallel context 820 may include syntax or code provided outside a spmd statement and an end statement (e.g., outside SPMD boundaries 840). In one exemplary implementation, outer parallel context 820 may be executed sequentially (e.g., by client 500), or may be executed in parallel (e.g., by labs 420).

SPMD body 830 may include syntax or code provided inside the spmd statement and the end statement (e.g., inside SPMD boundaries 840). In one exemplary implementation, SPMD body 830 may be provided to two or more labs (e.g., labs 420), and may be executed in parallel by the two or more labs.

SPMD boundaries 840 may be defined by the spmd statement and the end statement of SPMD command 810. As described above, SPMD boundaries 840 may define outer parallel context 820 and inner parallel context (e.g., SPMD body 830) associated with SPMD command 810.

As further shown in FIG. 8, SPMD command 810 may be provided to analysis logic 520. Analysis logic 520 may receive SPMD command 810, and may analyze SPMD command 810 to determine outer parallel context 820 and inner parallel context 830. For example, analysis logic 520 may analyze SPMD command 810 to determine input variables 850 associated with SPMD command 810. Input variables 850 may include variables used within SPMD body 830 but before they are assigned values. In one implementation, analysis logic 520 may determine input variables 850 upon entering the spmd statement, and may attempt to transfer input variables from outer parallel context 820 into the inner parallel context (e.g., SPMD body 830). Analysis logic 520 may allocate one or more portions of the inner parallel context (e.g., SPMD body 830) and input variables 850 to labs 420 for parallel execution. If analysis logic 520 determines that no resources (e.g., labs 420) are available for parallel execution, as indicated by reference number 860, client 500 may sequentially execute outer parallel context 820 and SPMD body 830.

Although FIG. 8 shows an exemplary parallel processing construct, in other implementations, client 500 may contain fewer, different, or additional parallel processing constructs than depicted in FIG. 8.

Figure 9:
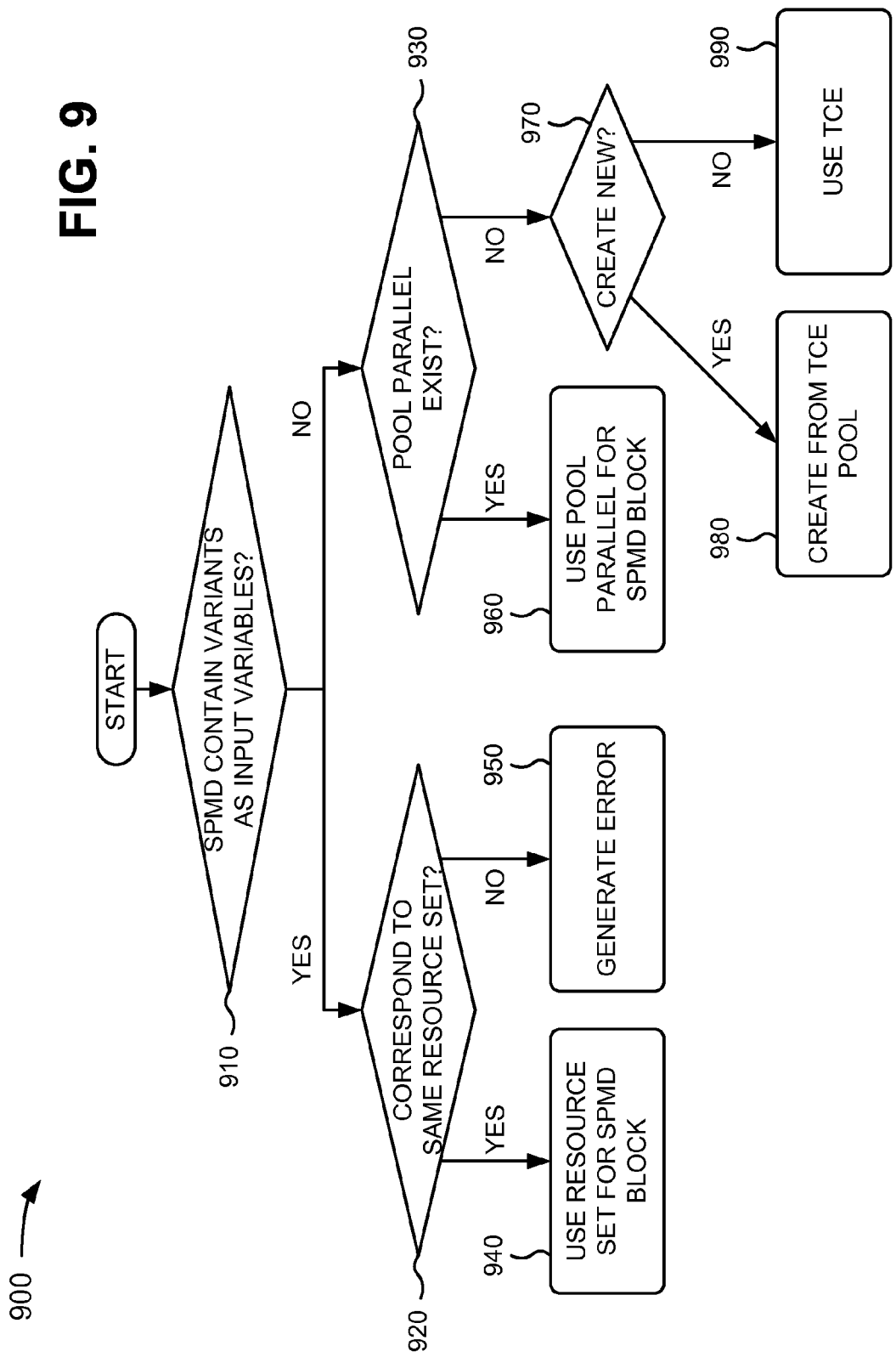
FIG. 9 depicts a flow chart of an exemplary process capable of being performed by the analysis logic and resource allocation logic illustrated in FIGS. 5A-5C.

FIG. 9 depicts a flow chart of an exemplary process 900 capable of being performed by analysis logic 520 and/or resource allocation logic 530. As illustrated, process 900 may begin with a determination of whether a SPMD block contains variants as input variables (block 910). For example, in one implementation, analysis logic 520 may determine if a SPMD command (e.g., SPMD command 810) includes variants as input variables. A variant may include information about a parallel resource set, such as a remote reference to a parallel resource set. In one example, a value of a variant may be stored on each participating lab (e.g., labs 420), and may be cleared from the storage after the variant goes out of scope in the outer parallel context.

If the SPMD block contains variants as input variables (block 910—YES), it may be determined if the input variables correspond to a same resource set (block 920). For example, in one implementation, analysis logic 520 may determine whether a SPMD command (e.g., SPMD command 810) includes variants as variables, and may determine whether the variants correspond to the same resource set (e.g., labs 420). Otherwise (block 910—NO), it may be determined if a pool parallel resource set exists (block 930). For example, in one implementation, analysis logic 520 may determine if a pool parallel resource set exists for a SPMD command (e.g., SPMD command 810).

If the input variables correspond to the same resource set (block 920—YES), the same resource set may be used for the SPMD block (block 940). Otherwise (block 920—NO), an error may be generated (block 950). For example, in one implementation, analysis logic 520 may use a resource set (e.g., labs 420) for a SPMD command (e.g., SPMD command 810) if the input variables correspond to the same resource set (e.g., labs 420), and may generate an error if the input variables do not correspond to the same resource set.

If the pool parallel resource set exists (block 930—YES), the pool parallel resource set may be used for the SPMD block (block 960). Otherwise (block 930—NO), it may be determined whether to create a new pool parallel resource set (block 970). For example, in one implementation, resource allocation logic 530 may determine if pool parallel resource set exists in a SPMD command (e.g., SPMD command 810), and may use the pool parallel resource set for SPMD command 810. If the pool parallel resource set does not exist, resource allocation logic 530 may determine whether to create a new pool parallel resource set for SPMD command 810.

If a new pool parallel resource set is to be created (block 970—YES), the new pool parallel resource set may be created from a technical computing environment pool (block 980). Otherwise (block 970—NO), the SPMD block may be executed by technical computing environment 320 (block 990). For example, in one implementation, resource allocation logic 530 may determine that a new pool parallel resource set is to be created, and may create the new pool parallel resource set from a pool associated with technical computing environment 320. Resource allocation logic 520 may use technical computing environment 320 to execute SPMD command 810 if a new pool parallel resource set is not to be created.

Figure 10:
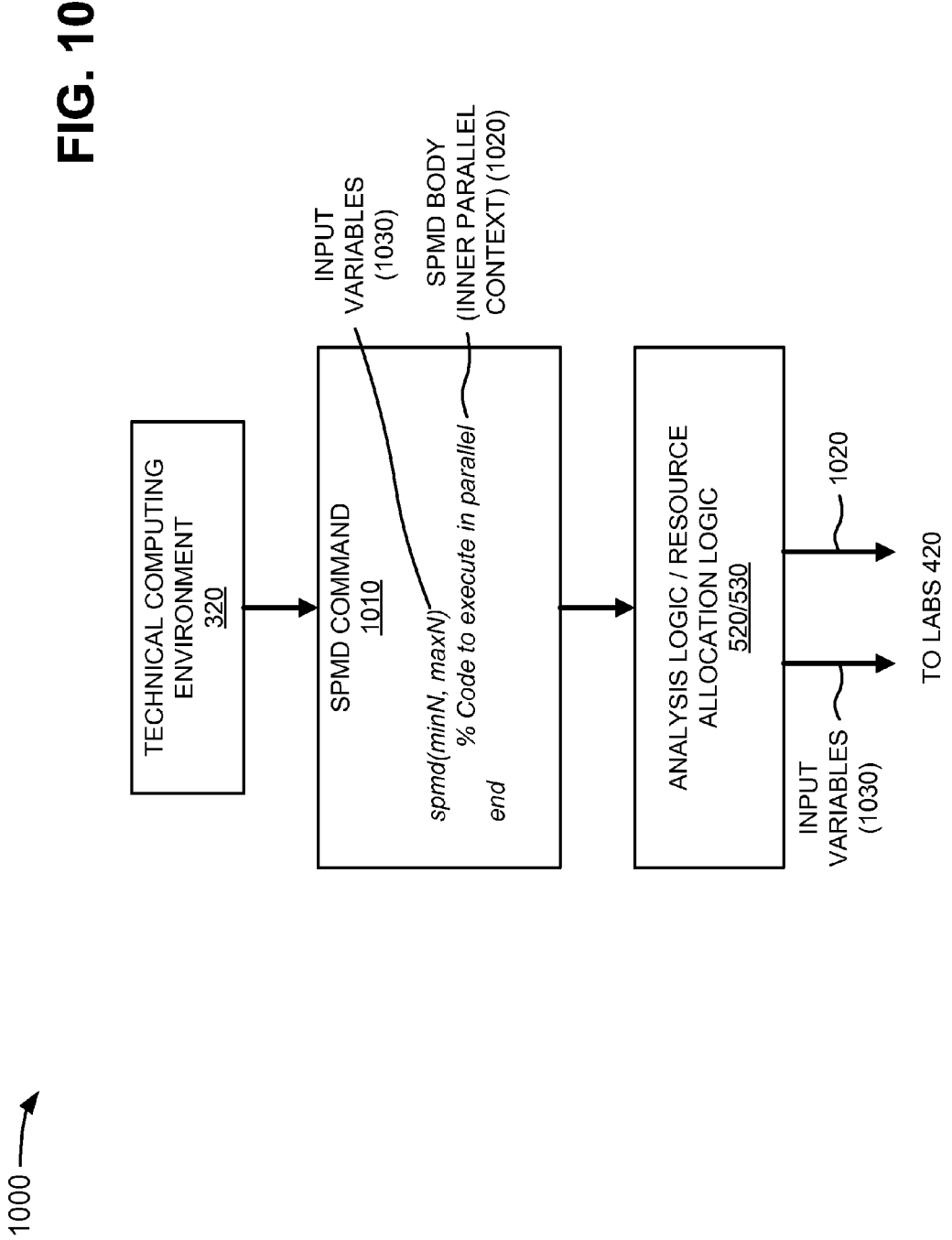
FIG. 10 illustrates an exemplary diagram of a parallel processing construct capable of being generated by the technical computing environment depicted in FIG. 7.

FIG. 10 illustrates an exemplary diagram 1000 of a parallel processing construct (e.g., a SPMD command 1010) capable of being generated by technical computing environment 320. As shown, SPMD command 1010 may include a SPMD body (or inner parallel context) 1020 and input variables 1030. SPMD body 1020 may include syntax or code provided inside a spmd statement and an end statement. In one exemplary implementation, SPMD body 1020 may be provided to two or more labs (e.g., labs 420), and may be executed in parallel by the two or more labs. Input variables 1030 may include variables used within SPMD body 1020 but before they are assigned values. For example, input variables 1030 may include a minimum number of labs to use (e.g., minN), a maximum number of labs to use (e.g., maxN), etc.

As further shown in FIG. 10, SPMD command 1010 may be provided to analysis logic 520 and/or resource allocation logic 530. Analysis logic/resource allocation logic 520/530 may receive SPMD command 1010, and may analyze SPMD command 1010. For example, analysis logic 520 may analyze SPMD command 1010 to determine input variables 1030 associated with SPMD command 1010. In one implementation, analysis logic 520 may determine input variables 1030 upon entering the spmd statement. Resource allocation logic 530 may provide SPMD body 1020 and input variables 1030 to labs 420 for parallel execution.

Although FIG. 10 shows an exemplary parallel processing construct, in other implementations, fewer, different, or additional parallel processing constructs than depicted in FIG. 10 may be used.

Figure 11:
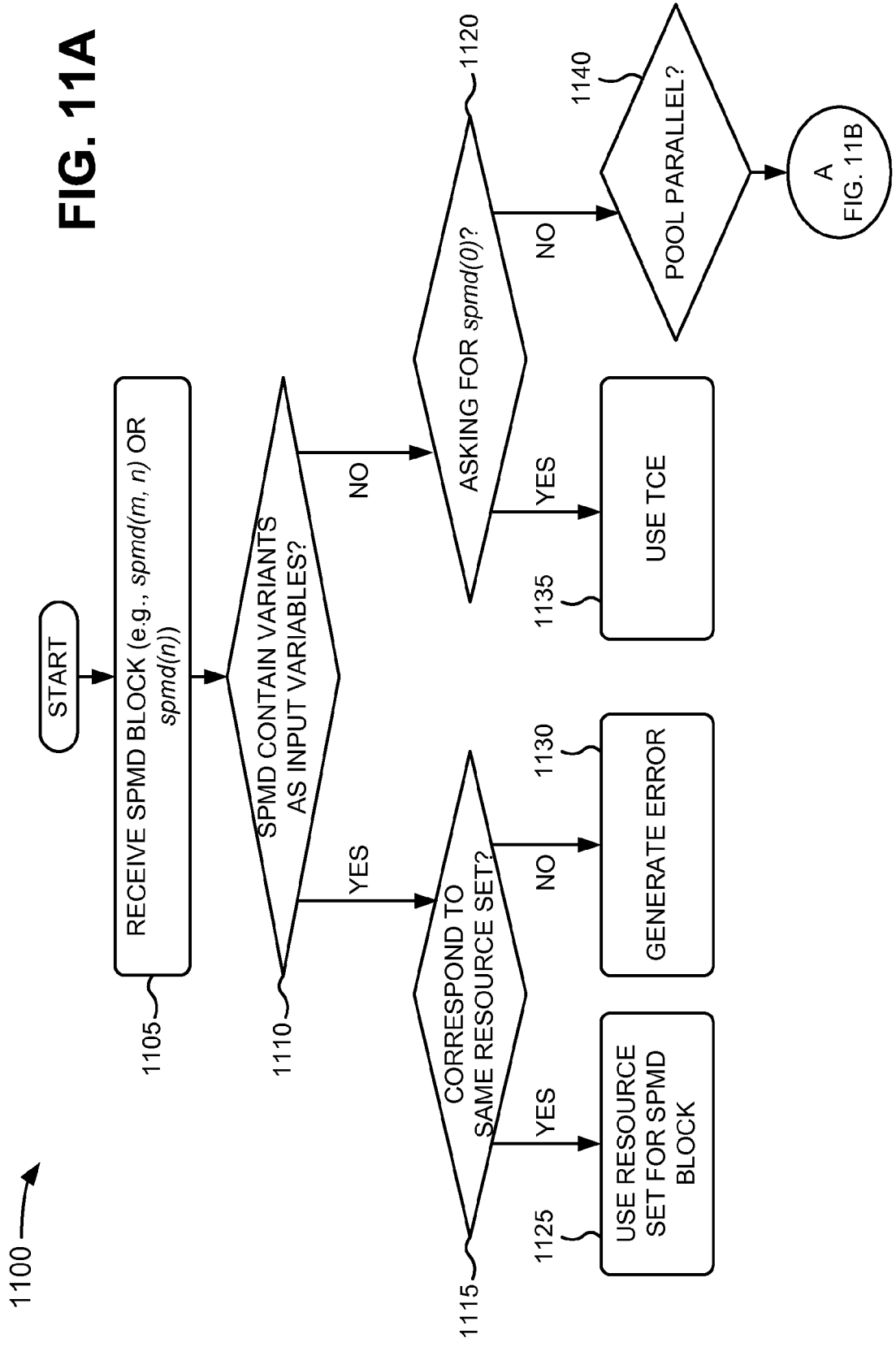
FIGS. 11A and 11B depict a flow chart of an exemplary process capable of being performed by the analysis logic and resource allocation logic illustrated in FIGS. 5A-5C.

FIGS. 11A and 11B depict a flow chart of an exemplary process 1100 capable of being performed by analysis logic 520 and/or resource allocation logic 530. As illustrated in FIG. 11A, process 1100 may begin with reception of a SPMD block (block 1105), and a determination of whether the SPMD block contains variants as input variables (block 1110). For example, in one implementation, analysis logic 520 may receive a SPMD command (e.g., SPMD command 1010), and may determine if the SPMD command (e.g., SPMD command 1010) includes variants as input variables.

If the SPMD block contains variants as input variables (block 1110—YES), it may be determined if the input variables correspond to a same resource set (block 1115). For example, in one implementation, analysis logic 520 may determine that a SPMD command (e.g., SPMD command 1010) includes variants as variables, and may determine whether the variants correspond to the same resource set (e.g., labs 420). Otherwise (block 1110—NO), it may be determined if the SPMD block is asking for spmd(0) (block 1120). For example, in one implementation, analysis logic 520 may determine if a SPMD command (e.g., SPMD command 1010) is asking for a SPMD block (e.g., a spmd(0) construct).

If the input variables correspond to the same resource set (block 1115—YES), the same resource set may be used for the SPMD block (block 1125). Otherwise (block 1115—NO), an error may be generated (block 1130). For example, in one implementation, resource allocation logic 530 may use a resource set (e.g., labs 420) for a SPMD command (e.g., SPMD command 1010) if the input variables correspond to the same resource set (e.g., labs 420), and may generate an error if the input variables do not correspond to the same resource set.

If the SPMD block is asking for spmd(0) (block 1120—YES), the SPMD block may be executed by technical computing environment 320 (block 1135). Otherwise (block 1120-NO), it may be determined whether a pool parallel resource set exists for the SPMD block (block 1140) and process may continue to FIG. 11B. For example, in one implementation, TCE 320 may execute a SPMD command (e.g., SPMD command 1010) if the SPMD command is asking for a SPMD block (e.g., a spmd(0) construct). If the SPMD command is not asking for a SPMD block (e.g., a spmd(0) construct), analysis logic 520 may determine whether a pool parallel resource set exists for SPMD command 810.

As shown in FIG. 11B, if a pool parallel resource set exists for the SPMD block (block 1140—YES), it may be determined if the pool parallel resource set matches constraints (block 1145). Otherwise (block 1140—NO), it may be determined if a new pool parallel resource set may be created for the SPMD block that matches the constraints (block 1150). For example, in one implementation, resource allocation logic 530 may determine whether a pool parallel resource set matches constraints associated with a SPMD command (e.g., SPMD command 1010), or may determine if a new pool parallel resource set may be created for SPMD command 1010 (e.g., from a pool associated with technical computing environment 320) that matches the constraints.

If the pool parallel resource set matches the constraints (block 1145—YES), the pool parallel resource set may be used for the SPMD block (block 1155). If a new pool parallel resource set is to be created for the SPMD block (block 1150—YES), the new pool parallel resource set may be created (block 1160). Otherwise (block 1145—NO or block 1150—NO), it may be determined if a TCE satisfies the constraints (block 1165). For example, in one implementation, if analysis logic 520 determines that a pool parallel resource set matches the constraints associated with SPMD command 1010, resource allocation logic 530 may use the pool parallel resource set for SPMD command 1010. In another example, if resource allocation logic 530 determines that a new pool parallel resource set is to be created, resource allocation logic 530 may create a new pool parallel resource set for SPMD command 1010. In still another example, if resource allocation logic 530 determines that a new pool parallel resource set is not to be created, resource allocation logic 530 may determine whether TCE 320 with SPMD command 1010 satisfies constraints associated with SPMD command 1010.

If the TCE satisfies the constraints (block 1165—YES), the TCE may be used (block 1170). Otherwise (block 1165—NO), an error may be generated (block 1175). For example, in one implementation, if resource allocation logic 530 determines that TCE 320 with SPMD command 1010, satisfies the constraints, resource allocation logic 530 may use TCE 320. In another example, if resource allocation logic 530 does not determine that TCE 320, associated with SPMD command 1010, satisfies the constraints, resource allocation logic 530 may generate an error.

Exemplary Language Analysis of the SPMD Body

Figure 12:
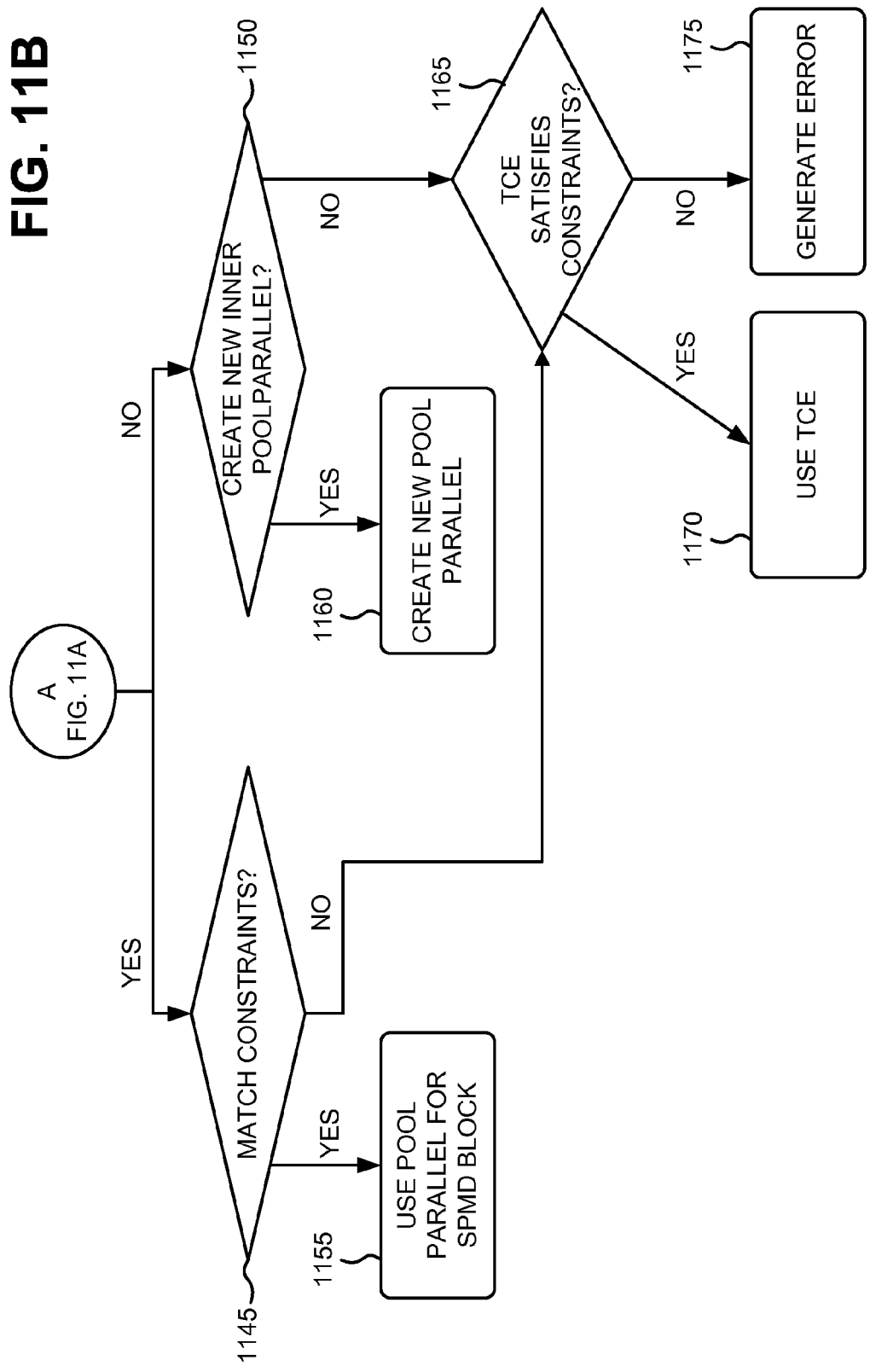
FIG. 12 illustrates an exemplary diagram of functional components, of the analysis logic depicted in FIGS. 5A and 5B, for determining input and output variables.

FIG. 12 illustrates an exemplary diagram of functional components of analysis logic 520 for determining input and output variables. As illustrated, analysis logic 520 may include an input variable determiner 1200 and an output variable determiner 1210. Input variable determiner 1200 and output variable determiner 1210 may permit detection of lexical information or scope (e.g., input and output variables), and sharing of lexical information across the inner and outer parallel contexts of a SPMD command.

Input variable determiner 1200 may include hardware, software, and/or a combination of hardware and software based logic that detects input variables, such as variables that are used in a SPMD body before they are assigned values. For example, in one implementation, upon entering a spmd statement, input variable determiner 1200 may determine input variables to the SPMD block. As shown in FIG. 12, a SPMD command 1220 may be received by input variable determiner 1200, and input variable determiner 1200 may determine that a variable (e.g., x) associated with SPMD command 1220 is an input variable, as indicated by reference number 1230.

Output variable determiner 1210 may include hardware, software, and/or a combination of hardware and software based logic that detects output variables, such as variables assigned within the SPMD body. For example, in one implementation, upon reaching a spmd statement, output variable determiner 1210 may determine output variables from the SPMD block. As shown in FIG. 12, a SPMD command 1240 may be received by output variable determiner 1210, and output variable determiner 1210 may determine that a variable (e.g., x) associated with SPMD command 1240 is an output variable, as indicated by reference number 1250.

Although FIG. 12 shows exemplary functional components of analysis logic 520, in other implementations, analysis logic 520 may contain fewer, different, or additional functional components than depicted in FIG. 12. In still other implementations, one or more functional components of analysis logic 520 may perform one or more other tasks described as being performed by one or more other functional components of analysis logic 520.

Exemplary Data Transfer Rules for SPMD Constructs

Figure 13:
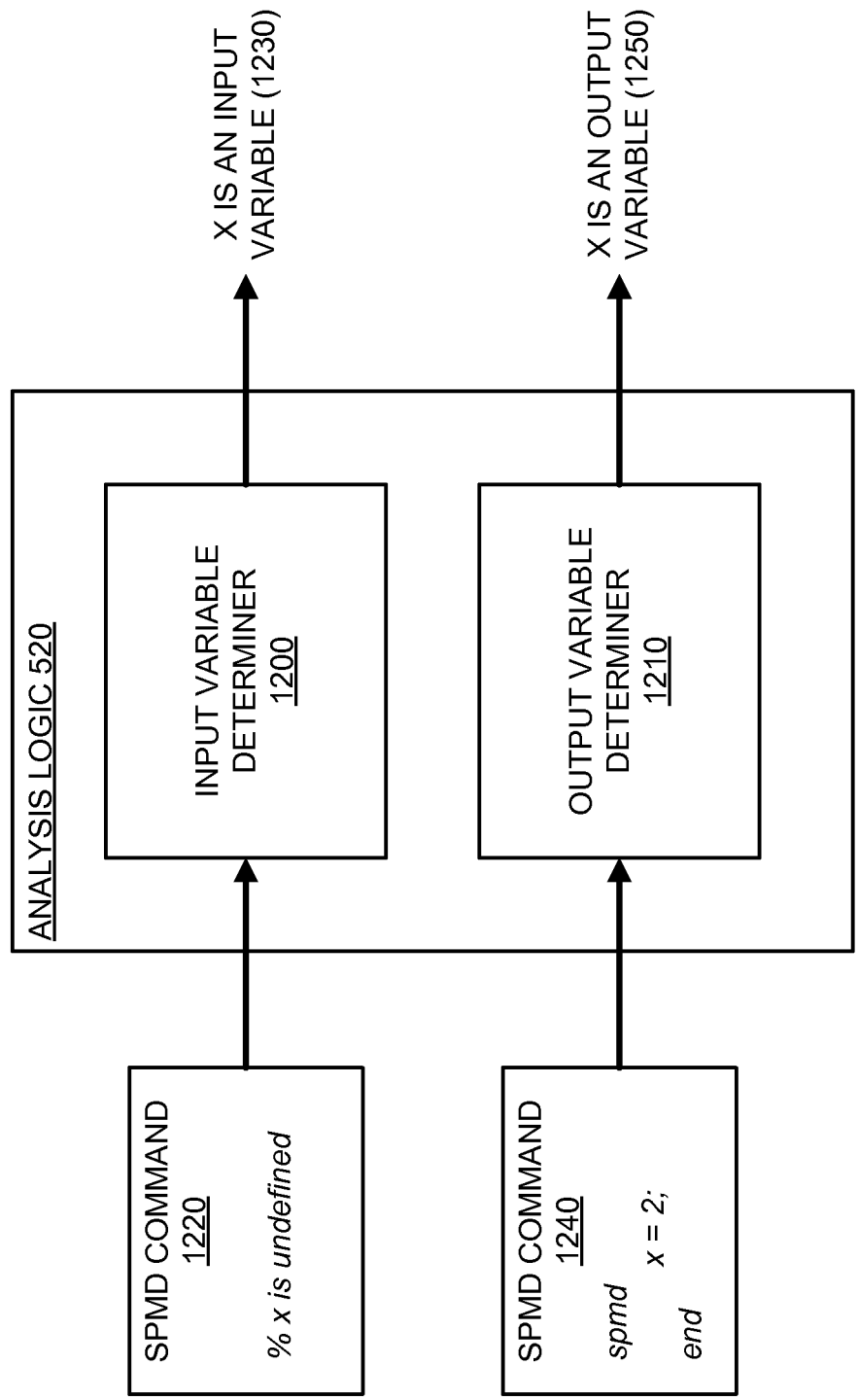
FIG. 13 depicts an exemplary diagram of data transfer rules associated with parallel processing constructs described herein and capable of being implemented by the analysis logic depicted in FIGS. 5A and 5B.

FIG. 13 depicts an exemplary diagram 1300 of data transfer rules associated with parallel processing constructs described herein (e.g., a SPMD command). In one implementation, one or more of the data transfer rules depicted in FIG. 13 may be implemented by analysis logic 520 of client 500. In other implementations, one or more of the data transfer rules depicted in FIG. 13 may be implemented by one or more other components of client 500. As illustrated, the data transfer rules may include a crossing spmd: input variables data transfer rule 1310, a crossing end: variants pointing to output variables data transfer rule 1320, a crossing end: complete/incomplete variant output variables data transfer rule 1330, a crossing end: more complete variant output variables data transfer rule 1340, a crossing end: disallow variants to variants data transfer rule 1350, a crossing spmd: variants as input variables data transfer rule 1360, and/or a crossing spmd: non-variants as input variables data transfer rule 1370. Generally, the data transfer rules depicted in FIG. 13 may transfer input variables from an outer parallel context (e.g., outside a spmd statement and an end statement pair) of a SPMD command to an inner parallel context (e.g., inside the spmd statement and an end statement pair) of the SPMD command, and may transfer output variables from the inner parallel context of the SPMD command to the outer parallel context of the SPMD command.

According to data transfer rule 1310 (e.g., crossing spmd: input variables), when entering a SPMD block (e.g., crossing a spmd statement), variables created or available in an outer parallel context may be automatically transferred to remote labs (e.g., labs 420) executing an inner parallel context. An input variable (e.g., input variable x) that is also not an output variable may be unmodified by the SPMD block. In other words, as shown in FIG. 13, an input variable (e.g., input variable x) may include a same value after the end statement as it was before the spmd statement, may include a same class after the end statement as it was before the spmd statement, and/or may include a same attribute(s) (e.g., sparsity) after the end statement as it was before the spmd statement.

According to data transfer rule 1320 (e.g., crossing end: variants pointing to output variables), output variables (e.g., output variable x) may be sent as references from the inner parallel context to the outer parallel context. In other words, as shown in FIG. 13, after an end statement (i.e., upon returning to a subsequent outer parallel context), output variables (e.g., output variable x) may be of class variant. The names of output variables may propagate to the outer parallel context, but values associated with the output variables may not be copied to the outer parallel context.

It may be unnecessary that a variable be defined on all labs within a parallel context. A variable that includes a value on all labs may be referred to as a complete variant. A variable that does not include a value on all labs may be referred to as an incomplete variant. According to data transfer rule 1330 (e.g., crossing end: complete/incomplete variant output variables), after an end statement (i.e., upon returning to a subsequent outer parallel context), a value associated with a complete output variable (e.g., complete output variable x) in an outer parallel context before a SPMD block may be discarded. Furthermore, as shown in FIG. 13, after the end statement (i.e., upon returning to a subsequent outer parallel context), an incomplete output variable (e.g., incomplete output variable y) may be brought into the outer parallel context as an incomplete variant. However, dereferencing an incomplete variant may generate an error if a value of the incomplete variant is not defined on a lab where it is being dereferenced.

According to data transfer rule 1340 (e.g., crossing end: more complete variant output variables), if a variable includes a value before entering a SPMD block, the value of the variable after the SPMD block may be a variant class. On dereference, the variable may include its original value on a lab to which it is unassigned. In other words, a variant may associate a pre-existing value of a variable in an outer parallel context (if any) to a lab where an output variable was not assigned. For example, as shown in FIG. 13, if variables x and y include a value of "0" before the spmd statement (e.g., before entering the SPMD block), variable x may include its original value (e.g., "0") on a lab to which it is unassigned (e.g., labs less than or equal to "5") and may include a value (e.g., "1") on assigned labs (e.g., labs greater than "5"). Variable y may include its original value (e.g., "0") on all labs since it is not assigned to any labs.

According to data transfer rule 1350 (e.g., crossing end: disallow variants to variants), a user may be prevented from generating code that includes variants pointing to variants by generating an error on first use of variants pointing to variants as input variables to SPMD blocks, and by not permitting the user to obtain a value of a variant that points to a variant. For example, as shown in data transfer rule 1350, attempting to obtain a value for a variant (e.g., variant x) and/or using variant x as an input variable may generate errors.

According to data transfer rule 1360 (e.g., crossing spmd: variants as input variables), if a variant to be used as an input variable is not defined in a parallel resource set, an error may be generated. Otherwise, for each lab in the inner parallel context, if an input reference variable in the outer parallel context includes a reference to a value on the lab, an input variable in the inner parallel context may store the value. If the input reference variable in the outer parallel context does not include a reference to a value on the lab, the input variable in the parallel context may be undefined on the lab.

According to data transfer rule 1370 (e.g., crossing spmd: non-variants as input variables), a non-variant input variable may include the following properties when crossing a spmd statement: the non-variant input variable may exist, the non-variant input variable may store a same value as in the outer parallel context, and/or the non-variant input variable may include a same class and attributes as in the outer parallel context.

Although FIG. 13 shows exemplary data transfer rules associated with parallel processing constructs, in other implementations, fewer, different, or additional data transfer rules than depicted in FIG. 13 may be used.

Conversion Application Program Interface (API)

Figure 14:
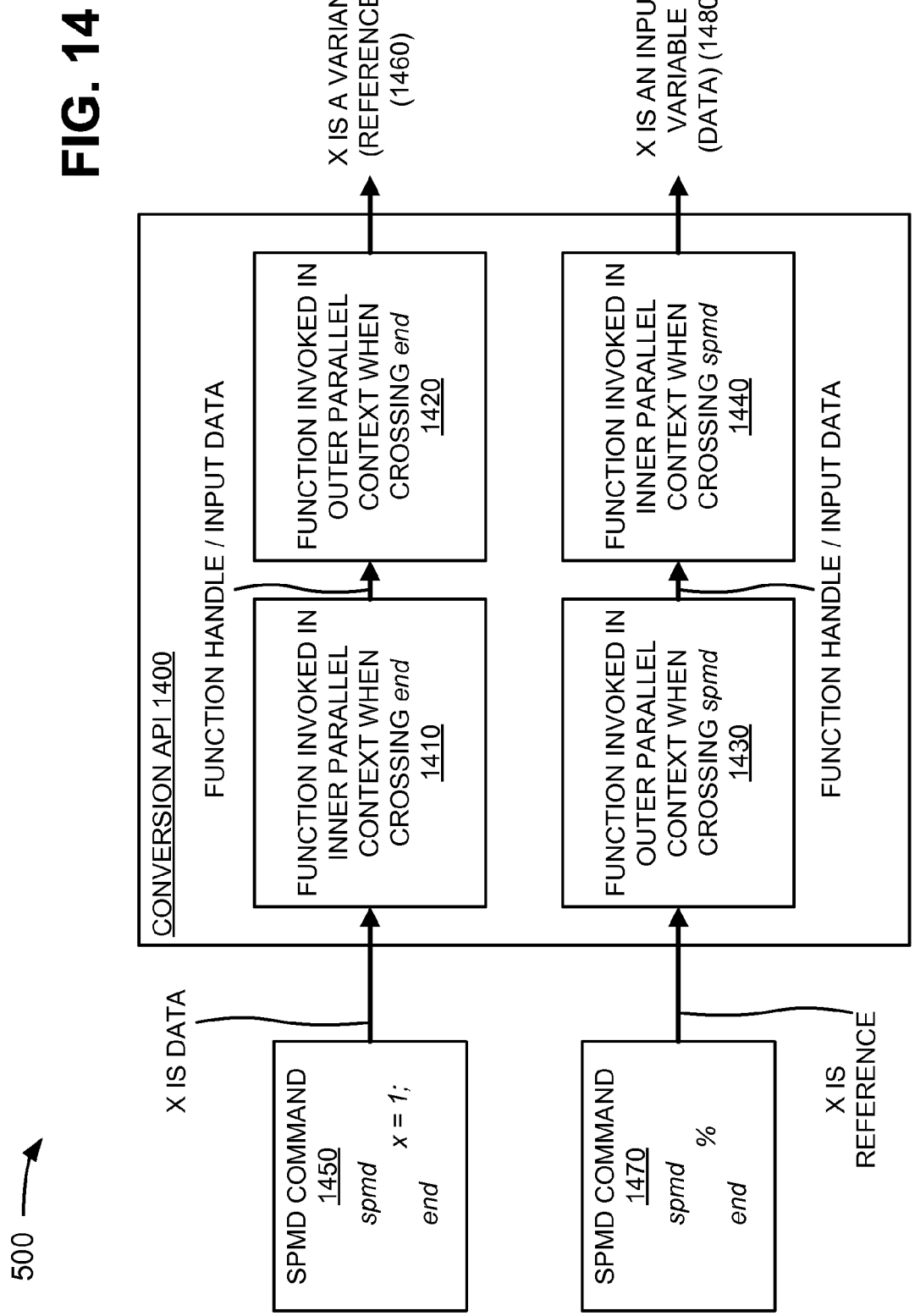
FIG. 14 illustrates an exemplary conversion application program interface capable of being provided by the client depicted in FIGS. 5A-5C.

FIG. 14 illustrates an exemplary conversion application program interface (API) 1400 capable of being provided by client 500. As illustrated, conversion API 1400 may include a function invoked in inner parallel context when crossing end 1410, a function invoked in outer parallel context when crossing end 1420, a function invoked in outer parallel context when crossing spmd 1430, and a function invoked in inner parallel context when crossing spmd 1440.

Function 1410 may receive data (e.g., x) from SPMD command 1450, may be invoked in an inner parallel context when crossing an end statement, and may return a function handle to a variant constructor function and input data that may be used by function 1420. Function 1420 may invoke the variant constructor function in the outer parallel context when crossing an end statement, and may return x as a variant (or a reference), as indicated by reference number 1460.

Function 1430 may receive a reference (e.g., x) from SPMD command 1470, may be invoked in an outer parallel context when crossing a spmd statement, and may return a function handle to a function that updates actual data in the inner parallel context and input data for that function. Update function and input data may be used by function 1440. Function 1440 may invoke the update function in the inner parallel context when crossing a spmd statement, and may return x as an input variable (or data), as indicated by reference number 1480. Function 1440 may receive the input data, may update the input data, and may return updated data (input variable x).

Although FIG. 14 shows exemplary functions associated with conversion API 1400, in other implementations, conversion API 1400 may contain fewer, different, or additional functions than depicted in FIG. 14.

Error Handling for SPMD Parallel Processing Constructs

Figure 15:
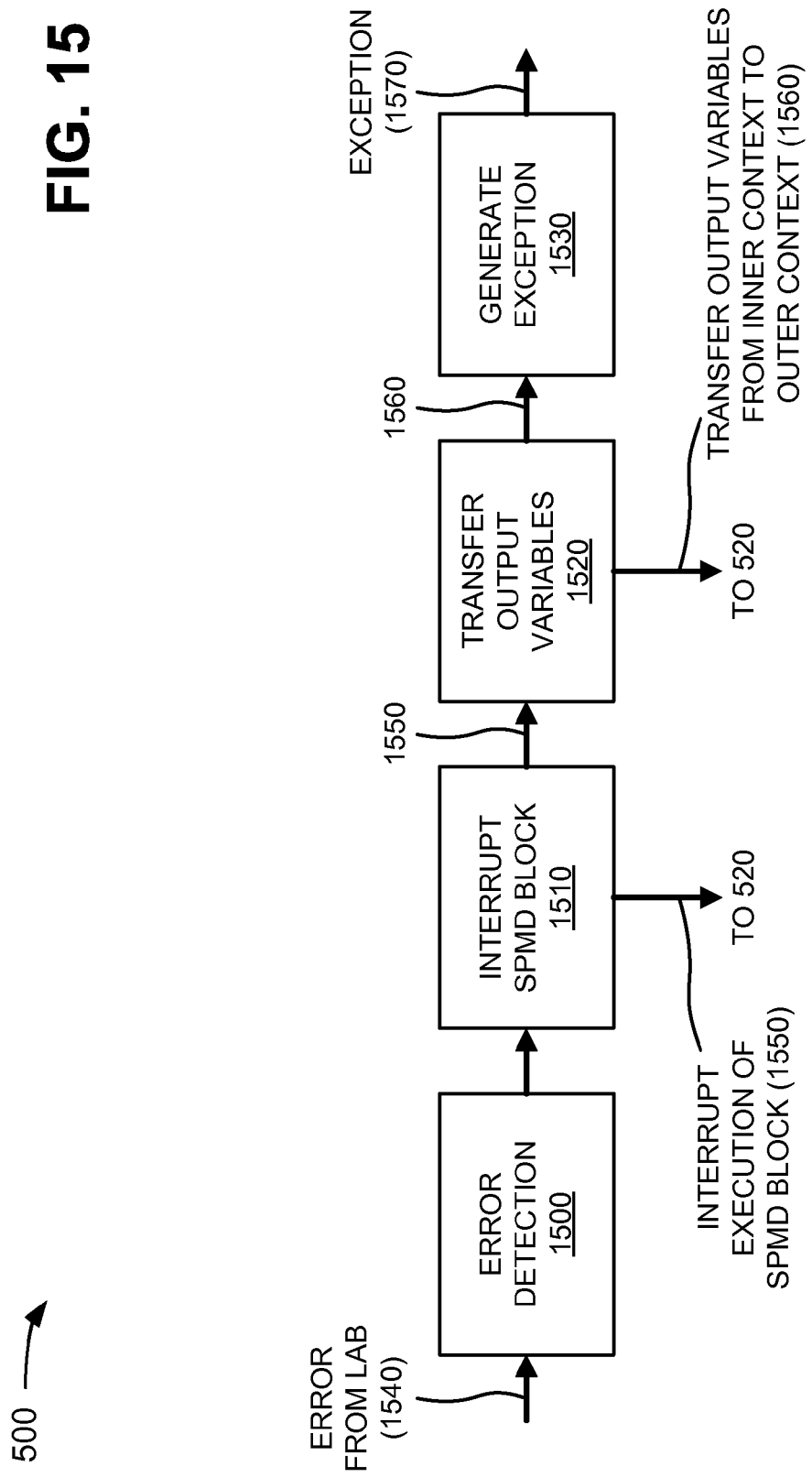
FIG. 15 depicts an exemplary diagram of functional components, of the client depicted in FIGS. 5A-5C, for handling errors associated with one or more labs illustrated in FIG. 7.

FIG. 15 depicts an exemplary diagram of functional components for handling errors associated with one or more labs (e.g., labs 420). In one implementation, one or more of the functional components depicted in FIG. 15 may be implemented in client 500. In other implementations, one or more of the functional components depicted in FIG. 15 may be implemented in a device separate from or in addition to client 500. As illustrated, client 500 may include error detection logic 1500, interrupt SPMD block logic 1510, transfer output variables logic 1520, and/or generate exception logic 1530.

Error detection logic 1500 may include hardware, software, and/or a combination of hardware and software based logic that receives an error 1540 from a lab (e.g., one of labs 420), and provides error 1540 to interrupt SPMD block 1510.

Interrupt SPMD block logic 1510 may include hardware, software, and/or a combination of hardware and software based logic that receives error 1540 from error detection logic 1500, and interrupts execution of a SPMD block, as indicated by reference number 1550. For example, in one implementation, interrupt SPMD block logic 1510 may provide interrupt 1550 to analysis logic 520, and analysis logic 520 may interrupt execution of a SPMD block on labs (e.g., one or more of labs 420) in an inner parallel context. As further shown in FIG. 15, interrupt SPMD block logic 1510 may provide interrupt 1550 to transfer output variables logic 1520.

Transfer output variables logic 1520 may include hardware, software, and/or a combination of hardware and software based logic that receives interrupt 1550 from interrupt SPMD block 1510, and transfers output variables from the inner parallel context into the outer parallel context associated with the SPMD block, as indicated by reference number 1560. For example, in one implementation, transfer output variable logic 1520 may use states associated with the output variables before error 1540 is generated and/or interrupt 1550 is generated. As further shown in FIG. 15, transfer output variables logic 1520 may provide transfer 1560 to generate exception logic 1530.

Generate exception logic 1530 may include hardware, software, and/or a combination of hardware and software based logic that receives transfer 1560 from transfer output variables logic 1520, and generates an exception 1570 in the outer parallel context of the SPMD block. For example, in one implementation, exception 1570 may include information, such as a labindex of a lab that generated error 1540, an error message, etc.

Although FIG. 15 shows exemplary functional components of client 500, in other implementations, client 500 may contain fewer, different, or additional functional components than depicted in FIG. 15. In still other implementations, one or more functional components of client 500 may perform one or more other tasks described as being performed by one or more other functional components of client 500.

Creating/Using Idle Sub-Pools of Labs

Figure 16:
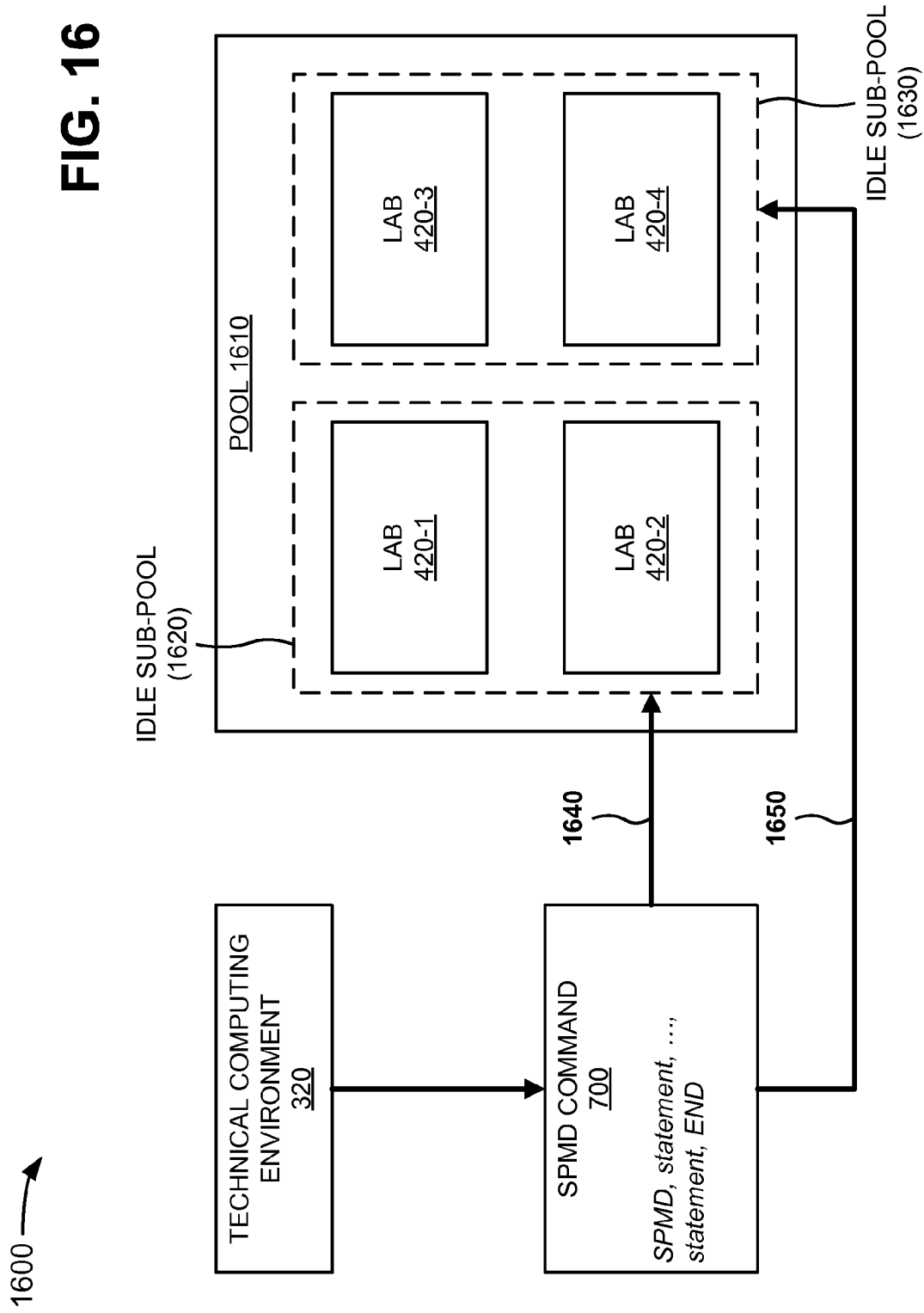
FIG. 16 illustrates an exemplary diagram of creating a pool that may include one or more labs depicted in FIG. 7, and of interacting with the pool via the exemplary parallel processing construct depicted in FIG. 7.

FIG. 16 illustrates an exemplary diagram 1600 of creating a pool 1610 that may include one or more labs (e.g., labs 420-1, . . . , 420-4), and of interacting with pool 1610 via parallel processing construct 700 created by technical computing environment 320. In one example, exemplary diagram 1600 may depict an implementation of resource allocation logic 530, and may be combined with the implementations of analysis logic/resource allocation logic 520/530 depicted in FIG. 9 and/or FIGS. 11A and 11B.

An entire pool of labs (e.g., pool 1610) may be used for parallel processing (e.g., for SPMD processing). For example, an undecorated spmd statement (e.g., a spmd statement without arguments) may use as many labs from a pool as possible. However, client 500 (e.g., via a SPMD block) may limit a number of labs for the SPMD block. As shown in FIG. 16, client 500 (e.g., via SPMD command 700) may establish one or more idle sub-pools 1620 and 1630 of labs (e.g., labs 420) from pool 1610 for a particular SPMD block (e.g., SPMD command 700). Each of idle sub-pools 1620 and 630 may include a set of labs from pool 1610 that a parallel process (e.g., SPMD command 700) may have at its disposal for performing computations. For example, idle sub-pool 1620 may include labs 420-1 and 420-2, and idle sub-pool 1630 may include labs 420-3 and 420-4. SPMD command 700 may provide a first portion 1640 of SPMD command 700 to idle sub-pool 1620, and may provide a second portion 1650 of SPMD command 700 to idle sub-pool 1630.

Each of idle sub-pools 1620 and 1630 may include one or more of the following exemplary properties. Each of idle sub-pools 1620 and 1630 may be empty, and, if a lab is included in one or more idle sub-pools 1620 and 1630, the lab may include an empty idle sub-pool. Each lab in pool 1610 may belong to a single idle sub-pool. For example, lab 420-1 may belong to idle sub-pool 1620, but may not belong to idle sub-pool 1630. Idle sub-pools 1620 and 1630 need not encompass the entire pool 1610 of labs since client 500 may create additional labs from pool 1610. In an initial state (i.e., when client 500 opens pool 1610, and has not created additional labs from pool 1610 or fragmented pool 1610), an idle sub-pool associated with client 500 may include all the labs (e.g., labs 420-1, . . . , 420-4) in pool 1610.

Although FIG. 16 shows exemplary creation and interaction with a pool of labs, in other implementations, the pool of labs may contain fewer, different, or additional labs than depicted in FIG. 16.

Figure 17A:
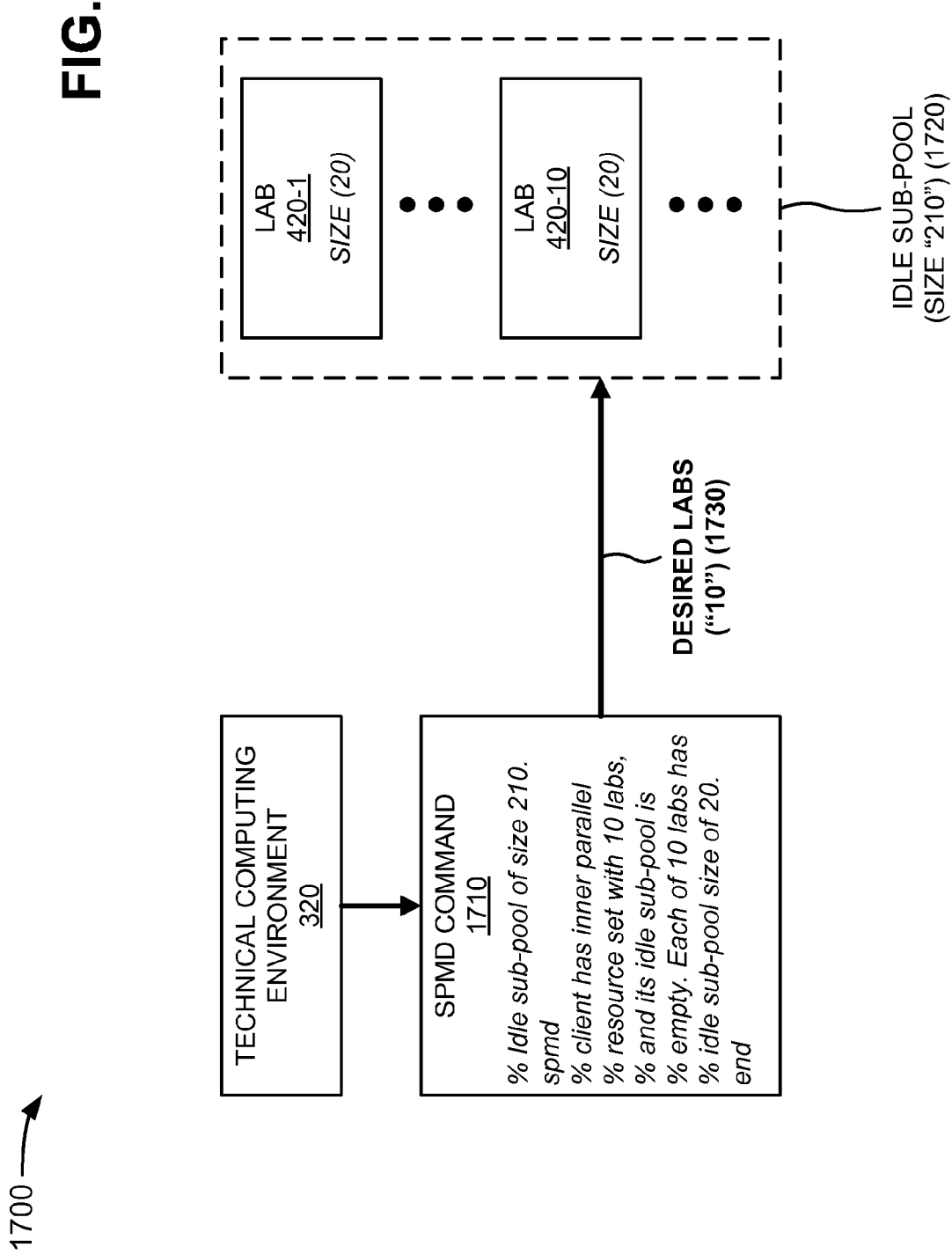
FIGS. 17A and 17B depict an exemplary diagram of providing a desired number of labs to an idle sub-pool of labs, and of restoring the idle sub-pool of labs.
Figure 17B:
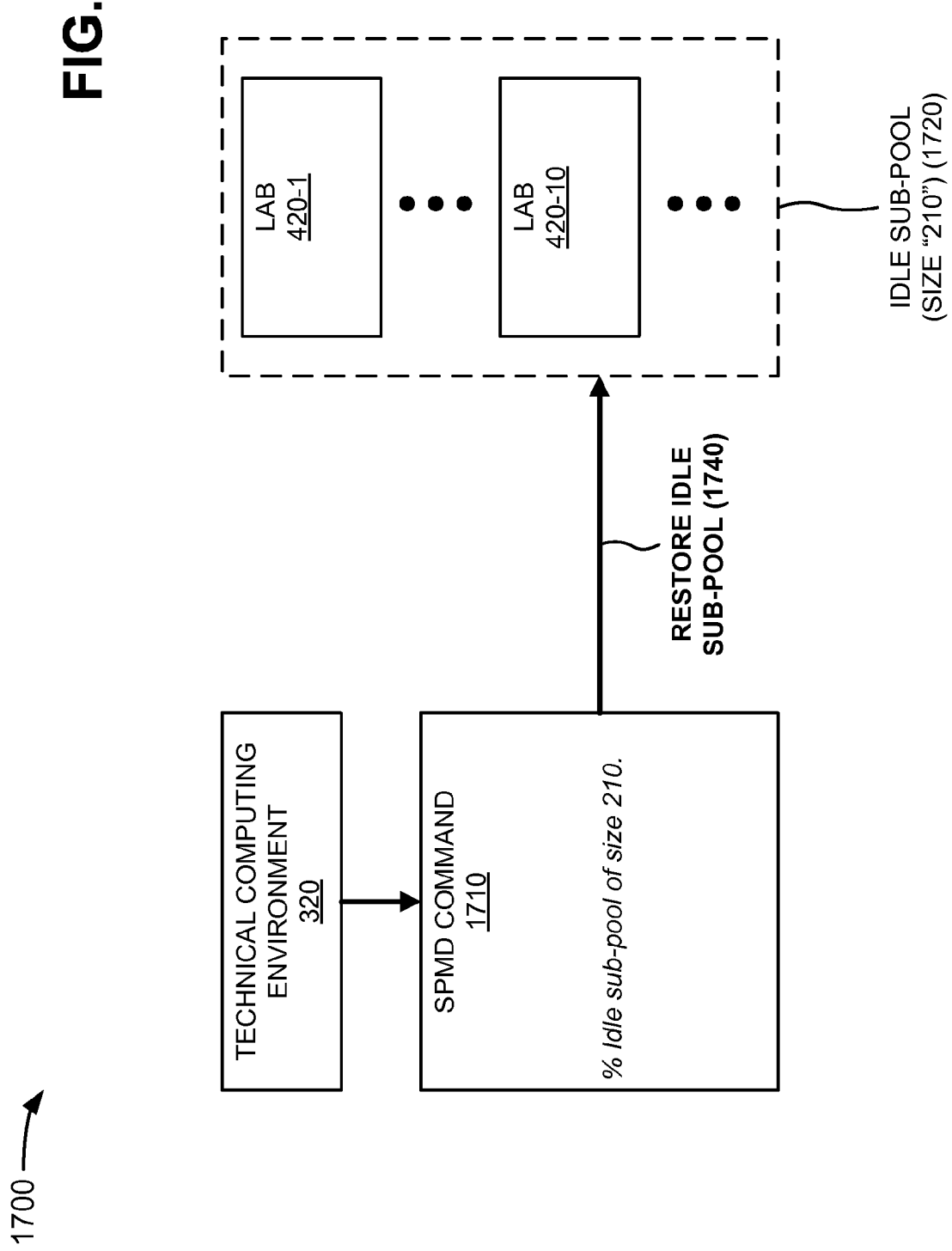

FIGS. 17A and 17B depict an exemplary diagram 1700 of providing a desired number of labs to an idle sub-pool of labs, and of restoring the idle sub-pool of labs. As illustrated, technical computing environment 320 may create a SPMD command 1710 that includes an inner parallel resource set and uses labs from an idle sub-pool 1720. For example, idle sub-pool 1720 may include "210" labs, including the ten labs (e.g., labs 420-1, . . . , 420-10) depicted in FIG. 17A. Each of the ten labs may include a size of twenty sub-labs, and idle sub-pool 1720 may include a size of "210" labs. SPMD command 1710 may seek to create an inner parallel resource set with ten desired labs 1730, and may create the inner parallel resource set as follows. SPMD command 1710 may subtract the number of desired labs 1730 from the number of labs (e.g., "210") contained in idle sub-pool 1720, and may divide the result (e.g., "200") by the number of desired labs 1730 to determine a particular number (e.g., "20"). The particular number may be used to divide the inner parallel resource set, associated with SPMD command 1710, among labs 420-1, . . . , 420-10 of idle sub-pool 1720. For example, as shown in FIG. 17A, each of labs 420-1, . . . , 420-10 may include a portion of the inner parallel resource set, associated with SPMD command 1710, that is less than or equal to "20." A remaining portion of idle sub-pool 1720 may be allocated to the number of desired labs 1730 for future use.

As shown in FIG. 17B, after the inner parallel resource of SPMD command 1710 is executed, SPMD command 1710 may restore idle sub-pool 1720 to its original size, as indicated by reference number 1740. Thus, idle sub-pool 1720 may include the same number of labs as it had before the inner parallel resource set was created. For example, idle sub-pool 1720 may include "210" labs, and the "210" labs may include empty idle sub-pools, including the labs (e.g., labs 420-1, . . . , 420-10) that executed SPMD command 1710.

Although FIGS. 17A and 17B shows exemplary creation and interaction with an idle sub-pool of labs, in other implementations, the idle sub-pool of labs may contain fewer, different, or additional labs than depicted in FIGS. 17A and 17B.

Figure 18:
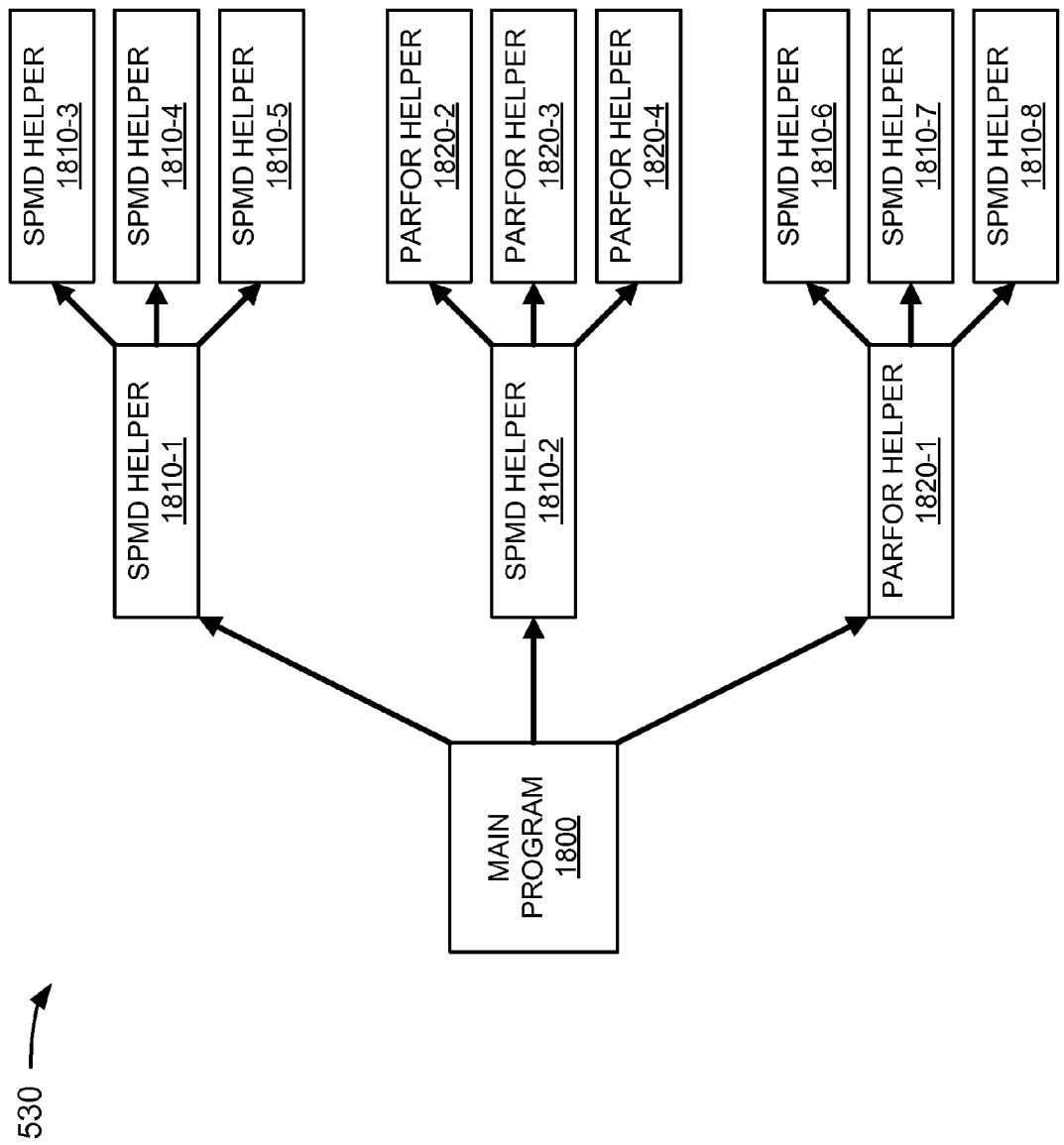
FIG. 18 illustrates an exemplary operation of the resource allocation logic of the parallel program interfaces depicted in FIGS. 5A and 5B during nesting of parallel program constructs.

FIG. 18 depicts an exemplary operation of resource allocation logic 530 during nesting of parallel processing constructs (e.g., SPMD and PARFOR). As illustrated, a main program 1800 may be generated by client 500 (e.g., from program provider 510) and may be provided to resource allocation logic 530. If twelve or more resources (or helpers) are available, resource allocation logic 530 may use three helpers (or another number of helpers) to handle portions of main program 1800, and each helper may use three more helpers (or another number of helpers) to execute other portions (or portions within portions) of main program 1800. Resource allocation logic 530 may allocate main program 1800 as depicted in FIG. 18, where each helper may be associated with a resource (e.g., labs 420, not shown).

As shown, resource allocation logic 530 may use two SPMD helpers 1810-1 and 1810-2 and a PARFOR helper 1820-1 to handle portions of main program 1800. Resource allocation logic 530 may cause SPMD helpers 1810-1 and 1810-2 and PARFOR helper 1820-1 to each use three helpers to execute other portions (or portions within portions) of main program 1800. For example, SPMD helper 1810-1 may use SPMD helpers 1810-2, 1810-3, and 1810-4, SPMD helper 1810-2 may use PARFOR helpers 1820-2, 1820-3, and 1820-4, and/or PARFOR helper 1820-1 may use SPMD helpers 1810-6, 1810-7, and 1810-8, respectively. Such an allocation may be produced by resource allocation logic 530 if there are more than twelve resources available to resource allocation logic 530. However, if there are fewer than twelve resources available, resource allocation logic 530 may implement a variety of allocation strategies, such as a user-controlled allocation strategy, a top-down allocation strategy, a dynamic allocation strategy, a global allocation strategy, and/or an adaptive allocation strategy.

In one exemplary implementation, technical computing environment 320 may include an idle pool of "210" labs, and may be asked to execute an SPMD block using "10" labs. TCE 320 may subtract "10" labs from its idle pool (e.g., labs

420-1, ..., 420-10, as shown in FIG. 17A), may divide the remaining "200" labs (e.g., labs 420-11, ..., 420-210) into "10" idle sub-pools, and may allocate them to the "10" labs (e.g., labs 420-1, ..., 420-10). When the "10" labs (e.g. labs 420-1, ..., 420-10) execute the SPMD block, they may encounter code that contains a SPMD block and/or a PAR-FOR block. Each of the "10" labs may independently use labs from its idle sub-pool of "20" labs while performing functions provided by analysis logic 520 and/or resource allocation logic 530.

Although FIG. 18 shows exemplary operations of resource allocation logic 530, in other implementations, resource allocation logic 530 may include fewer, different, or additional operations than depicted in FIG. 18.

Variable Lifetime for SPMD Parallel Processing Constructs

Figure 19:
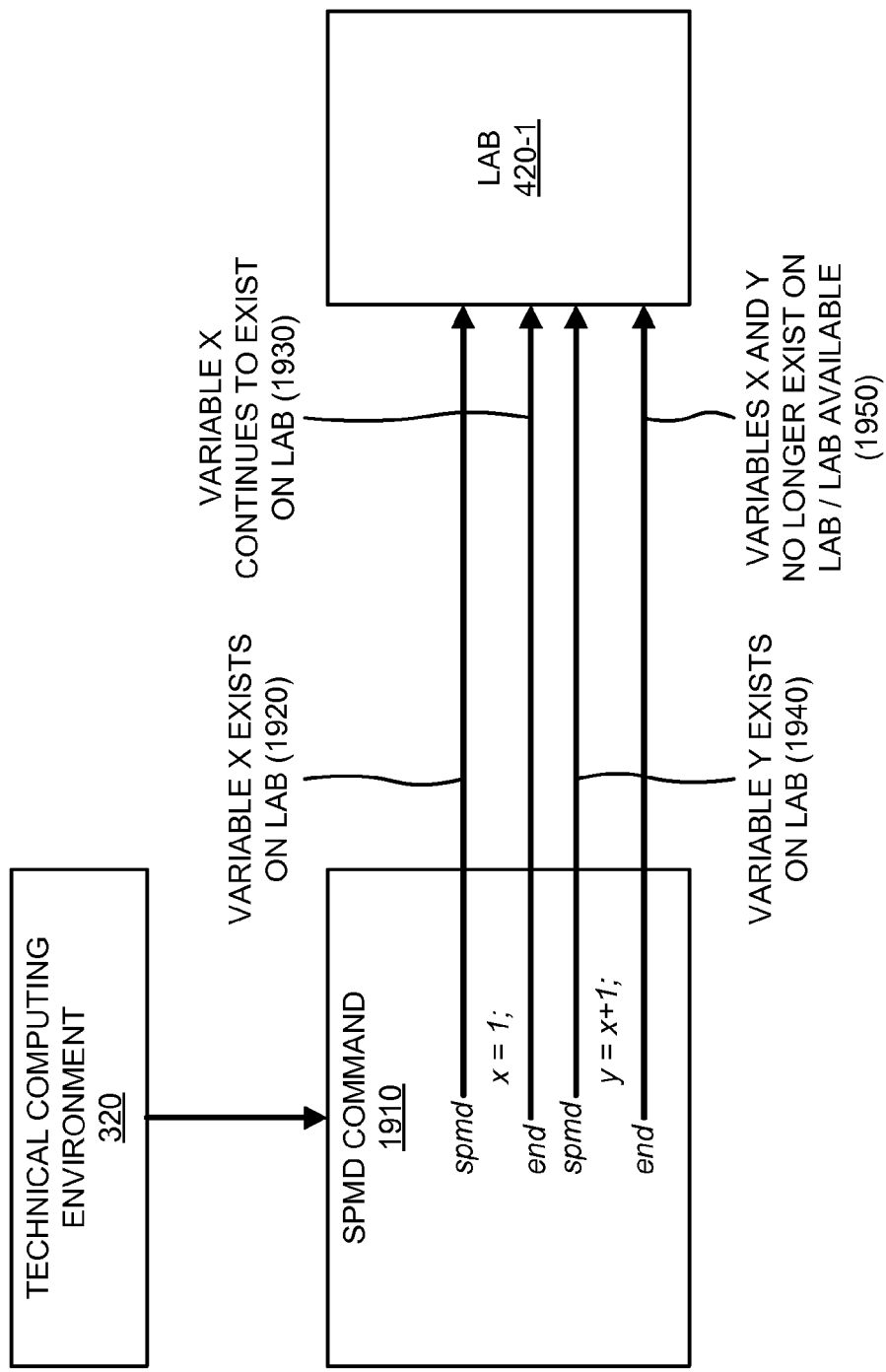
FIG. 19 depicts an exemplary diagram of controlling lifetimes of variables with a parallel processing construct capable of being generated by the technical computing environment illustrated in FIG. 7.

FIG. 19 depicts an exemplary diagram 1900 of controlling lifetimes of variables with a parallel processing construct. As illustrated, a parallel processing construct (e.g., SPMD command 1910) may be generated by technical computing environment 320, and may include the following syntax:

```
spmd
    x = 1;
end
spmd
    y = x + 1;
end,
``` where x and y may include variables.

As further shown in FIG. 19, SPMD command 1910 may be executed by a lab (e.g., lab 420-1). Variable x may exist on lab 420-1 when a first spmd statement of SPMD command 1910 is encountered, as indicated by reference number 1920, because variable x is referenced in later portions of SPMD command 1910. Variable x may to continue exist on lab 420-1 after a first end statement of SPMD command 1910, as indicated by reference number 1930, because variable x is referenced in later portions of SPMD command 1910. Variable y may exist on lab 420-1 when a second spmd statement of SPMD command 1910 is encountered, as indicated by reference number 1940, because variable y is referenced in later portions of SPMD command 1910. Variables x and y may cease to exist on lab 420-1 (and lab 420-1 may be available) after a second end statement of SPMD command 1910, as indicated by reference number 1950, because variables x and y are no longer referenced in later portions of SPMD command 1910.

Although FIG. 19 shows exemplary variable lifetime control with a parallel processing construct, in other implementations, a lifetime of a variable may depend upon an amount of resources (e.g., labs) available for use.

Command Line Execution of SPMD Parallel Processing Constructs

Figure 20:
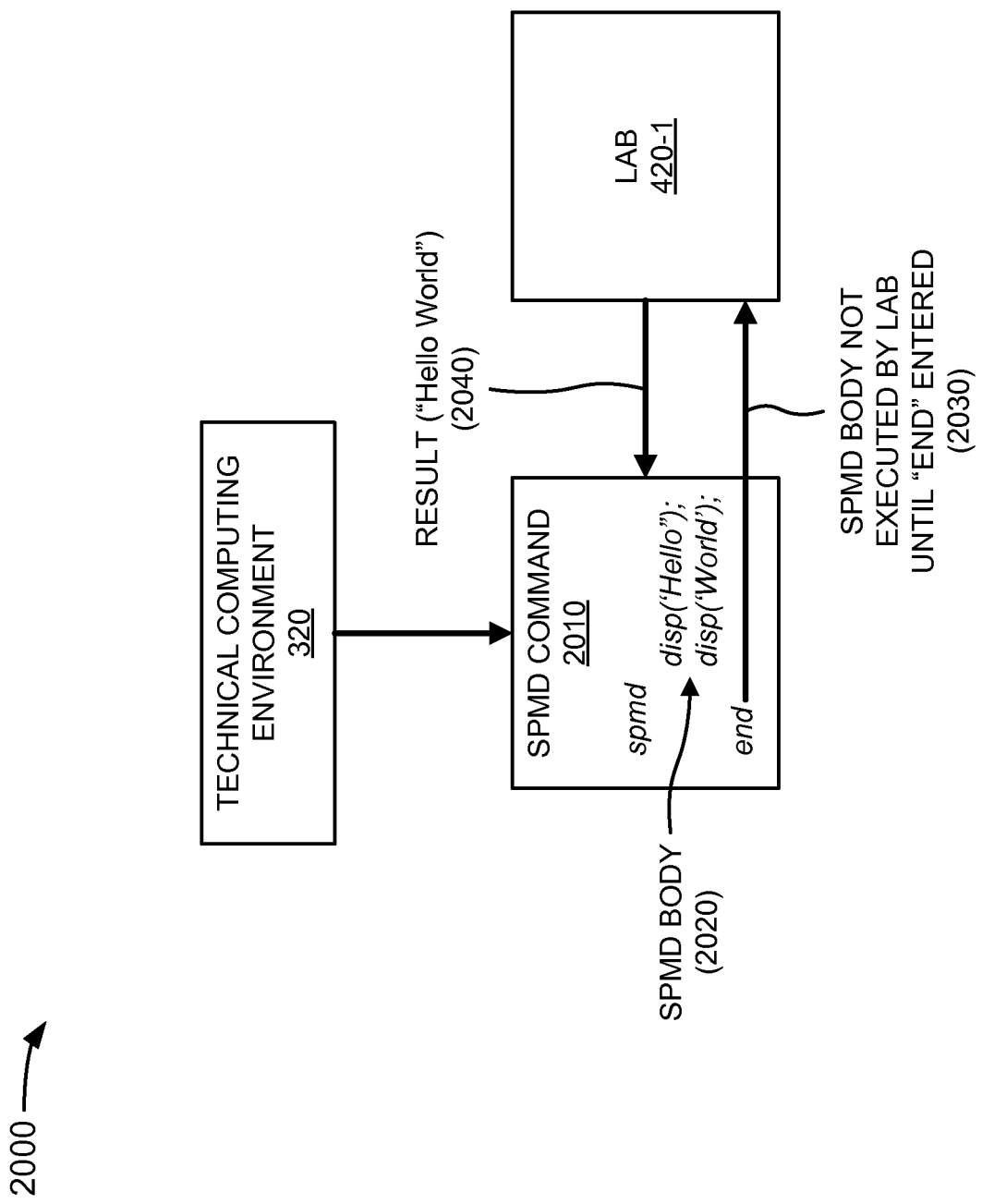
FIG. 20 illustrates an exemplary diagram of execution of a parallel processing construct capable of being generated by the technical computing environment depicted in FIG. 7.

FIG. 20 illustrates an exemplary diagram 2000 of execution of a parallel processing construct. As illustrated, a parallel processing construct (e.g., SPMD command 2010) may be generated by technical computing environment 320, and may include the following syntax:

```
spmd
    disp('Hello');
    disp('World');
end
```

SPMD command 2010 may include a SPMD body 2020 that may not be executed by a lab (e.g., lab 420-1) until an end statement is entered, as indicated by reference number 2030. After the end statement is entered, lab 420-1 may execute SPMD body 2020 and may return a result (e.g., "Hello World") 2040.

Figure 21:
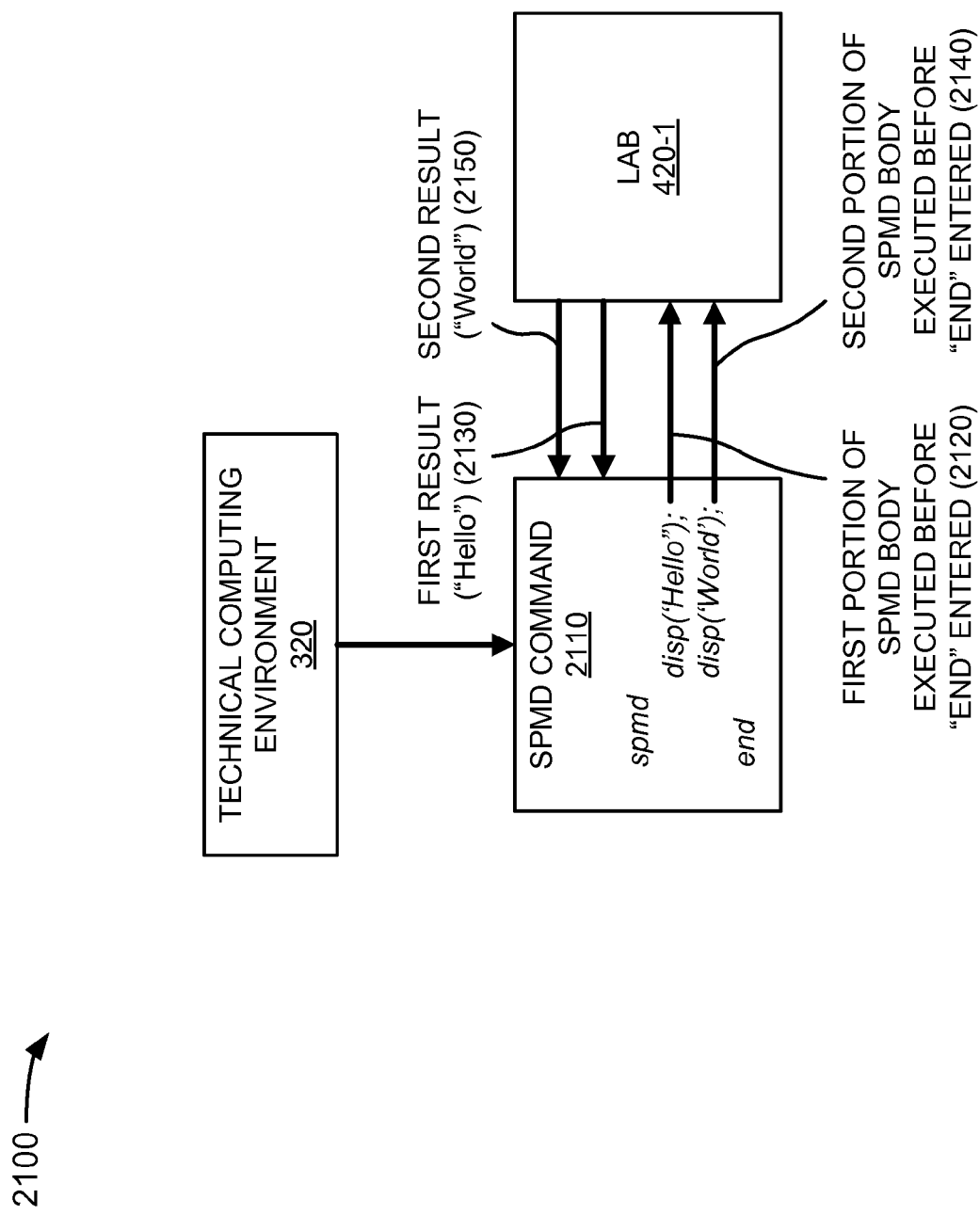
FIG. 21 depicts an alternative exemplary diagram of execution of a parallel processing construct capable of being generated by the technical computing environment illustrated in FIG. 7.

FIG. 21 depicts an alternative exemplary diagram 2100 of execution of a parallel processing construct. As illustrated, a parallel processing construct (e.g., SPMD command 2110) may be generated by technical computing environment 320, and may include the following syntax:

```
spmd
    disp('Hello');
    disp('World');
end
```

SPMD command 2110 may include a SPMD body with a first portion (e.g., disp('Hello')) that may be executed by a lab (e.g., lab 420-1) before an end statement is entered, as indicated by reference number 2120. Lab 420-1 may execute the first portion and may return a first result (e.g., "Hello") 2130. The SPMD body of SPMD command 2110 may also include a second portion (e.g., disp('World')) that may be executed by a lab (e.g., lab 420-1) before the end statement is entered, as indicated by reference number 2140. Lab 420-1 may execute the second portion and may return a second result (e.g., "World") 2150.

Although FIGS. 20 and 21 depict exemplary execution timing arrangements associated with a parallel processing construct, in other implementations, other execution timing arrangements may be utilized for the parallel processing construct.

Exemplary Process

FIGS. 22-28 depict flow charts associated with an exemplary process 2200 according to implementations described herein. In one implementation, process 2200 may be performed by client 500. In other implementations, process 2200 may be performed by another device or combination of devices (e.g., client 500 in conjunction with web service 580).

As shown in FIG. 22, process 2200 may begin with receipt or creation of a program (or main program) (block 2210). For example, in implementations described above in connection with FIG. 5A, program provider 510 may include hardware, software, and/or a combination of hardware and software based logic that provides one or more programs (e.g., main program 545) for execution. In one example, program provider 510 may generate or receive programs created using a technical computing environment.

The program may be analyzed (block 2220), and inner and outer contexts of the program may be determined based on the analysis of the program (block 2230). For example, in implementations described above in connection with FIGS. 5A and 8, analysis logic 520 of client 500 may include hardware, software, and/or a combination of hardware and software based logic that analyzes main program 545. In one example, SPMD command 810 may be provided to analysis logic 520.

Analysis logic 520 may receive SPMD command 810, and may analyze SPMD command 810 to determine outer parallel context 820 and inner parallel context 830. In another example, analysis logic 520 may perform a language analysis of a program (e.g., SPMD command 810), and may determine a separation between inner parallel context 820 and outer parallel context 830. Analysis logic 520 may identify SPMD blocks (e.g., SPMD command) and/or input and output variables associated with the SPMD blocks.

As further shown in FIG. 22, the outer context of the program may be executed sequentially (block 2240), and one or more data transfer rules may be applied across a boundary between the inner and outer contexts (block 2250). For example, in implementations described above in connection with FIGS. 8 and 13, outer parallel context 820 of SPMD command 810 may be executed sequentially (e.g., by client 500). In one example, one or more of the data transfer rules depicted in FIG. 13 may be implemented by analysis logic 520 of client 500. In another example, one or more of the data transfer rules depicted in FIG. 13 may be implemented by one or more other components of client 500. The data transfer rules may be applied across boundaries (e.g., a spmd statement, an end statement, etc.) of a SPMD command, and may include a crossing spmd: input variables data transfer rule 1310, a crossing end: variants pointing to output variables data transfer rule 1320, a crossing end: complete/incomplete variant output variables data transfer rule 1330, a crossing end: more complete variant output variables data transfer rule 1340, a crossing end: disallow variants to variants data transfer rule 1350, a crossing spmd: variants as input variables data transfer rule 1360, and/or a crossing spmd: non-variants as input variables data transfer rule 1370.

Returning to FIG. 22, lexical information may be shared across the inner and outer contexts of the program (block 2260), and the one or more program portions may be allocated to one or more labs for parallel execution (block 2270). For example, in implementations described above in connection with FIGS. 8 and 12, analysis logic 520 may allocate one or more portions of the inner parallel context (e.g., SPMD body 830) of SPMD command 810 and input variables 850 to labs 420 for parallel execution. Input variable determiner 1200 and output variable determiner 1210 may permit detection of lexical information (e.g., input and output variables), and sharing of lexical information across the inner and outer parallel contexts of a SPMD command. In one example, input variable determiner 1200 may detect input variables, such as variables that are used in a SPMD body before they are assigned. In another example, output variable determiner 1210 may detect output variables, such as variables assigned within the SPMD body. In still another example, the determined input variables associated, associated with the identified SPMD blocks (e.g., block 2220), may be used as input to resource allocation logic 530. Resource allocation logic 530 may utilize the input variables to perform the functions described above in connection with FIGS. 9, 11A, and 11B. As a result of these functions, resource allocation logic 530 may determine where to execute a body of a SPMD block (i.e., what parallel resource set (e.g., sub-pool) to use). Knowing the parallel resource set to use, the SPMD body, and the input variables, resource allocation logic 530 may transfer the input variables (e.g., block 2250) into labs in the parallel resource set, and may transfer the SPMD body (e.g., block 2260) into the labs in the parallel resource set. The SPMD body may be executed on the labs in the parallel resource set.

As further shown in FIG. 22, one or more results associated with parallel execution of the one or more program portions may be received from the one or more labs (block 2280), and the one or more results may be provided to the program (block 2290). For example, in implementations described above in connection with FIG. 5A, results provider 540 of client 500 may receive results 570 from the labs, and may provide results 570 to program provider 510. In one example, results provider 540 may combine results 570 into a single result, and may provide the single result to program provider 510.

Process block 2220 may include the process blocks illustrated in FIG. 23. As shown in FIG. 23, process block 2220 may include determining one or more input variables associated with the inner and outer contexts of the program (block 2300), and determining one or more output variables associated with the inner and outer contexts of the program (block 2310). For example, in implementations described above in connection with FIG. 12, analysis logic 520 may include input variable determiner 1200 and output variable determiner 1210. Input variable determiner 1200 may detect input variables, such as variables that are used in a SPMD body. In one example, upon entering a spmd statement, input variable determiner 1200 may determine input variables to the SPMD block. Output variable determiner 1210 may detect output variables, such as variables assigned within the SPMD body. In one example, upon reaching a spmd statement, output variable determiner 1210 may determine output variables from the SPMD block.

As further shown in FIG. 23, process block 2220 may include transferring the one or more input variables from the outer context to the inner context of the program (block 2320), and transferring the one or more output variables from the inner context to the outer context of the program (block 2330). For example, in implementations described above in connection with FIG. 13, one or more of the data transfer rules depicted in FIG. 13 may be implemented by analysis logic 520 of client 500, and may include a crossing spmd: input variables data transfer rule 1310, a crossing end: variants pointing to output variables data transfer rule 1320, a crossing end: complete/incomplete variant output variables data transfer rule 1330, a crossing end: more complete variant output variables data transfer rule 1340, a crossing end: disallow variants to variants data transfer rule 1350, a crossing spmd: variants as input variables data transfer rule 1360, and/or a crossing spmd: non-variants as input variables data transfer rule 1370. Generally, the data transfer rules depicted in FIG. 13 may transfer input variables from an outer parallel context (e.g., outside a spmd statement and an end statement pair) of a SPMD command to an inner parallel context (e.g., inside the spmd statement and an end statement pair) of the SPMD command, and may transfer output variables from the inner parallel context of the SPMD command to the outer parallel context of the SPMD command.

Alternatively and/or additionally, process block 2220 may include the process blocks illustrated in FIG. 24. As shown in FIG. 24, process block 2220 may include returning a variant constructor function with a function invoked in the inner context of the program (block 2400), and invoking the variant constructor function in the outer context of the program to generate a variant (block 2410). For example, in implementations described above in connection with FIG. 14, conversion API 1400 may be provided by client 500, and may include function 1410 invoked in inner parallel context when crossing end, and function 1420 invoked in outer parallel context when crossing end. Function 1410 may receive data (e.g., x) from SPMD command 1450, may be invoked in an inner parallel context when crossing an end statement, and may return a function handle to a variant constructor function and input data that may be used by function 1420. Function 1420 may invoke the variant constructor function in the outer parallel context when crossing an end statement, and may return x as a variant (or a reference), as indicated by reference number 1460.

As further shown in FIG. 24, process block 2220 may include returning an update function and input data with a function invoked in the outer context of the program (block 2420), and invoking the update function in the inner context of the program to receive the input data, update the input data, and return updated data (block 2430). For example, in implementations described above in connection with FIG. 14, conversion API 1400 may be provided by client 500, and may include function 1430 invoked in outer parallel context when crossing spmd, and function 1440 invoked in inner parallel context when crossing spmd. Function 1430 may receive a reference (e.g., x) from SPMD command 1470, may be invoked in an outer parallel context when crossing a spmd statement, and may return a function handle to a function that updates actual data in the inner parallel context and input data for that function. Update function and input data may be used by function 1440. Function 1440 may invoke the update function in the inner parallel context when crossing a spmd statement, and may return x as an input variable (or data), as indicated by reference number 1480. Function 1440 may receive the input data, may update the input data, and may return updated data (input variable x).

Figure 25B:
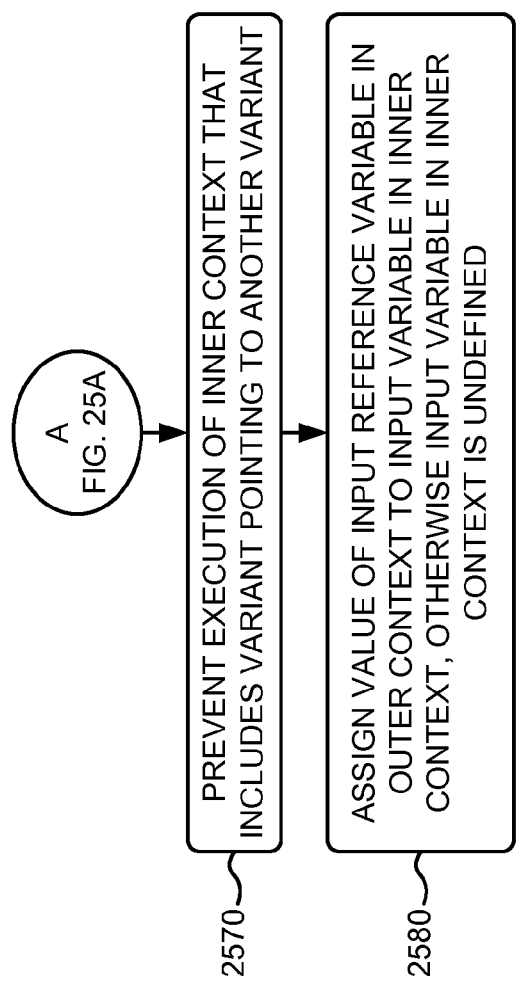

Process block 2250 may include the process blocks illustrated in FIGS. 25A and 25B. As shown in FIG. 25A, process block 2250 may include preserving a value, class, and attribute of an input variable associated with the outer context of the program (block 2500), providing an output variable from the inner context to the outer context of the program as a variant (block 2510), and/or discarding (or replacing) one or more complete output variables after crossing the boundary (block 2520). For example, in implementations described above in connection with FIG. 13, according to data transfer rule 1310 (e.g., crossing spmd: input variables), when entering a SPMD block, variables created or available in an outer parallel context may be automatically transferred to remote labs (e.g., labs 420) executing an inner parallel context. An input variable (e.g., input variable x) may include a same value after the end statement as it was before the spmd statement, may include a same class after the end statement as it was before the spmd statement, and/or may include a same attribute(s) (e.g., sparsity) after the end statement as it was before the spmd statement. According to data transfer rule 1320 (e.g., crossing end: variants pointing to output variables), output variables (e.g., output variable x) may be sent as references from the inner parallel context to the outer parallel context. In other words, after an end statement (i.e., upon returning to a subsequent outer parallel context), output variables (e.g., output variable x) may be of class variant. According to data transfer rule 1330 (e.g., crossing end: complete/incomplete variant output variables), after an end statement, a value associated with a complete output variable (e.g., complete output variable x) in an outer parallel context before a SPMD block may be discarded.

As further shown in FIG. 25A, process block 2250 may include returning one or more incomplete output variables to the outer context of the program as one or more incomplete variants (block 2530), maintaining a value of a variable after the inner context of the program as a variant (block 2540), and/or converting a value of a variable after the inner context of the program, upon dereferencing, to an original value (block 2550). For example, in implementations described above in connection with FIG. 13, according to data transfer rule 1330 (e.g., crossing end: complete/incomplete variant output variables), after the end statement (i.e., upon returning to a subsequent outer parallel context), an incomplete output variable (e.g., incomplete output variable y) may be brought into the outer parallel context as an incomplete variant. According to data transfer rule 1340 (e.g., crossing end: more complete variant output variables), if a variable includes a value before entering a SPMD block, the value of the variable after the SPMD block may be a variant class. On dereference, the variable may include its original value on a lab to which it is unassigned. In other words, a variant may associate a pre-existing value of a variable in an outer parallel context (if any) to a lab where an output variable was not assigned. In one example, if variables x and y include a value of "0" before the spmd statement (e.g., before entering the SPMD block), variable x may include its original value (e.g., "0") on a lab to which it is unassigned (e.g., labs less than or equal to "5") and may include a value (e.g., "1") on assigned labs (e.g., labs greater than "5"). Variable y may include its original value (e.g., "0") on all labs since it is not assigned to any labs.

Returning to FIGS. 25A and 25B, process block 2250 may include generating an error when the inner context of the program includes a variant pointing to another variant (block 2560), preventing execution of the inner context of the program that includes a variant pointing to another variant (block 2570), and/or assigning a value of an input reference variable in the outer context of the program to an input variable in the inner context, otherwise the input variable is undefined (block 2580). For example, in implementations described above in connection with FIG. 13, according to data transfer rule 1350 (e.g., crossing end: disallow variants to variants), a user may be prevented from generating code that includes variants pointing to variants by generating an error on first use of variants pointing to variants as input variables to SPMD blocks, and by not permitting the user to obtain a value of a variant that points to a variant. According to data transfer rule 1360 (e.g., crossing spmd: variants as input variables), if a variant to be used as an input variable is not defined in a parallel resource set, an error may be generated. Otherwise, for each lab in the inner parallel context, if an input reference variable in the outer parallel context includes a reference to a value on the lab, an input variable in the inner parallel context may store the value. If the input reference variable in the outer parallel context does not include a reference to a value on the lab, the input variable in the parallel context may be undefined on the lab.

Figure 26:
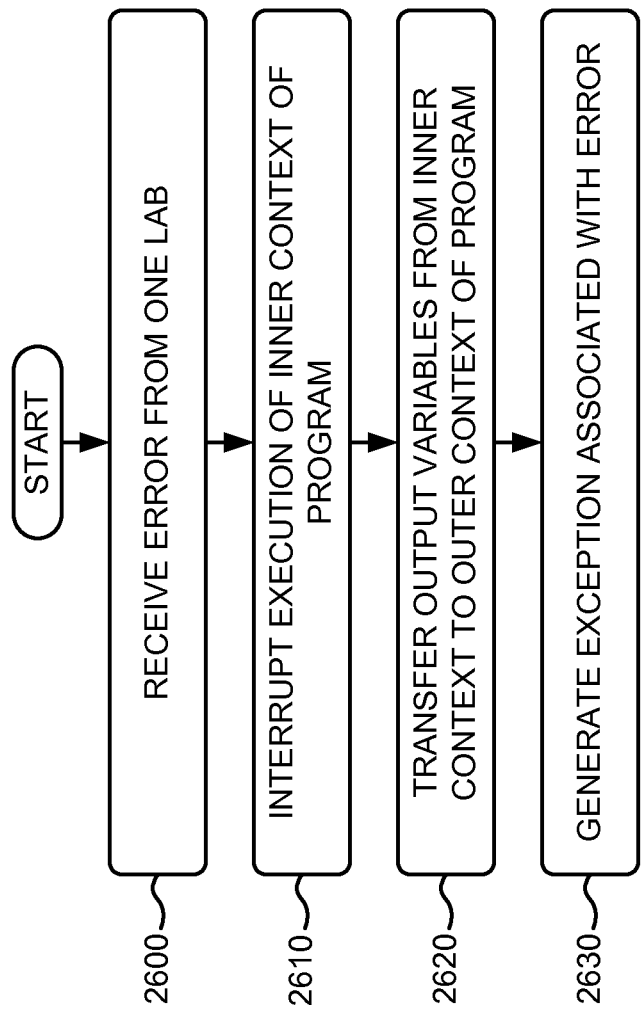

Process block 2270 may include the process blocks illustrated in FIG. 26. As shown in FIG. 26, process block 2270 may include receiving an error from one lab (block 2600), and interrupting execution of the inner context of the program (block 2610). For example, in implementations described above in connection with FIG. 15, client 500 may include error detection logic 1500, interrupt SPMD block logic 1510, transfer output variables logic 1520, and/or generate exception logic 1530. Error detection logic 1500 may receive an error 1540 from a lab (e.g., one of labs 420), and may provide error 1540 to interrupt SPMD block 1510. Interrupt SPMD block logic 1510 may receive error 1540 from error detection logic 1500, and may interrupt execution of a SPMD block, as indicated by reference number 1550. In one example, interrupt SPMD block logic 1510 may provide interrupt 1550 to analysis logic 520, and analysis logic 520 may interrupt execution of a SPMD block on labs (e.g., one or more of labs 420) in an inner parallel context.

As further shown in FIG. 26, process block 2270 may transfer output variables from the inner context of the program to the outer context of the program (block 2620), and may generate an exception associated with the error (block 2630). For example, in implementations described above in connection with FIG. 15, transfer output variables logic 1520 may receive interrupt 1550 from interrupt SPMD block 1510, and may transfer output variables from the inner parallel context into the outer parallel context associated with the SPMD block, as indicated by reference number 1560. In one example, transfer output variable logic 1520 may use states associated with the output variables before error 1540 is generated and/or interrupt 1550 is generated. Generate exception logic 1530 may receive output variables 1560 from transfer output variables logic 1520, and may generate an exception 1570 in the outer parallel context of the SPMD block. In one example, exception 1570 may include information, such as a labindex of a lab that generates error 1540, an error message, etc.

Alternatively and/or additionally, process block 2270 may include the process blocks illustrated in FIG. 27. As shown in FIG. 27, process block 2270 may include defining an idle sub-pool of one or more labs distinct from the other labs (block 2700), determining a desired number of lab(s) for parallel execution (block 2710), and allocating the one or more portions of the program to the desired number of labs(s) from a portion of the idle sub-pool (block 2720). For example, in implementations described above in connection with FIGS. 16 and 17A, client 500 (e.g., via SPMD command 700) may establish one or more idle sub-pools 1620 and 1630 of labs (e.g., labs 420) from pool 1610 for a particular SPMD block (e.g., SPMD command 700). Each of idle sub-pools 1620 and 630 may include a set of labs from pool 1610 that a parallel process (e.g., SPMD command 700) may have at its disposal for performing computations. Idle sub-pool 1720 may include "210" labs, including ten labs (e.g., labs 420-1, ..., 420-10) depicted in FIG. 17A. Each of the ten labs may include a size of twenty sub-labs, and idle sub-pool 1720 may include a size of "210" labs. SPMD command 1710 may seek to create an inner parallel resource set with ten desired labs 1730, and may create the inner parallel resource set as follows. SPMD command 1710 may subtract the number of desired labs 1730 from the number of labs (e.g., "210") contained in idle sub-pool 1720, and may divide the result (e.g., "200") by the number of desired labs 1730 to determine a particular number (e.g., "20"). The particular number may be used to divide the inner parallel resource set, associated with SPMD command 1710, among labs 420-1, ..., 420-10 of idle sub-pool 1720. In one example, each of labs 420-1, ..., 420-10 may include a portion of the inner parallel resource set, associated with SPMD command 1710, that is less than or equal to "20."

As further shown in FIG. 27, process block 2270 may include allocating a remaining portion of the idle sub-pool to the desired number of lab(s) for future use (block 2730), and restoring the idle sub-pool after execution of the allocated one or more portions of the program (block 2740). For example, in implementations described above in connection with FIGS. 17A and 17B, a remaining portion of idle sub-pool 1720 may be allocated to the number of desired labs 1730 for future use by SPMD command 1710. After the inner parallel resource of SPMD command 1710 is executed, SPMD command 1710 may restore idle sub-pool 1720 to its original size, as indicated by reference number 1740. Thus, idle sub-pool 1720 may include the same number of labs as it had before the inner parallel resource set was created. In one example, idle sub-pool 1720 may include "210" labs, and the "210" labs may include empty idle sub-pools, including the labs (e.g., labs 420-1, ..., 420-10) that executed SPMD command 1710.

Alternatively and/or additionally, process block 2270 may include the process blocks illustrated in FIG. 28. As shown in FIG. 28, process block 2270 may include maintaining one or more variables, referenced by the program, on the one or more labs (block 2800), removing the one or more variables, not referenced by the program, from the one or more labs (block 2810), and making the one or more labs available for use (block 2820). For example, in implementations described above in connection with FIG. 19, SPMD command 1910 may be executed by a lab (e.g., lab 420-1). Variable x may exist on lab 420-1 when a first spmd statement of SPMD command 1910 is encountered, as indicated by reference number 1920, because variable x is referenced in later portions of SPMD command 1910. Variable x may to continue exist on lab 420-1 after a first end statement of SPMD command 1910, as indicated by reference number 1930, because variable x is referenced in later portions of SPMD command 1910. Variable y may exist on lab 420-1 when a second spmd statement of SPMD command 1910 is encountered, as indicated by reference number 1940, because variable y is referenced in later portions of SPMD command 1910. Variables x and y may cease to exist on lab 420-1 (and lab 420-1 may be available) after a second end statement of SPMD command 1910, as indicated by reference number 1950, because variables x and y are no longer referenced in later portions of SPMD command 1910.

CONCLUSION

Implementations described herein may provide systems and/or methods for performing parallel processing. For example, in one implementation, the systems and/or methods may receive a program created for a technical computing environment, may analyze the program, and may determine an inner context and an outer context of the program based on the analysis of the program. The systems and/or methods may allocate one or more portions of the inner context of the program to two or more labs for parallel execution, and may receive one or more results associated with the parallel execution of the one or more portions from the two or more labs. The systems and/or methods may further provide the one or more results to the program (e.g., to the outer context of the program).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9, 11A, 11B, and 22-28, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    transmitting, via a network, a program to a first device, the transmitting being performed by a second device, the program including instructions to cause the first device to:
        receive the program,
        analyze the program, the analyzing including determining one or more variables associated with an inner context of the program and an outer context of the program,
        determine the inner context and the outer context of the program based on the analysis of the program,
        allocate one or more portions of the inner context of the program to two or more labs for parallel execution,
        receive one or more results associated with the parallel execution of the one or more portions from the two or more labs, and
        transmit the one or more results,
    receiving, via the network, the transmitted one or more results, the receiving being performed by the second device; and
    providing, for presentation, the transmitted one or more results, the providing being performed by the second device.

2. The method of claim 1, where the first device is a client device.

3. The method of claim 1, where the network is one of a local area network (LAN), a metropolitan area network (MAN), or a wide area network (WAN).

4. The method of claim 1, where providing the program includes:
    providing the program using an application program interface (API) accessible by the first device.

5. The method of claim 1, where the instructions are further to cause the first device to:
    apply one or more data transfer rules across a boundary between the inner and outer contexts of the program, where, when applying the one or more data transfer rules, the first device is further to at least one of:
        preserve a value, a class, and attributes of an input variable associated with the outer context of the program,
        provide an output variable from the inner context of the program to the outer context of the program as a variant,
        replace a previously stored value after crossing the boundary between the inner and outer contexts of the program, or
        maintain a value of a particular variable, after execution of the inner context of the program, as a variant.

6. The method of claim 1, where the inner context of the program comprises one or more parallel processing constructs, the one or more parallel processing constructs including at least one of:
    a first parallel processing construct nested in a second parallel processing construct;
    the second parallel processing construct nested in the first parallel processing construct;
    the first parallel processing construct nested in another first parallel processing construct; or
    the second parallel processing construct nested in another second parallel processing construct.

7. The method of claim 1, where the instructions further cause the first device to:
    combine the one or more results into a single result, and where receiving the transmitted one or more results includes:
        receiving the single result.

8. A device comprising:
    a processor to:
        transmit, via a network, a program to another device, the program including instructions to cause the other device to:
            receive an inner context and an outer context of the program,
            allocate one or more portions of the inner context of the program to two or more labs for parallel execution,
            receive one or more results associated with the parallel execution of the one or more portions from the two or more labs, and
            transmit the one or more results,
        receive, via the network, the transmitted one or more results; and
        provide, for presentation, the transmitted one or more results.

9. The device of claim 8, where the other device is a client device.

10. The device of claim 8, where the network is one of a local area network (LAN), a metropolitan area network (MAN), or a wide area network (WAN).

11. The device of claim 8, where, when providing the program, the processor is further to:
    provide the program using an application program interface (API) accessible by the other device.

12. The device of claim 8, where the instructions are further to cause the other device to:
    apply one or more data transfer rules across a boundary between the inner and outer contexts of the program, where, when applying the one or more data transfer rules, the other device is further to at least one of:
        preserve a value, a class, and attributes of an input variable associated with the outer context of the program,
        provide an output variable from the inner context of the program to the outer context of the program as a variant,
        replace a previously stored value after crossing the boundary between the inner and outer contexts of the program, or
        maintain a value of a particular variable, after execution of the inner context of the program, as a variant.

13. The device of claim 8, where the inner context of the program comprises one or more parallel processing constructs, the one or more parallel processing constructs including at least one of:
    a first parallel processing construct nested in a second parallel processing construct;
    the second parallel processing construct nested in the first parallel processing construct;
    the first parallel processing construct nested in another first parallel processing construct; or
    the second parallel processing construct nested in another second parallel processing construct.

14. The device of claim 8, where the instructions further cause the other device to:
  combine the one or more results into a single result, and
  where, when receiving the transmitted one or more results, the device is to:
    receive the single result.

15. A method comprising:
  transmitting, via a network, a program to a first device, the transmitting being performed by a second device, the program including instructions to cause the first device to:
    receive the program,
    analyze the program,
    determine an inner context and an outer context of the program based on the analysis of the program,
    allocate one or more portions of the inner context of the program to two or more labs for parallel execution,
    receive one or more results associated with the parallel execution of the one or more portions from the two or more labs, and
    transmit the one or more results to the outer context of the program,
  receiving, via the network, the transmitted one or more results, the receiving being performed by the second device; and
  providing, for presentation, the transmitted one or more results, the providing being performed by the second device.

16. The method of claim 15, where the first device is a client device.

17. The method of claim 15, where the network is one of a local area network (LAN), a metropolitan area network (MAN), or a wide area network (WAN).

18. The method of claim 15, where providing the program includes:
  providing the program using an application program interface (API) accessible by the first device.

19. The method of claim 15, where the instructions are further to cause the first device to:
  apply one or more data transfer rules across a boundary between the inner and outer contexts of the program, where, when applying the one or more data transfer rules, the first device is further to at least one of:
    preserve a value, a class, and attributes of an input variable associated with the outer context of the program,
    provide an output variable from the inner context of the program to the outer context of the program as a variant,
    replace a previously stored value after crossing the boundary between the inner and outer contexts of the program, or
    maintain a value of a particular variable, after execution of the inner context of the program, as a variant.

20. The method of claim 15, where the instructions further cause the first device to:
  combine the one or more results into a single result, and
  where receiving the transmitted one or more results includes:
    receiving the single result.

* * * * *